United States Patent [19]
Yamamoto et al.

[11] Patent Number: 5,768,219
[45] Date of Patent: Jun. 16, 1998

[54] OPTICAL INFORMATION RECORDING/ REPRODUCING APPARATUS THAT PRODUCES VERIFYING REPRODUCTION SIGNALS BY EXECUTING A COMPUTATION USING DETECTION SIGNALS OF MULTI-DIVIDED DETECTION SURFACES OF A PHOTO-DETECTOR

[75] Inventors: Masakuni Yamamoto, Yamato; Susumu Matsumura, Kawaguchi; Hiroaki Hoshi, Yokohama; Eiji Yamaguchi, Zama, all of Japan

[73] Assignee: Canon Kabushiki Kaisha, Tokyo, Japan

[21] Appl. No.: 733,918

[22] Filed: Oct. 18, 1996

Related U.S. Application Data

[62] Division of Ser. No. 514,477, Aug. 11, 1995, Pat. No. 5,577,017, and a continuation of Ser. No. 12,453, Feb. 2, 1993, abandoned.

[30] Foreign Application Priority Data

| Feb. 5, 1992 | [JP] | Japan | 4-047789 |
| Feb. 5, 1992 | [JP] | Japan | 4-47790 |
| Jun. 2, 1992 | [JP] | Japan | 4-165533 |
| Sep. 14, 1992 | [JP] | Japan | 4-269096 |

[51] Int. Cl.$^6$ ............................................ G11B 11/00
[52] U.S. Cl. ........................................ 369/13; 369/110
[58] Field of Search ........................... 369/13, 110, 112, 369/116, 109, 120, 288, 275.2, 275.3, 275.4, 47, 51, 14, 275.1, 44.26, 44.23; 360/59, 114; 428/694 EC, 694 MM

[56] References Cited

U.S. PATENT DOCUMENTS

| 4,982,393 | 1/1991 | Matsushita et al. | 369/44.32 |
| 5,043,960 | 8/1991 | Nakao et al. | 369/13 |
| 5,153,868 | 10/1992 | Fujinaga | 369/110 |
| 5,577,017 | 11/1996 | Yamamoto et al. | 369/110 |

FOREIGN PATENT DOCUMENTS

| 0218250 | 4/1987 | European Pat. Off. . |
| 0346121 | 12/1989 | European Pat. Off. . |

OTHER PUBLICATIONS

Patent Abstracts of Japan, Kokai No. 58–029151, vol. 7, No. 109, May 1983.

Patent Abstracts of Japan, Kokai No. 02–198044, vol. 14, No. 487, Oct. 1990.

Levenson, et al., "Edge Detection for Magnetooptical Data Storage," Applied Optics, vol. 30, No. 2, Jan. 1991, pp. 232 through 252.

Aratani, et al., "Magnetically Induced Super Resolution in Novel Magneto–optical Disk," Optical Data Storage Topical Meeting, vol. 5, Feb. 1991, pp. 112 through 119.

*Primary Examiner*—Ali Neyzari
*Attorney, Agent, or Firm*—Fitzpatrick, Cella, Harper & Scinto

[57] ABSTRACT

An optical information recording and/or reproducing apparatus includes an irradiating device including an objective lens, having a curved surface, for irradiating a recording light beam to a magnetooptical recording medium having at least two magnetic layers, which are a recording layer and a reproduction layer, and which are exchanged-coupled to each other, and a magnetic layer for controlling the exchange-coupling force to block the exchange-coupling force between the recording and reproduction layers, a device for applying an external magnetic field modulated according to an information signal to be recorded on the beam irradiated portion of the recording medium to record information on the recording layer and to orient magnetization of the reproduction layer in a direction parallel to the external magnetic field, a splitting device including a polarizing beam splitter for splitting at least light produced by a magnetooptic effect of the recording medium and light produced by diffraction at the curved surface of the objective lens, a detector including a multi-divided photodetector for respectively detecting the split light beams and a device for producing verifying reproduction signals by executing a predetermined computation using detection signals of the detection surfaces of the photodetector.

12 Claims, 35 Drawing Sheets

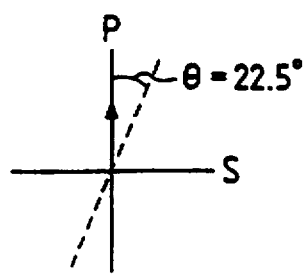 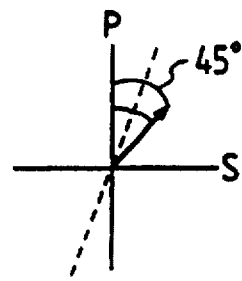 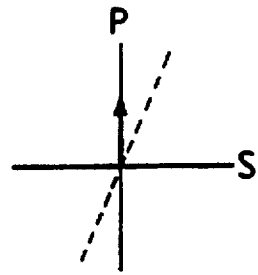
FIG. 4(a-1)   FIG. 4(a-2)   FIG. 4(a-3)
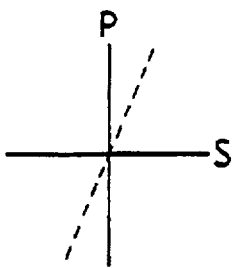 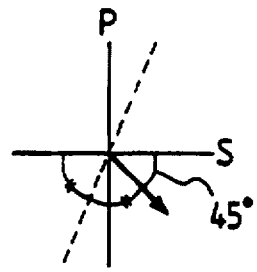 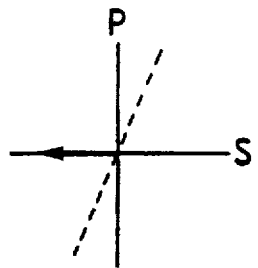
FIG. 4(b-1)   FIG. 4(b-2)   FIG. 4(b-3)
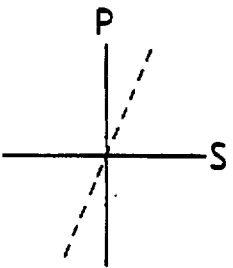 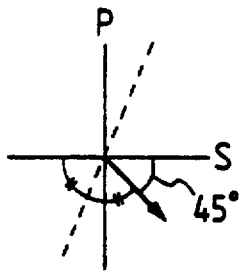 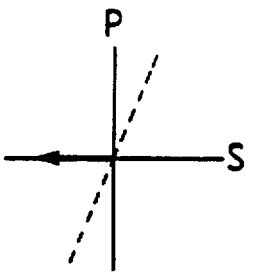
FIG. 4(c-1)   FIG. 4(c-2)   FIG. 4(c-3)

FIG. 5A  FIG. 5B  FIG. 5C
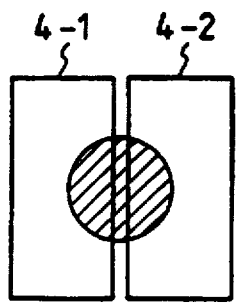
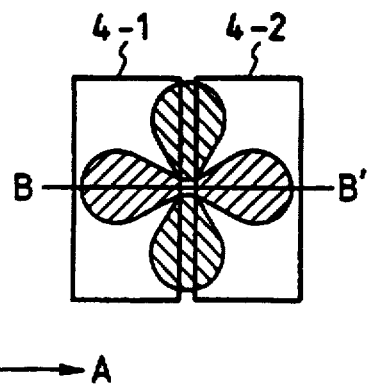
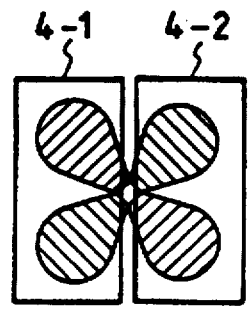
FIG. 6
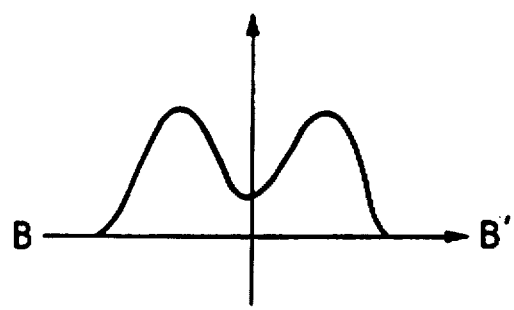

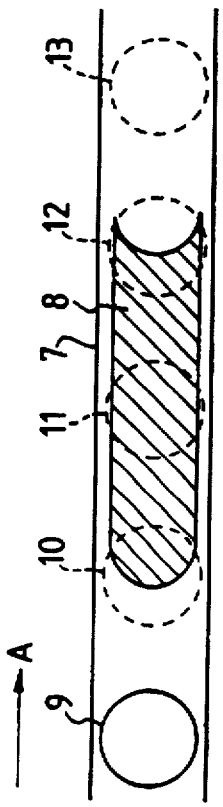
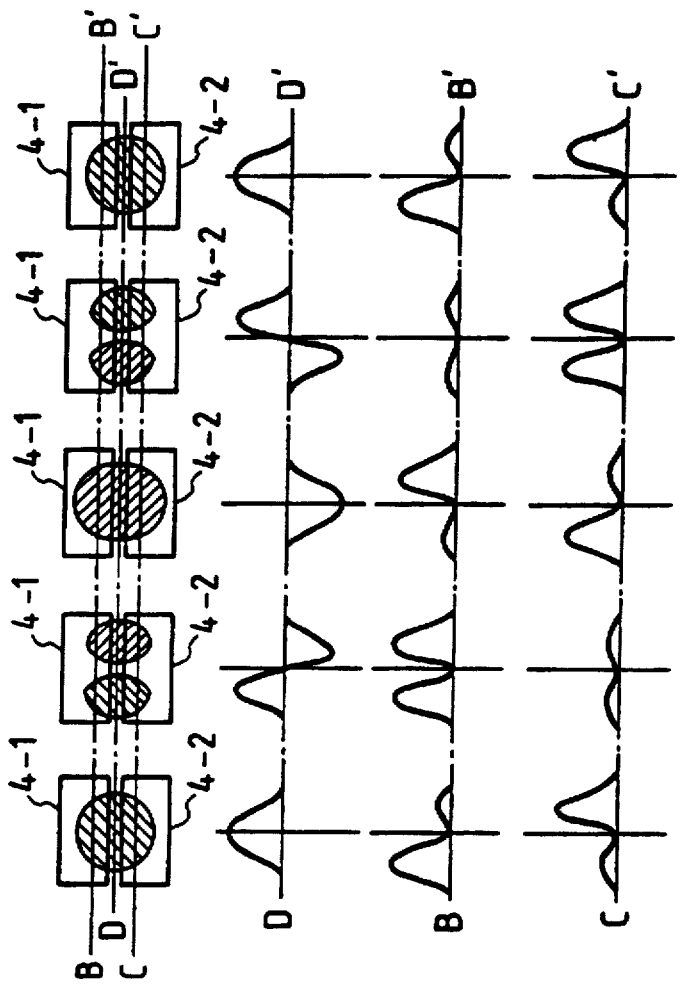
FIG. 11A
FIG. 11B
FIG. 11C
FIG. 11D
FIG. 11E
FIG. 11F

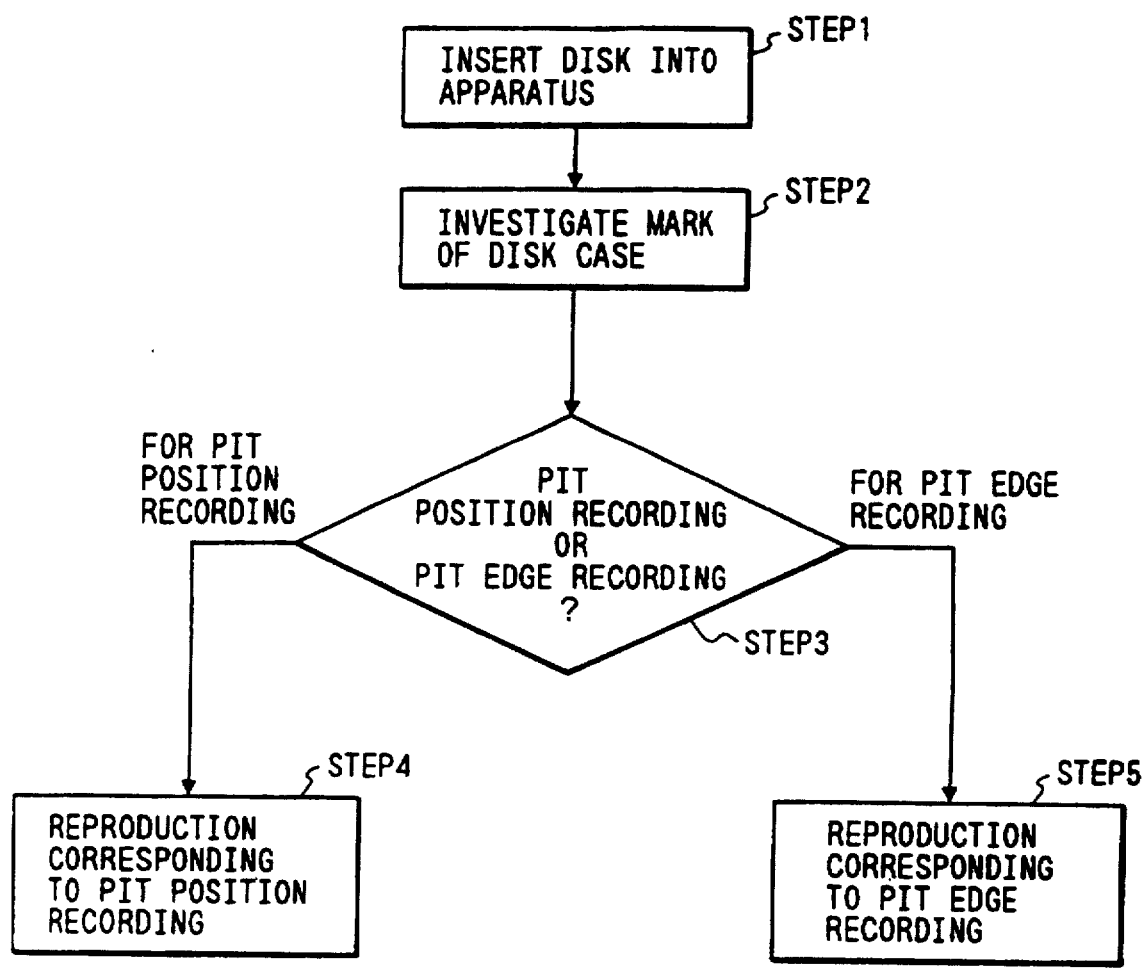

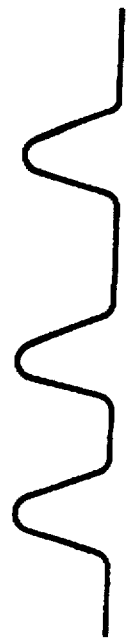
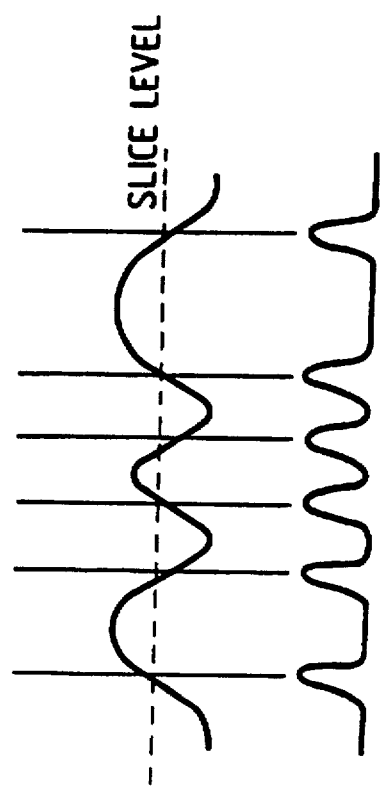
FIG. 17A  PIT POSITION RECORDING
FIG. 17B  DETECTION SIGNAL
FIG. 17C  PIT EDGE RECORDING
FIG. 17D  DETECTION SIGNAL
FIG. 17E  EDGE DETECTION SIGNAL

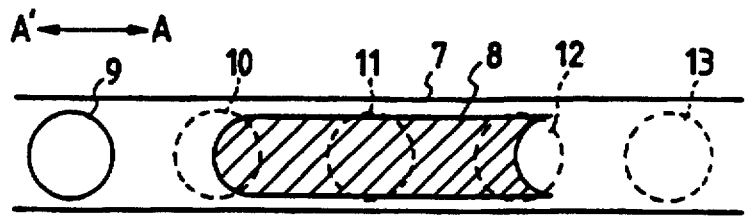
FIG. 21A
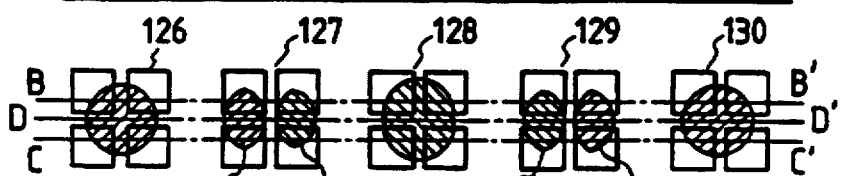
FIG. 21B
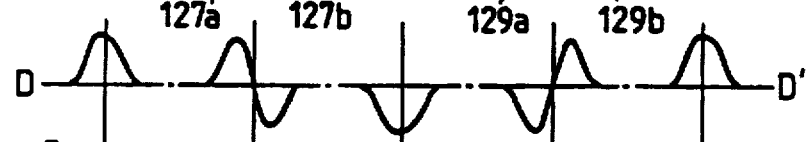
FIG. 21C
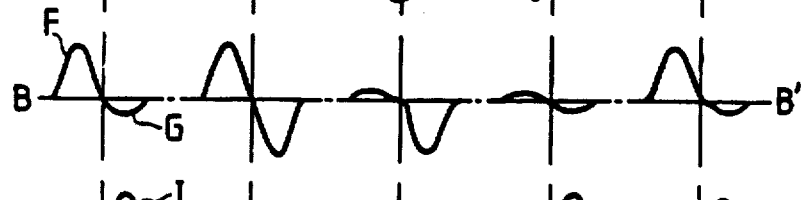
FIG. 21D
FIG. 21E
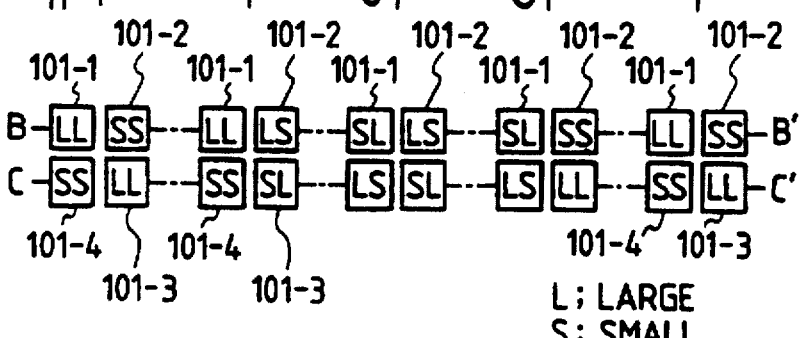
FIG. 21F
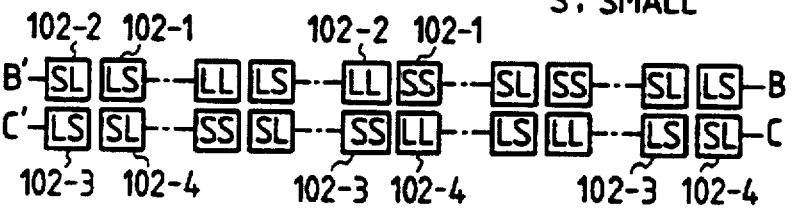
FIG. 21G
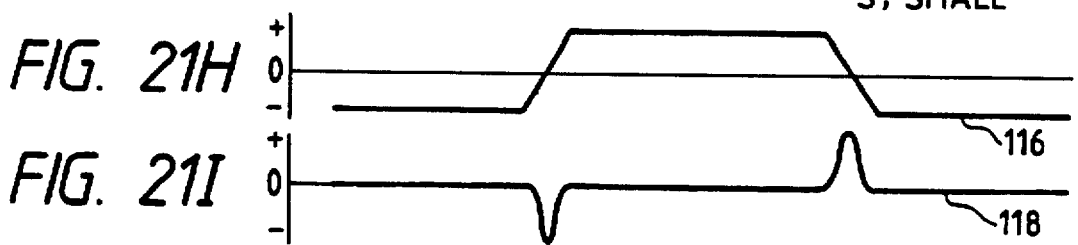
FIG. 21H
FIG. 21I

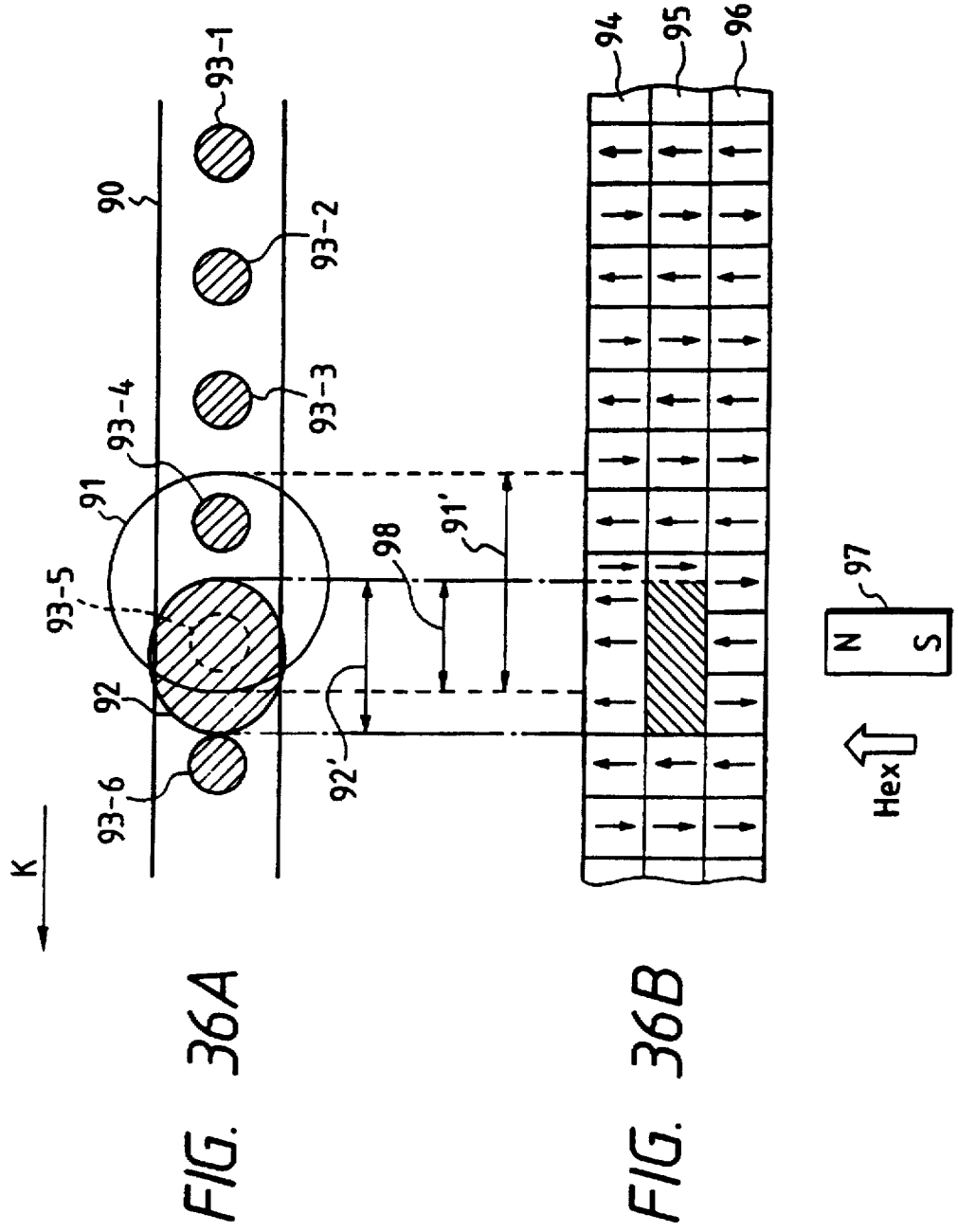

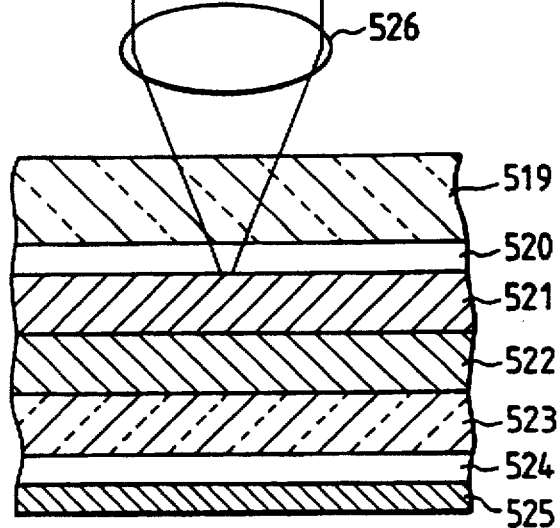
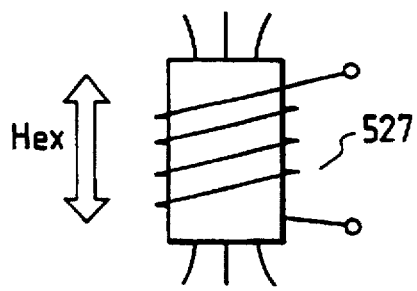
FIG. 39
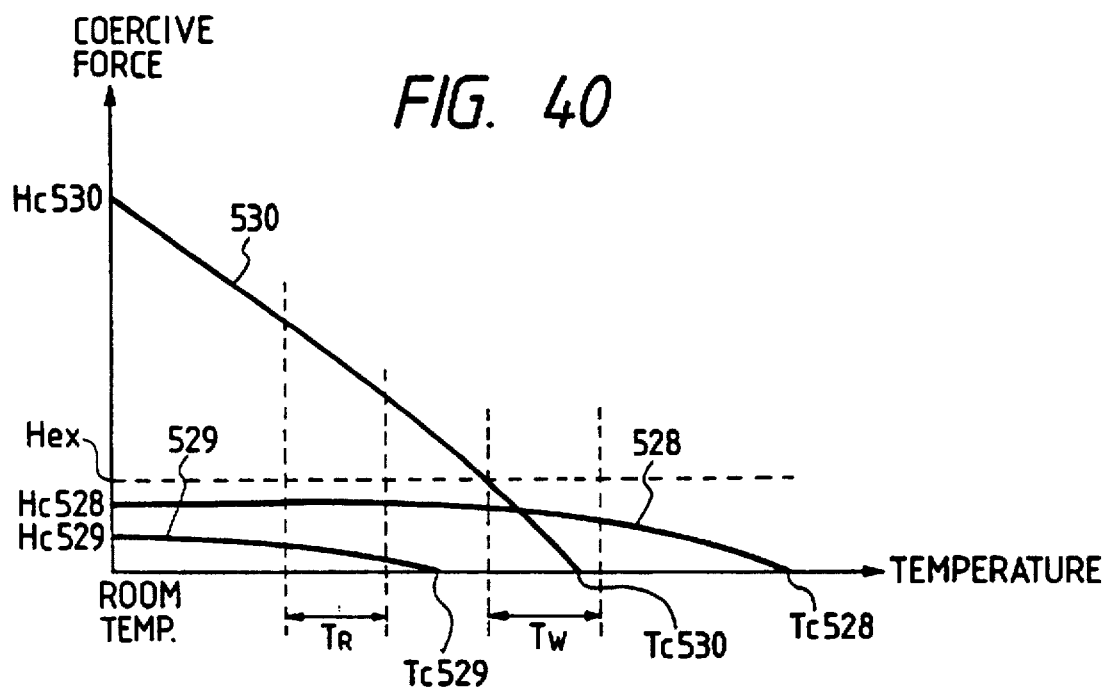
FIG. 40

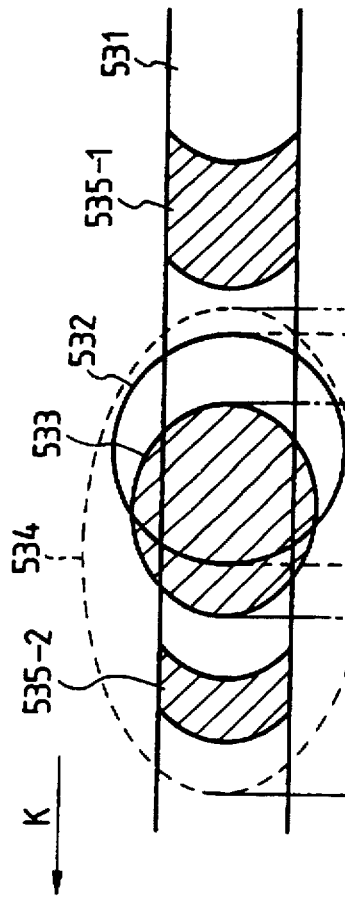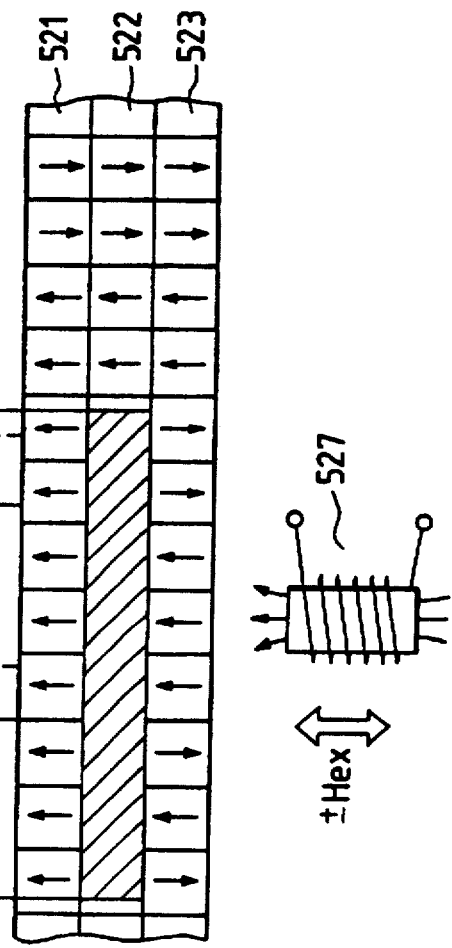
FIG. 41A
FIG. 41B

FIG. 43G / FIG. 43H 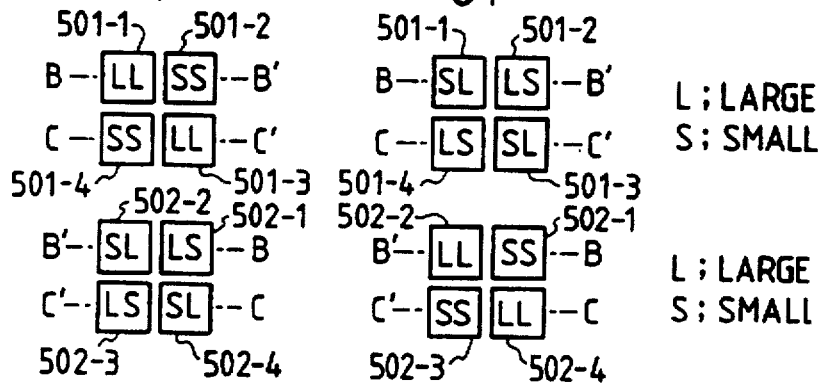

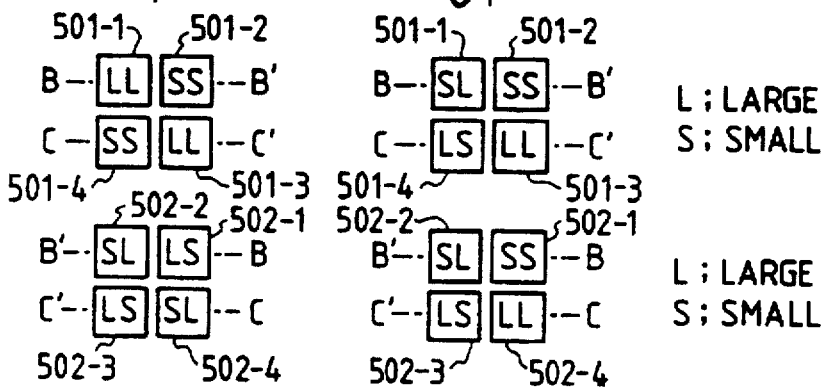

5,768,219

OPTICAL INFORMATION RECORDING/ REPRODUCING APPARATUS THAT PRODUCES VERIFYING REPRODUCTION SIGNALS BY EXECUTING A COMPUTATION USING DETECTION SIGNALS OF MULTI-DIVIDED DETECTION SURFACES OF A PHOTO-DETECTOR

This application is a divisional of application Ser. No. 08/514,477, filed on Aug. 11, 1995, which was allowed on May 14, 1996 now U.S. Pat. No. 5,577,017, and is a continuation of application Ser. No. 08/012,453 filed on Feb. 2, 1993 abandoned.

BACKGROUND OF THE INVENTION

1. Field of the Invention

The present invention relates to a magnetooptical information recording and/or reproducing apparatus for recording information on a magnetooptical recording medium and/or reproducing the recorded information from the magnetooptical recording medium.

2. Related Background Art

In recent years, a magnetooptical information recording/reproducing apparatus using a magnetooptical disk as a recording medium has received a great deal of attention as the most promising recording/reproducing apparatus because it is portable, has a large storage capacity, and is capable of performing information erasure and updating. FIG. 1 is a view showing an optical system of a conventional magnetooptical information recording/reproducing apparatus. This apparatus includes a semiconductor laser 19 serving as a recording/reproduction light source. A divergent light beam emitted from the semiconductor laser 19 is collimated by a collimator lens 20. The sectional shape of the collimated light beam is shaped into a circular shape by a beam shaping prism 21. The collimated light beam is a beam of linear polarization (to be referred to as a P-polarized light component) having a polarization direction parallel to the drawing surface. The P-polarized light beam is incident on a polarizing beam splitter 22. The characteristics of the polarizing beam splitter 22 are given such that the transmittance for the P-polarized light component is 60%, the reflectance therefor is 40%, the transmittance for a linearly polarized light component (to be referred to as an S-polarized light component) having a polarization direction perpendicular to the polarization direction of the P-polarized light component is 0%, and the reflectance for the S-polarized light component is 100%. The P-polarized light beam passing through the polarizing beam splitter 22 is focused by an objective lens 23, so that a light spot is formed on the magnetic layer of a magnetooptical disk 24. An external magnetic field is applied from a magnetic head 25 to a portion irradiated with this light spot, thereby recording an information domain on the magnetic layer.

Light reflected by the magnetooptical disk 24 returns to the polarizing beam splitter 22 through the objective lens 23. Part of the reflected light is split and guided to a reproduction-optical system. In the reproduction optical system, the split light beam is further split by another polarizing beam splitter 26. The characteristics of the polarizing beam splitter 26 are given such that the transmittance for the P-polarized light component is 20%, the reflectance for the P-polarized light component is 80%, the transmittance for the S-polarized light component is 0%, and the reflectance for the S-polarized light component is 100%. One light beam split by the polarizing beam splitter 26 is guided to a reproduction optical system 27, and a reproduction signal (to be described later) is generated. The other light beam is guided to a half prism 36 through a condenser lens 35. This light beam is split into halves by the half prism 36. One light beam is guided to a photodetector 37, and the other light beam is guided to a photodetector 39 through a knife edge 38. By these control optical systems, servo error signals for autotracking control and autofocusing control of the light beam are generated.

The reproduction optical system 27 comprises a λ/2 plate 28 for rotating the polarization direction of the light beam through 45°, a condenser lens 29 for condensing the light beam, a polarizing beam splitter 30, and photodetectors 31 and 32 for respectively detecting the light beams split by the polarizing beam splitter 30. The characteristics of the polarizing beam splitter 30 are given such that the transmittance for the P-polarized light component is 100%, the reflectance for the P-polarized light component is 0%, the transmittance for the S-polarized light component is 0%, and the reflectance for the S-polarized light component is 100%. Signals detected by the photodetectors 31 and 32 are differentially detected by a differential amplifier 33 to generate a reproduction signal 34. In the magnetooptical recording medium, information is recorded in accordance with a difference in direction of perpendicular magnetization. Recording schemes are classified into an optical modulation scheme and a magnetic field modulation scheme. The optical modulation scheme is a scheme for radiating a laser beam intensity-modulated in accordance with recording information on a recording medium to record the information while a predetermined external magnetic field is being applied to the recording medium. On the other hand, the magnetic field modulation scheme is a scheme for applying an external magnetic field modulated in accordance with recording information while a recording medium is being irradiated with a laser beam having a predetermined intensity.

When a linearly polarized light component is radiated on a magnetooptical recording medium on which information is recorded depending on a difference in direction of magnetization, the polarization direction of the reflected light is rotated clockwise or counterclockwise depending on the difference in direction of magnetization. For example, as shown in FIG. 2, assume that the polarization direction of the linearly polarized light component incident on the magnetooptical recording medium is a P (ordinate) direction, that reflected light with respect to downward magnetization is $R_+$ rotated through $+\theta_k$, and that reflected light with respect to upward magnetization is $R_-$ rotated through $-\theta_k$. When an analyzer is located in a direction indicated in FIG. 2, light passing through the analyzer becomes A with respect to $R_+$ and B with respect to $R_-$. When these light components are detected by the photodetectors, information as a difference in light intensity can be obtained. In the example of FIG. 1, the polarizing beam splitter 30 plays a role as the analyzer for rotating one split light beam through +45° from the P-axis and the other light beam through −45° from the P-axis. That is, the resultant signal components from the photodetectors 31 and 32 have opposite phases. When these signals are differentially detected, a reproduction signal whose noise is reduced is obtained. In order to increase the storage capacity, a recording scheme is recently being shifted from a mark interval recording scheme in which the central position of an information pit is meaningful to a mark length recording scheme in which the length of an information pit is meaningful. According to the mark length recording scheme, the position of an information pit is optically detected with an optical head, and the position information is electrically processed to detect the edge of the information pit.

In a conventional technique, however, light in the P-axis direction and light in the S-axis direction are detected using the polarizing beam splitter 30 shown in FIG. 1 to reproduce information. In this reproduction scheme, the number of components of the optical head is increased to undesirably result in a bulky, complicated arrangement. In the mark length recording scheme, the edge of the information pit (domain) must be detected. In the conventional technique, the edge is not directly optically detected. When the size of the domain becomes equal to that of the light spot, the detection position of the edge is shifted, and information cannot be accurately detected, resulting in inconvenience.

SUMMARY OF THE INVENTION

The present invention has been made to solve the conventional problems described above, and has as its object to provide a magnetooptical information recording/reproducing apparatus capable of reducing the number of components constituting an optical head and accurately detecting the edge position of an information pit.

In order to achieve the above object according to an aspect of the present invention, there is provided a magnetooptical information recording/reproducing apparatus in which a light beam is radiated on a magnetooptical recording medium and information recorded on a recording medium is reproducted from the light reflected by the recording medium, characterized in that light produced by a magnetooptic effect of the magnetooptical recording medium is interfered with light produced by diffraction at a curved surface of a lens for condensing the light beam radiated on the recording medium into a minute light spot, and the interference light is detected by a photodetector, thereby reproducing the recorded information.

In order to achieve the above object according to another aspect of the present invention, there is provided a magnetooptical information recording/reproducing apparatus in which a light beam is radiated on a magnetooptical recording medium and information recorded on a recording medium is reproduced from the light reflected by the recording medium, characterized in that light produced by a magnetooptic effect of the magnetooptical recording medium and light produced by diffraction at a curve surface of a lens for condensing the light beam radiated on the recording medium into a minute light spot are split into light beams by a polarizing beam splitter serving as an analyzer, and the split light beams are respectively detected by multi-divided photodetectors, thereby reproducing information.

BRIEF DESCRIPTION OF THE DRAWINGS

FIGS. 4(a-1) to 4(c-3) are views for explaining the function of a λ/2 plate used in the embodiment shown in FIG. 3;

FIGS. 5A to 5C are views showing distributions of light components diffracted at the curved surface of an objective lens in the embodiment shown in FIG. 3;

FIG. 6 is a view showing the amplitude of light along the line B-B' in FIG. 5;

FIGS. 11A to 11F are views for explaining an information reproduction operation of the embodiment shown in FIG. 8;

FIG. 16 is a flow chart showing a sequence for controlling switching between signal reproduction operations for a pit position recording disk and a pit edge recording disk;

FIGS. 17A to 17E are views showing pit trains in pit position recording and pit edge recording, and detection signals thereof;

FIGS. 21A to 21I are views for explaining an information reproduction operation of the embodiment shown in FIG. 18;

FIGS. 36A and 36B are views showing a conventional reproduction scheme for reproducing a domain smaller than a recording light spot;

FIG. 39 is a sectional view showing the structure of a magnetooptical recording medium used in the embodiment of FIG. 38;

FIG. 40 is a graph showing the relationship between the coercive forces of magnetic layers of the magnetooptical recording medium shown in FIG. 39 and the temperature;

FIGS. 41A and 41B are views showing light spots on an information track, information domains, and the magnetized states of the respective magnetic layers in information recording of the embodiment shown in FIG. 38;

FIGS. 43A to 43I are views for explaining a detection operation of a reproduction signal for verification in information recording of the embodiment shown in FIG. 38;

FIGS. 44A to 44I are views for explaining a detection operation of a reproduction signal in information reproduction of the embodiment shown in FIG. 38.

DESCRIPTION OF THE PREFERRED EMBODIMENTS

Figure 3:
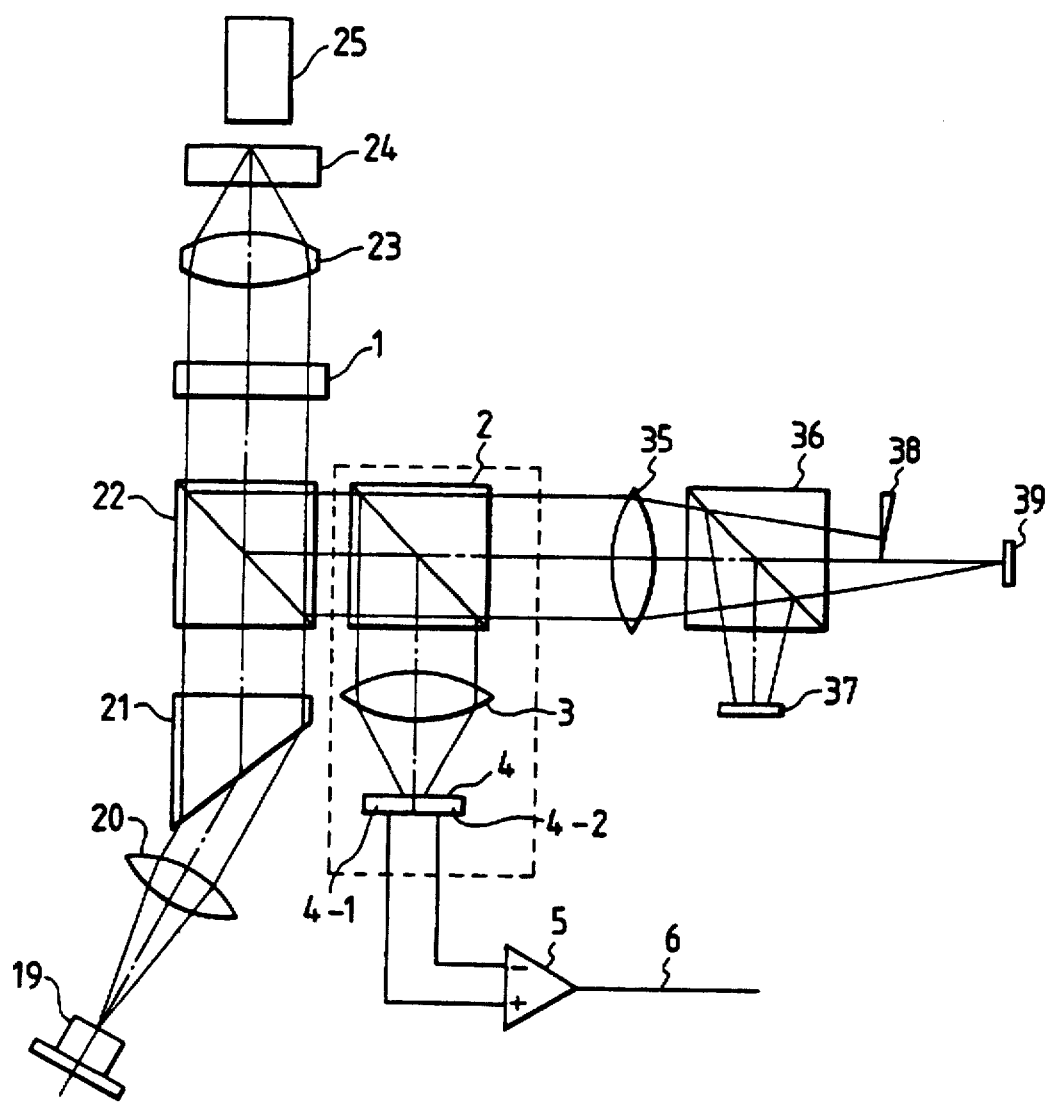
FIG. 3 is a constructional view showing a magnetooptical information recording/reproducing apparatus according to an embodiment of the present invention.

Preferred embodiments of the present invention will be described in detail with reference to the accompanying drawings. FIG. 3 is a constructional view showing a magnetooptical information recording/reproducing apparatus according to an embodiment of the present invention. The same reference numerals as in the conventional apparatus of FIG. 1 denote the same parts or functions in FIG. 3, and a detailed description thereof will be omitted. Referring to FIG. 3, an objective lens 23 has an NA of about 0.55 and has a surface having a large curvature. When a linearly polarized beam is incident from a semiconductor laser 19 to the curvature surface of the objective lens 23, the polarization plane is rotated because the reflectance for the incident light is significantly different from the reflectance for perpendicularly polarized light. When the polarization plane of the incident light and the perpendicularly polarized light are taken into consideration, a diffracted image in the form of a four-leaf clover (to be described later) is obtained. The light beam from the semiconductor laser 19 is a linearly polarized light component (P-polarized light component) having the polarization direction parallel to the drawing surface as in the conventional case. A λ/2 plate 1 is arranged between the objective lens 23 and a polarizing beam splitter 22. The characteristics of a polarizing beam splitter 2 are given such that the transmittance for the P-polarized light component is 100%, the reflectance for the P-polarized light component is 0%, the transmittance for the S-polarized light component is 0%, and the reflectance for the S-polarized light component is 100%. The magnetooptical information recording/reproducing apparatus also includes a condenser lens 3, a two-divided photodetector 4, and a differential amplifier 5. The two-divided photodetector 4 is arranged such that its division line is perpendicular to an information track of a magnetooptical disk 24. Other arrangements of FIG. 3 are the same as those of the conventional apparatus shown in FIG. 1. The information recording scheme is the magnetic field modulation scheme, the autofocusing control scheme in the control optical system is a knife edge scheme, and the autotracking control scheme is a push-pull scheme.

FIGS. 4(a-1), 4(a-2), and 4(a-3) show the behaviors of the polarized incident component, FIGS. 4(b-1), 4(b-2), and 4(b-3) show the behaviors of the polarized component perpendicular to the polarized incident component, which is produced by information on the magnetooptical disk 24, and FIGS. 4(c-1), 4(c-2), and 4(c-3) show the behaviors of the polarized component perpendicular to the polarized incident component, which is produced by diffraction at the curved surface of the objective lens 23. FIGS. 4(a-1), 4(b-1), and 4(c-1) show the behaviors of incident light before incidence on the λ/2 plate 1, FIGS. 4(a-2), 4(b-2), and 4(c-2) show the behaviors of reflected light before incidence on the λ/2 plate 1 after the reflected light passes through the objective lens 23, and FIGS. 4(a-3), 4(b-3), and 4(c-3) show the behaviors of the reflected light after it passes through the λ/2 plate. In FIGS. 4(a-1) to 4(c-3), P represents the direction of the P-polarized light component, and S represents the direction of the S-polarized light component. Each dotted line indicates the optical axis of the λ/2 plate 1. Note that the optical axis of the λ/2 plate 1 is located to form an angle of 22.5° with respect to the direction of the P-polarized light component.

The incident light before incidence on the λ/2 plate 1 is a P-polarized light component, as shown in FIG. 4(a-1). At this time, as shown in FIGS. 4(b-1) and 4(c-1), an S-polarized light component is not yet produced. The reflected light before incidence on the λ/2 plate 1 through the objective lens 23 upon reflection on the magnetooptical disk 24 passes through the λ/2 plate 1 once, so that the polarization plane of the polarized incident component is rotated through 45°, as shown in FIG. 4(a-2). This light component is a polarized light component having an angle of 45° with respect to the track direction on the magnetooptical disk 24. As shown in FIG. 4(b-2), the polarized light component perpendicular to the polarization direction of the component of FIG. 4(a-2) is produced by magnetooptic effect (a Kerr or Faraday effect). In addition, when the light component of FIG. 4(a-2) is going and returning through the objective lens 23, the polarized light component perpendicular to the polarization direction of the light component of FIG. 4(a-2) is produced, as shown in FIG. 4(c-2). When the reflected light beams of these light components pass through the λ/2 plate 1, the polarized incident light component returns to the P-polarized light component, as shown in FIG. 4(a-3). The light component produced by the magnetooptic effect and the light component produced at the curved surface of the objective lens 23 become S-polarized light components. When the intensities of the polarized incident component, the light component produced at the curved surface of the objective lens 23 and the light component produced by magnetooptic effect are defined by $I_i$, $I_c$ and $I_o$, respectively, the following relation is given.

$$I_i > I_c > I_o$$

The reflected light beams of the P- and S-polarized light components reflected by the magnetooptical disk 24 are split by the polarizing beam splitter 22 toward a reproduction optical system and are incident on the polarizing beam splitter 2. The characteristics of the polarizing beam splitter 2 are given such that the transmittance for the P-polarized light component is 100%, the reflectance for the P-polarized light component is 0%, the transmittance for the S-polarized light component is 0%, and the reflectance for the S-polarized light component is 100%. Therefore, the reflected light beams are split into S- and P-polarized light components. The P-polarized light beam directly passes through the polarizing beam splitter 2, so that a focusing error signal and a tracking error signal for autofocusing control and autotracking control are generated in the control optical system in the same manner as in the conventional case. On the other hand, the S-polarized light beam is reflected by the polarizing beam splitter 2 and is incident on the two-divided photodetector 4 through the condenser lens 3. The incident beam is detected by photodetection surfaces 4-1 and 4-2 of the two-divided photodetector 4, and detection signals therefrom are differentially detected by the differential amplifier 5, thereby generating a reproduction signal 6. As described above, the division line of the two-divided photodetector 4 is perpendicular to the information track of the magnetooptical disk 24. Of all light components, light components incident on the two-divided photodetector 4 are the S-polarized light beam produced by the magnetooptic effect, and the S-polarized light beam produced at the curved surface of the objective lens 23.

Figure 2:
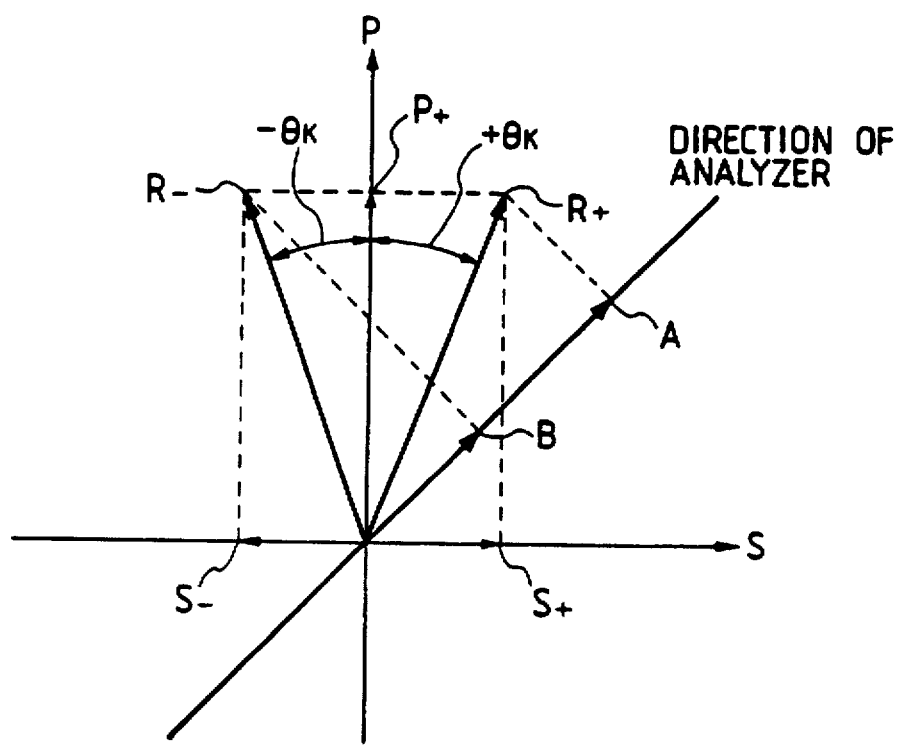
FIG. 2 is a view showing the polarization direction of a linearly polarized light component incident on the magnetooptical recording medium, the state of rotation of the reflected light on the medium in correspondence with the direction of magnetization, and the state of change in the reflected light with respect to an analyzer.

The S-polarized light beams produced by the magnetooptic effect are an $S_+$ beam with respect to upward magnetization and an $S_-$ beam with respect to downward magnetization, as is apparent from FIG. 2. The $S_+$ beam has a phase difference of π from the $S_-$ beam. When the boundary (edge) between upward magnetization and downward magnetization comes in a light spot, light diffraction equal to a pit having a depth of λ/4 (λ is the wavelength of light) occurs, which will be described in detail later. The S-polarized beams produced at the curved surface of the objective lens 23 are given as follows. An arrow A in FIGS. 5A to 5C indicates the direction of information tracks. FIG. 5A shows the distribution of the $S_+$ light produced by the magnetooptic effect with respect to downward magnetization. FIG. 5C shows the distribution of S-polarized diffracted light produced at the curved surface of the objective lens 23 in the absence of the λ/2 plate in the optical head shown in FIG. 3. Although it will be described in detail, superposition of the diffracted light components produced by the magnetooptic effect is poor, and only a DC component is obtained. By arranging the λ/2 plate, the distribution of the diffracted light of the S-polarized light component produced at the curved surface of the objective lens 23 is changed, as shown in FIG. 5B. In the distribution in the form of a four-leaf clover, as shown in FIG. 5B, the opposite leaves are in-phase components, and the adjacent leaves have a phase difference of π. The light in FIG. 5B is incident on the two-divided photodetector 4 regardless of the direction of magnetization on the magnetooptical disk 24. The amplitude of the light on the section along the line B-B' in FIG. 5B is shown in FIG. 6. In this embodiment, the light beam produced at the curved surface of the objective lens 23, as shown in FIG. 5B, is interfered with the light beam produced by the magnetooptic effect. A change in resultant light amount distribution is detected to reproduce the information.

Figure 7:
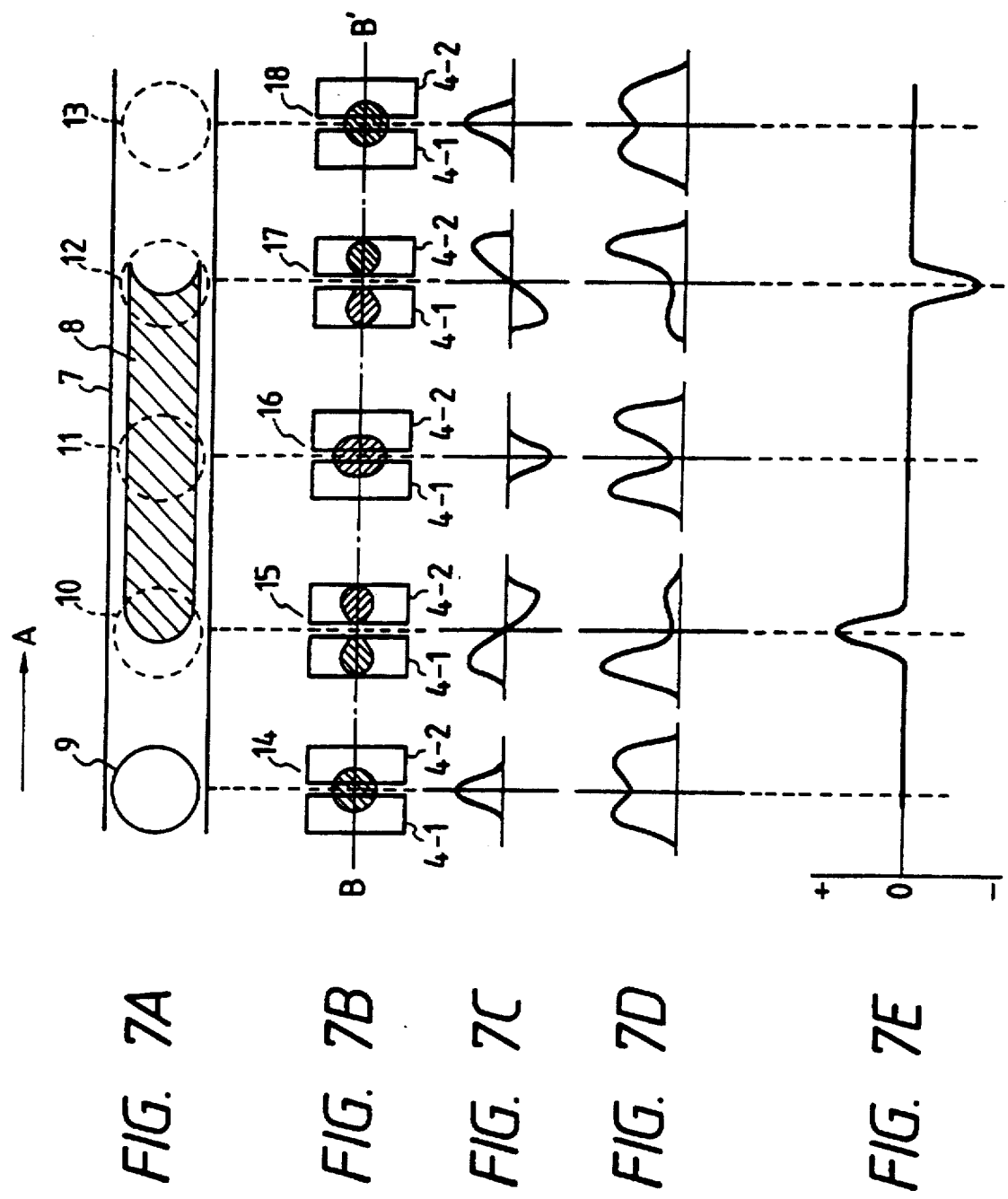
FIGS. 7A to 7E are views for explaining an information reproduction operation of the embodiment shown in FIG. 3.

The information reproduction operation will be described in detail with reference to FIGS. 7A to 7E. FIG. 7A is a view showing a recorded information pit (domain) and a reproduction light spot. A domain 8 is recorded on an information track 7 in accordance with the magnetic field modulation scheme. The recording scheme may be an optical modulation scheme. In this embodiment, the magnetization of the magnetooptical disk 24 faces downward in initialization, so that the direction of magnetization of the domain 8 recorded on the information track 7 is upward. A light spot 9 scans the information track 7 recorded with the domain 8 in the A direction, as indicated by 10, 11, 12, and 13. FIG. 7B is a view showing light distributions on the two-divided photodetector 4 so as to correspond to the respective light spot positions of FIG. 7A. At the positions of the light spots 9 and 13, since all the directions of magnetization within the light spots are downward, no light diffraction occurs. The distributions on the two-divided photodetector 4 represent circles, as indicated by 14 and 18. At the positions of the light spots 10 and 12, since the edges between upward and downward magnetization components are located within the light spots, light components parallel to the information track 7 are diffracted, so that each distribution is divided laterally, as indicated by 15 or 16. The phase difference between the right and left light components becomes π. In this case, the phase of 15 is opposite to that of 17. In addition, at the position of the light spot 11, downward magnetization slightly enters at the upper and lower portions of the light spot, so that the light component is slightly diffracted in a direction perpendicular to the track, so that a distribution 16 slightly elongated in the vertical direction is obtained. In this case, the phase of light has a difference of π from 14 or 18.

FIG. 7C is a view showing the amplitude distribution of light on the two-divided photodetector shown in FIG. 7B along the section of B-B'. At the positions of the light spots 9, 11, and 13, the intensity distributions are symmetrical about the division line. FIG. 7D is a view showing the intensity distribution of light obtained when the distribution of light (FIG. 7C) produced by the magnetooptic effect is interfered with the intensity distribution of light (FIG. 6) produced by diffraction at the curved surface of the objective lens. At the positions of the light spots 9, 11, and 13, the intensity distributions become symmetrical about the division line as in FIG. 7C. The intensity distributions at the positions of the light spots 10 and 12 which correspond to the edges of the domain 8 become asymmetrical about the division line. FIG. 7E shows a reproduction signal obtained by differentially detecting output signals from the photodetection surfaces 4-1 and 4-2 of the two-divided photodetector 4 by the differential amplifier 5. Since the intensity distributions on the B-B' section of the two-divided photodetector 4 are symmetrical about the division line at the positions of the light spots 9, 11, and 13, differential detection by the differential amplifier 5 results in an output signal of "0", as shown in FIG. 7E. That is, no reproduction signal appears. To the contrary, since the intensity distributions at the positions of the light spots 10 and 12 which correspond to the edges of the domain 8 are asymmetrical about the division line, a reproduction signal having a positive or negative peak, as shown in FIG. 7E, is obtained. By detecting the positive and negative peak positions of the reproduction signal, the edges of the domain 8 can be detected.

In this embodiment, the light produced by the magnetooptic effect of the magnetooptical disk 24 is interfered with the light produced by diffraction at the curved surface of the objective lens 23, and a change in light amount distribution is detected. Therefore, the conventional polarizing beam splitter required for detecting the light components along the P- and S-axes can be omitted, thereby simplifying the arrangement of the optical head accordingly. Since the edge of the domain is optically directly detected, the edge position of the domain can be accurately detected regardless of the size of the domain and the size of the light spot.

Figure 8:
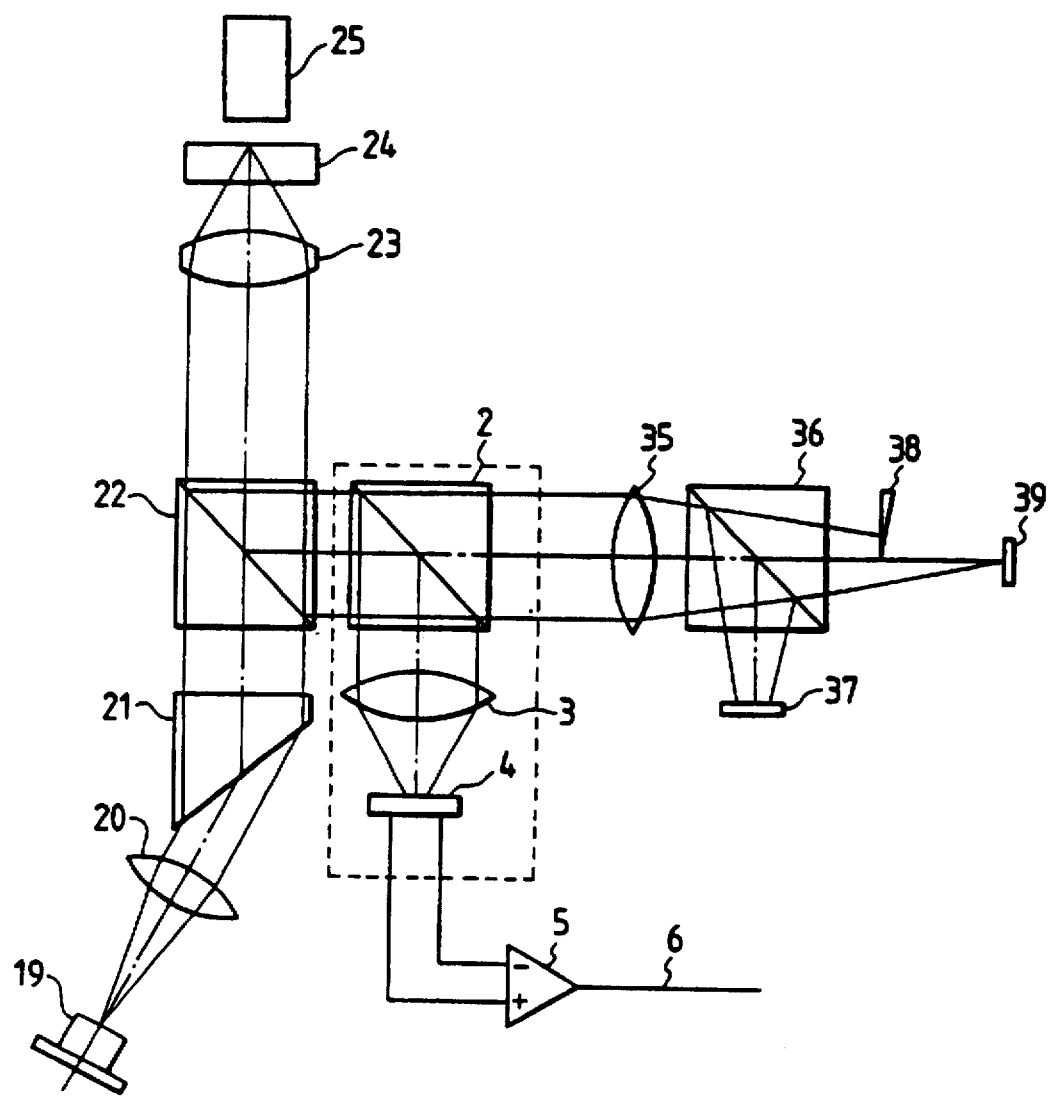
FIG. 8 is a view showing a magnetooptical information recording/reproducing apparatus according to another embodiment of the present invention.

FIG. 8 is a constructional view showing a magnetooptical information recording/reproducing apparatus according to another embodiment of the present invention. In this embodiment, the division line of a two-divided photodetector 4 is parallel to information tracks of a magnetooptical disk 24. Detection signals from the photodetection portions of the two-divided photodetector 4 are differentially detected to generate a reproduction signal. The $\lambda/2$ plate 1 used in the embodiment of FIG. 3 is not used in this embodiment. Other constructions are the same as those of the embodiment of FIG. 3, and a detailed description thereof will be omitted. A light beam from a semiconductor laser 19 is a linearly polarized light component (P-polarized light component) having the polarization direction parallel to the drawing surface as in the embodiment of FIG. 3. This light beam is radiated on the magnetooptical disk 23 through a collimator lens 20, a beam shaping prism 21, a polarizing beam splitter 22, and an objective lens 23. The objective lens 23 has an NA of about 0.55 as in the above embodiment and has a large curvature surface. The incident P-polarized light beam is converged by the objective lens 23 into a minute light spot. This light spot is formed on the magnetooptical disk 24. At this time, the polarization direction of the P-polarized light beam is parallel or perpendicular to the track of the magnetooptical disk 24. When the light beam is incident on the magnetooptical disk 24, a P-polarized light component and an S-polarized light component perpendicular to the P-polarized light component are produced by the magnetooptic effect (a Kerr or Faraday effect) of the disk. The light beam incident on the magnetooptical disk 24 is reflected by the medium surface and passes through the objective lens 23 again, thereby obtaining a collimated beam. This collimated beam contains an S-polarized light component produced at the curved surface of the objective lens 23 in addition to the S-polarized light component produced by the magnetooptical disk 24.

The light beam reflected by the magnetooptical disk 24 is reflected by the polarizing beam splitter 22 and is guided to a polarizing beam splitter 2. The characteristics of the polarizing beam splitter 2 are given such that the transmittance for the P-polarized light component is 100%, the reflectance for the P-polarized light component is 0%, the transmittance for the S-polarized light component is 0%, and the reflectance for the S-polarized light component is 100%. The P-polarized light beam passes through the polarizing beam splitter 2 and is guided to the control optical system. The S-polarized light beam is reflected and guided to a condenser lens 3 in the reproduction optical system. Error signals for autofocusing control and autotracking control are generated in the control optical system. The S-polarized light beam guided to the condenser lens 3 is detected by the photodetection portions of the two-divided photodetector 4. Detection signals from the photodetection portions are differentially detected by a differential amplifier 5 to produce a reproduction signal 6. The division line of the two-divided photodetector 4 is parallel to the track of the magnetooptical disk 24. Light components incident on this photodetector 4 are the S-polarized light beam produced by the magnetooptic effect and the S-polarized light beam produced at the curved surface of the objective lens 23. The S-polarized light beams produced by the magnetooptic effect are the $S_+$ light beam with respect to upward magnetization and the $S_-$ light beam with respect to downward magnetization. When the boundary (edge) of the upward magnetization and the downward magnetization enters into a reproduction light spot, light diffraction as in a pit having a depth of $\lambda/4$ ($\lambda$ is the wavelength of light) occurs.

Figure 9A:
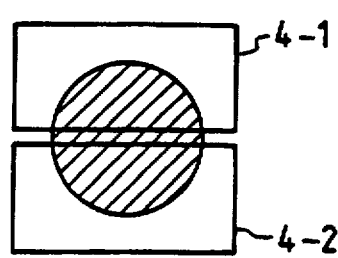
FIGS. 9A and 9B are views showing distributions of light components diffracted at the curved surface of an objective lens in the embodiment shown in FIG. 8.
Figure 9B:
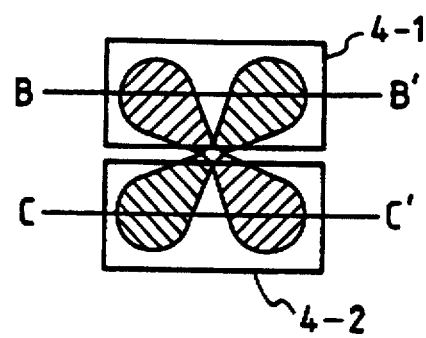
Figure 10A:
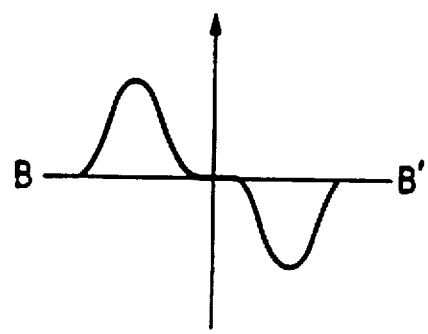
FIGS. 10A and 10B are views showing the amplitudes of the light components along the lines B-B' and C-C'.
Figure 10B:
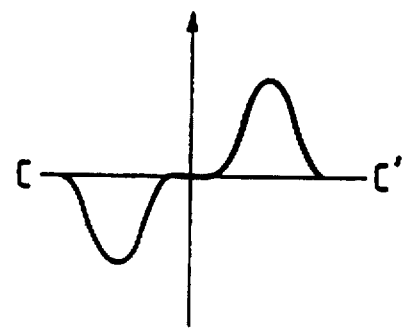

The S-polarized light beams produced at the curved surface of the objective lens 23 are as follows. As shown in FIGS. 9A and 9B, the two-divided photodetector 4 has photodetection portions having detection surfaces 4-1 and 4-2. An arrow A indicates the track direction. FIG. 9A shows the distribution of the $S_+$ light beam produced by the magnetooptic effect with respect to downward magnetization, and FIG. 9B shows the distribution of the diffracted light of the S-polarized light component produced at the curved surface of the objective lens 23. The distribution in FIG. 9B has the form of a four-leaf clover. The opposite leaves are in-phase components, and the adjacent leaves have a phase different of $\pi$. That is, light components of the opposite leaves within the detection surfaces 4-1 and 4-2 are in-phase components, and light components of the adjacent leaves within the detection surfaces 4-1 and 4-2 have a phase difference of $\pi$. This light distribution in FIG. 9B appears on the two-divided photodetector regardless of the direction of magnetization on the magnetooptical disk 24. FIGS. 10A and 10B are views showing the amplitudes of the light components on the sections along the lines B-B' and C-C' in FIG. 9B. As described above, FIG. 10A shows the amplitude along the line B-B', and FIG. 10B shows the amplitude along the line C-C', in accordance with the phase relationship in the form of the four-leaf clover. In this embodiment, the light beam produced by the magnetooptic effect, as shown in FIG. 9A, is interfered with the light beam produced at the curved surface of the objective lens 23, as shown in FIG. 9B, and the change in light amount distribution is detected to reproduce information.

The information reproduction operation will be described in more detail with reference to FIGS. 11A to 11F. FIG. 11A shows a reproduction light spot and a recorded information pit (domain). A domain 8 is recorded on an information track 7 in accordance with the magnetic field modulation scheme. The recording scheme may be an optical modulation scheme. In this embodiment, the magnetization of the magnetooptical disk 24 faces downward in initialization, so that the direction of magnetization of the domain 8 is upward. A light spot 9 scans the information track 7 recorded with the domain 8, in the A direction, as indicated by 10, 11, 12, and 13. FIG. 11B is a view showing light distributions of the S-polarized light components produced by the magnetooptic effect on the two-divided photodetector 4 so as to correspond to the respective light spot positions of FIG. 11A. The two-divided photodetector 4 has the detection surfaces 4-1 and 4-2. At the positions of the light spots 9 and 13, since all the directions of magnetization within the light spots are downward, no light diffraction occurs. The distributions on the two-divided photodetector 4 represent circular shapes. At the positions of the light spots 10 and 12, since the edges of the domain 8 are located within the light spots, and the upward magnetization and downward magnetization are mixed, light components parallel to the information track 7 are diffracted, so that each distribution is divided laterally. The phase difference between the right and left light components becomes $\pi$. In this case, the phase of the right component is opposite to that of the left component at the positions of the light spots 10 and 12. In addition, at the position of the light spot 11, the direction of magnetization is almost upward, and no diffraction of light occurs, thereby providing the illustrated light distribution. At this time, the light has a phase difference of $\pi$ from the positions of the light spots 9 and 13.

FIG. 11C is a view showing the amplitude distribution of light on the two-divided photodetector shown in FIG. 11B along the section of D-D'. FIGS. 11D and 11E are views showing the intensity distributions of the light components obtained by interfering the distribution of light in FIG. 11B with the distribution of the light shown in FIG. 9B on the two-divided photodetector 4. FIG. 11D shows the intensity distribution along the line B-B', and FIG. 11E shows the intensity distribution along the line C-C'. In the distributions of FIGS. 11D and 11E, at the positions of the light spots 9, 11, and 13, the right and left distributions on the two-divided photodetector 4 are asymmetrical, but the amount of light on the detection surface 4-1 is equal to that on the detection surface 4-2. At the positions of the light spots 10 and 12 where the edges of the domain 8 are located, the right and left distributions are symmetrical with each other, but the amount of light on the detection surface 4-1 is different from that on the detection surface 4-2. When detection signals from the detection surfaces 4-1 and 4-2 are differentially detected by the differential amplifier 5, no reproduction signal appears at the positions of the light spots 9, 11, and 13 where the amounts of light on detection surfaces 4-1 and 4-2 are equal to each other, as shown in FIG. 11F. A reproduction signal having a positive or negative peak appears at only a position of each of the light spots 10, and 12 where the amount of light on the detection surface 4-1 is different from that on the detection surface 4-2. The positive and negative peak positions of the reproduction signals are detected to detect the edges of the domain 8. In this embodiment, the structure of the optical head can be simplified as in the embodiment of FIG. 3, and the edge positions of the domain can be accurately detected.

Figure 12:
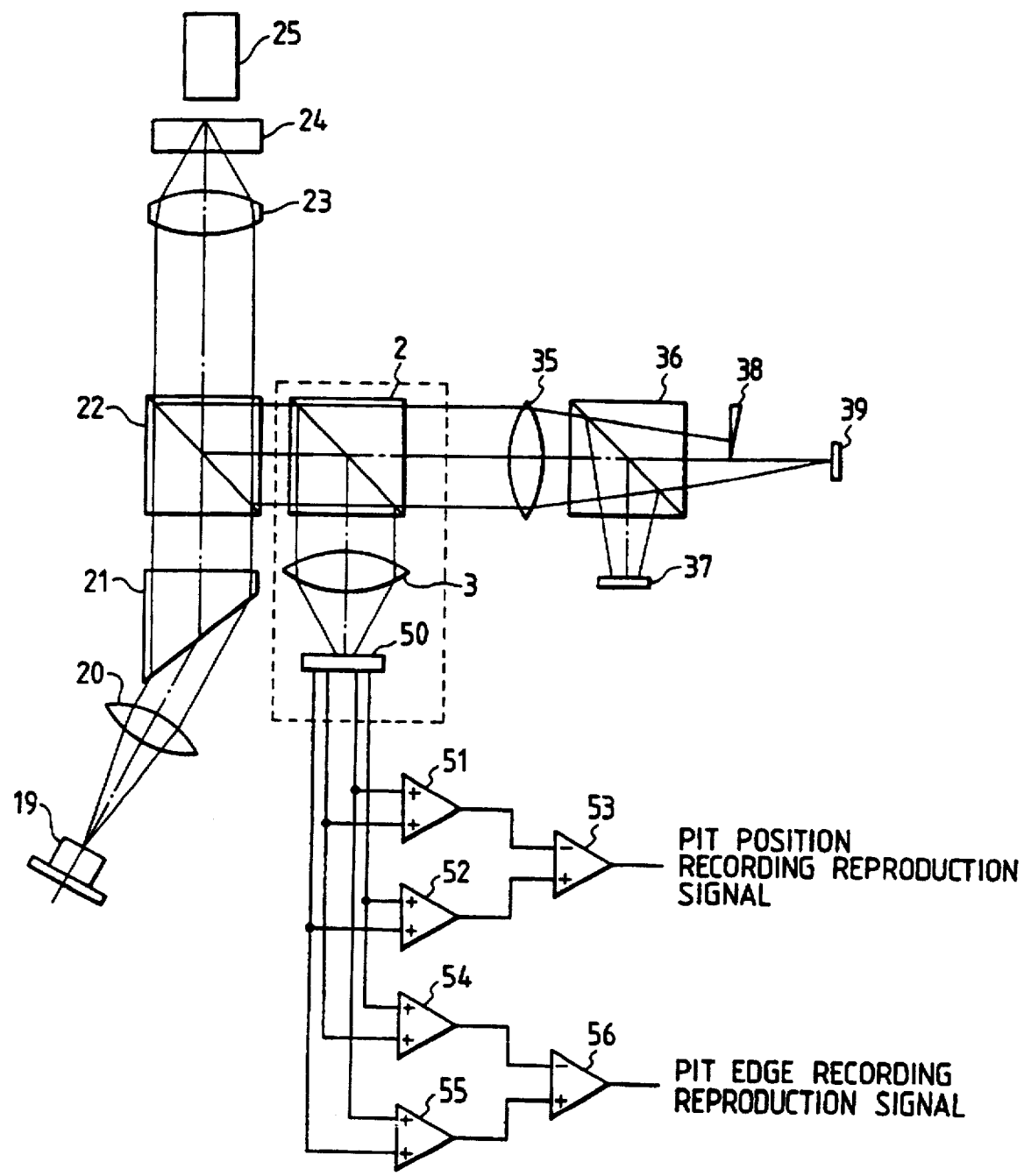
FIG. 12 is a constructional view showing a magnetooptical information recording/reproducing apparatus according to still another embodiment of the present invention.

FIG. 12 is a constructional view showing a magnetooptical information recording/reproducing apparatus according to still another embodiment of the present invention. In this embodiment, a reproduction signal can be obtained from a pit position recording scheme or a pit edge recording scheme by using a four-divided photodetector as a photodetector. Referring to FIG. 12, a four-divided photodetector 50 detects light reflected by a magnetooptical disk 24. Addition amplifiers 51 and 52 add detection signals from diagonal detection surfaces of the four-divided photodetector 50. A differential amplifier 53 differentially detects outputs from the addition amplifiers 51 and 52 to generate a reproduction signal of information of the pit position recording scheme. Addition amplifiers 54 and 55 add detection signals from the adjacent detection surfaces parallel to the track of the four-divided photodetector 50. A differential amplifier 56 differentially detects output signals from the addition amplifiers 54 and 55 to reproduce information of the pit edge recording scheme. Other constructions of this embodiment are the same as those of the embodiment shown in FIG. 8, and a detailed description thereof will be omitted. In this embodiment, the information recording scheme is a magnetic recording scheme, focusing control is performed by a knife edge scheme, and tracking control is performed by a push-pull scheme as in the above embodiment. In addition, a light beam from a semiconductor laser 19 is a linearly polarized light component (P-polarized light components having the polarization direction parallel to the drawing surface.

Figure 13A:
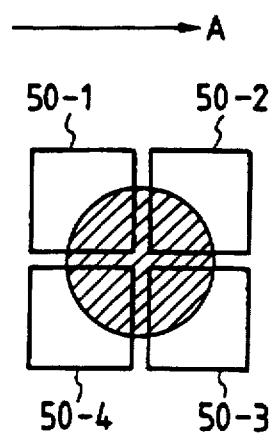
FIGS. 13A and 13B are views showing the distributions of light components diffracted at the curved surface of an objective lens of the embodiment shown in FIG. 12.
Figure 13B:
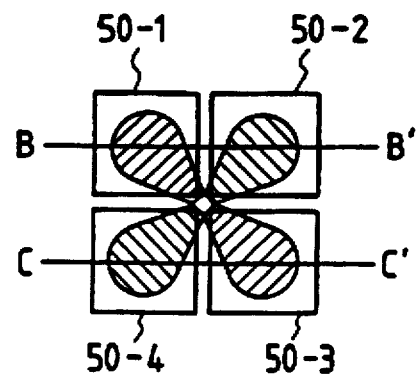

The entire detection surface of the four-divided photodetector 50 is divided into four portions in a crossed shape. One of the division lines of the four-divided photodetector 50 is parallel to the track direction of the magnetooptical disk 24, and the other division line is perpendicular thereto. The light beams incident on the four-divided photodetector 50 are the S-polarized light beam produced by the magnetooptic effect as described above and the S-polarized light beam produced at the curved surface of an objective lens 23. The S-polarized light beams produced by the magnetooptic effect have been described with reference to the embodiments shown in FIGS. 3 and 8. The S-polarized light beams produced at the curved surface of the objective lens 23 are basically the same as those of the embodiment of FIG. 8. However, since the number of detection surfaces of this embodiment is different from that of the embodiment shown in FIG. 8, the detection surfaces of the four-divided photodetector 50 and the light distributions on the detection surfaces are shown in FIGS. 13A and 13B. Referring to FIGS. 13A and 13B, the four-divided photodetector 50 has four detection surfaces 50-1 to 50-4. An arrow A indicates the track direction. FIG. 13A shows the distribution of the $S_+$ light beam produced by the magnetooptic effect with respect to downward magnetization. FIG. 13B shows the distribution of the diffracted light of the S-polarized light component produced at the curved surface of the objective lens 23. In the distribution in the form of a four-leaf clover, as shown in FIG. 13B, opposite leaves are in-phase components, and adjacent leaves have a phase difference of $\pi$. The light in the form of a four-leaf clover shown in FIG. 13B is distributed on the four-divided photodetector 50 regardless of the direction of magnetization of the magnetooptical disk 24. The amplitudes of the light components along the lines B-B' and C-C' in FIG. 13B are as shown in FIGS. 10A and 10B. In this embodiment, the light beam produced at the curved surface of the objective lens 23, as shown in FIG. 13B, is interfered with the light beam produced by the magnetooptic effect, and a change in light amount distribution is detected, thereby reproducing the information.

Figure 14A:
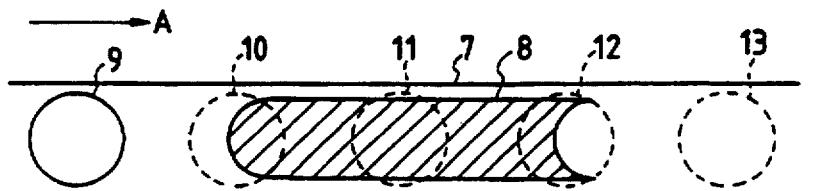
FIGS. 14A to 14G are views for explaining an information reproduction operation of the embodiment shown in FIG. 12.
Figure 14B:
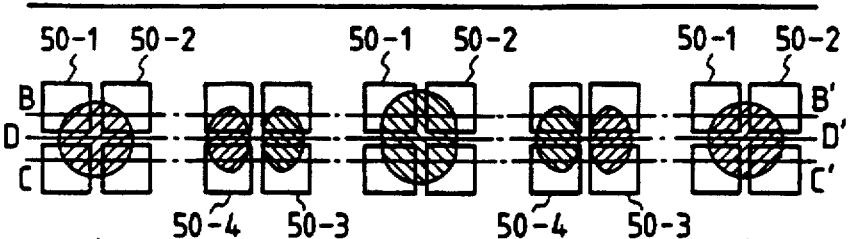

The information reproduction operation will be described in more detail with reference to FIGS. 14A to 14G. FIG. 14A is a view showing a reproduction light spot and an information pit (domain). A domain 8 is recorded on an information track 7 by the magnetic field modulation scheme. However, the recording scheme may be a light modulation scheme. The magnetization of the magnetooptical disk 24 is entirely initialized downward, and the direction of magnetization of the domain 8 is upward. A light spot 9 scans the information track 7 along the A direction, as indicated by 10, 11, 12, and 13. FIG. 14B is a view showing the distribution of the S-polarized light produced by the magnetooptic effect on the four-divided photodetector 50 at the respective positions of the light spots shown in FIG. 14A. The light distribution on the four-divided photodetector 50 is the same as that of the embodiment shown in FIG. 8 (FIGS. 11A to 11F). More specifically, at the positions of the light spots 9 and 13, all the directions of magnetization within the light spots are downward, no diffraction of light occurs, and the distributions on the four-divided photodetectors 50 assume a circular shape, respectively. At the positions of the light spots 10 and 12, since the edges of the domain 8 are located within the light spots, the light is diffracted parallel to the track 7, so that the light distribution is divided into right and left distributions, as shown in FIG. 14B. Since the direction of magnetization within the light spot at the position of the light spot 11 is almost upward, the illustrated distribution is obtained almost free from the diffraction of the light.

Figure 14C:
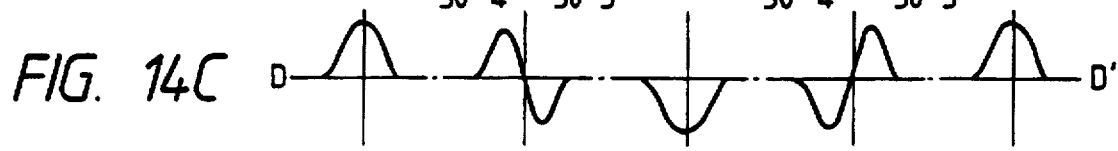
Figure 14D:
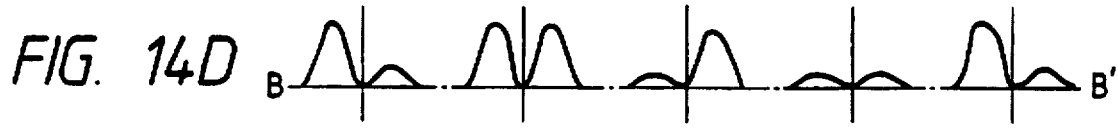
Figure 14E:
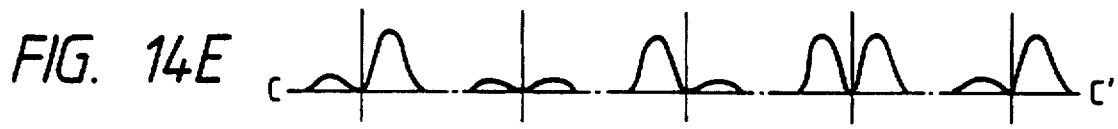

FIG. 14C is a view showing the amplitude of the light on the section along the line D-D' of FIG. 14B. FIGS. 14D and 14E are views showing the intensity distributions of light components obtained when the distribution of the light diffracted at the curved surface of the objective lens, as shown in FIG. 13B is interfered with the distribution of the light produced by the magnetooptic effect, as shown in FIG. 14B, on the four-divided photodetector 50. FIG. 14D shows the intensity distribution along the line B-B', and FIG. 14E shows the intensity distribution along the line C-C'. The amplitudes and intensity distributions of these light components are the same as those described with reference to FIGS. 11A to 11F. The intensities of the positions of the light spots 9 and 13 on the detection surfaces 50-1 and 50-3 are higher than those on the detection surfaces 50-2 and 50-4. In this case, the intensity of the detection surface 50-1 becomes equal to that of the detection surface 50-3, and the intensity of the detection surface 50-2 becomes equal to that of the detection surface 50-4. To the contrary, the intensities of the position of the light spot 11 on the detection surfaces 50-2 and 50-4 are higher than those on the detection surfaces 50-1 and 50-3. In this case, the intensity of the detection surface 50-2 becomes equal to that of the detection surface 50-4, and the intensity of the detection surface 50-1 becomes equal to that of the detection surface 50-3. At the position of the light spot 10 where the left edge of the domain 8 is located, the intensities of the detection surfaces 50-1 and 50-2 are higher than those of the detection surfaces 50-3 and 50-4. At this time, the intensity of the detection surface 50-1 becomes equal to that of the detection surface 50-2, and the intensity of the detection surface 50-3 becomes equal to that of the detection surface 50-4. At the position of the light spot 12 where the right edge of the domain 8 is located, the intensities of the detection surfaces 50-3 and 50-4 are higher than those of the detection surfaces 50-1 and 50-2. At this time, the intensity of the detection surface 50-3 becomes equal to that of the detection surface 50-4, and the intensity of the detection surface 50-1 becomes equal to that of the detection surface 50-2.

Figure 14F:
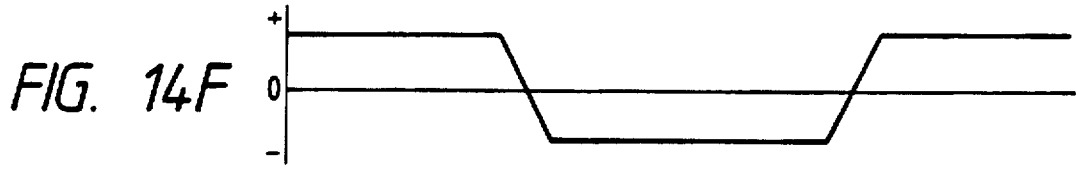
Figure 14G:
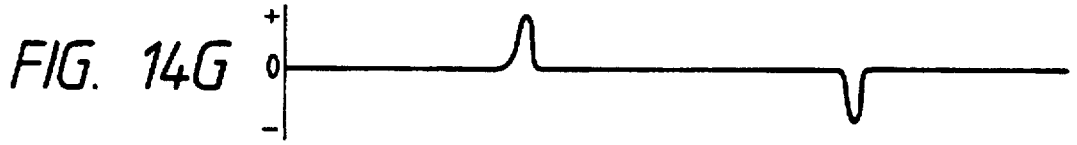

The detection signals from the detection surfaces of the four-divided photodetector 50 are output to the addition amplifiers 51, 52, 54, and 55, as described with reference to FIG. 12. The detection signals from the diagonal detection surfaces 50-1 and 50-3 and the diagonal detection surfaces 50-2 and 50-4 are added by the addition amplifiers 51 and 52, respectively. The resultant sum signals from the addition amplifiers 51 and 52 are differentially detected by the differential amplifier 53, thereby obtaining a reproduction signal, as shown in FIG. 14F. That is, a positive signal is obtained in the region where the direction of magnetization is downward, while a negative signal is obtained in the region where the direction of magnetization is upward. A reproduction signal which rises or falls at the edge of the domain and corresponds to the pit position recording can be obtained. The detection signals from the detection surfaces 50-1 and 50-2 adjacent to each other in the track direction and the detection surfaces 50-3 and 50-4 adjacent to each other in the track direction are added by the addition amplifiers 54 and 55. The resultant sum signals are differentially detected by the differential amplifier 56, thereby obtaining a reproduction signal, as shown in FIG. 14G. That is, a reproduction signal having a positive or negative peak at the edge of the domain 8 is obtained, thereby obtaining the reproduction signal corresponding to the pit edge recording.

Figure 15:
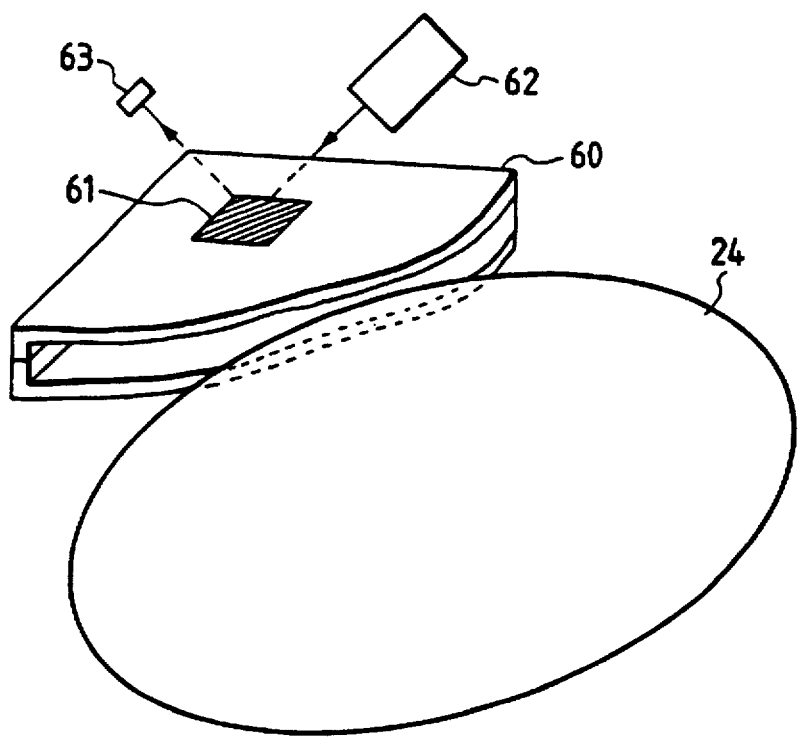
FIG. 15 is a view showing a recording scheme discrimination mark added to the case of a magnetooptical disk, and a sensor for detecting the mark.

In this embodiment, the information recording/reproducing apparatus corresponding to either pit position recording or pit edge recording has been described. When a recording medium is inserted into the apparatus, it is desirable that reproduction in pit position recording or pit edge recording can be automatically selected in accordance with the type of recording medium. A selective switching control device will be exemplified below. As shown in FIG. 15, a mark 61 representing a pit position recording disk or a pit edge recording disk is added to a case 60 of the magnetooptical disk 24. The mark 61 can be optically detected. For example, a mark having a high reflectance represents a pit position recording disk, while a mark having a low reflectance represents a pit edge recording disk. On the other hand, light-emitting diodes 62 and 63 are provided on the apparatus. When the disk is inserted into the apparatus, light is emitted from the light-emitting diode 62 to the mark 61, and light reflected by the mark 61 is received by the photosensor 63. When the magnetooptical disk 24 is inserted into the apparatus, signal reproduction is controlled and switched in accordance with the sequence shown in FIG. 16. That is, the magnetooptical disk is inserted into the apparatus (step 1). The mark 61 of the disk case 60 is investigated on the basis of a detection signal from the photosensor 63 (step 2). It is determined in step 3 whether the disk is a pit position recording disk or a pit edge recording disk. Reproduction corresponding to pit position recording (step 4) or pit edge recording (step 5) is selected in accordance with the determination result. When the magnetooptical disk is inserted into the apparatus, the signal reproduction corresponding to the disk recording scheme can be automatically selected.

When information is to be recorded in the form of a pit, a pit position recording scheme in which the central position of the pit represents meaningful information or a pit edge recording scheme in which the edge position of the pit represents meaningful information is available. FIGS. 17A to 17E are views for explaining these two recording schemes. FIG. 17A shows a pit train obtained in pit position recording. The sizes of the pits are almost identical among adjacent pits. FIG. 17B shows a detection signal obtained by optically reproducing the pit train shown in FIG. 17A. FIG. 17C shows a pit train obtained in pit edge recording. FIG. 17D shows a detection signal obtained by optically reproducing the pit train in FIG. 17C. In order to detect an edge position of each pit from the detection signal, for example, a slice level is electrically set, and a position where the detection signal in FIG. 17D crosses the slice level is obtained. FIG. 17E shows an edge detection signal.

According to the embodiment described above, a magnetooptical information recording/reproducing apparatus in which a light beam is radiated on a magnetooptical recording medium and information recorded on the recording medium is reproduced from the light reflected by the recording medium is characterized in that light produced by magnetooptic effect of the magnetooptical recording medium is interfered with light produced by diffraction at a curved surface of a lens for converging the light beam radiated on the recording medium into a minute light spot, and the interference light is detected by a photodetector, thereby reproducing the recorded information.

The magnetooptical information recording/reproducing apparatus includes a λ/2 plate, arranged in an optical path of light incident on the magnetooptical recording medium, for rotating the polarization direction through about 45° with respect to an information track of the recording medium, and a polarizing beam splitter for splitting the light reflected by the recording medium into linearly polarized light components having the polarization directions parallel and perpendicular to the polarization direction of the incident light, wherein the split light components are detected by a two-divided photodetector having detection surfaces divided in a direction perpendicular to the information track, and detection signals from the detection surfaces of the photodetector are differentially detected, thereby reproducing the information.

In the magnetooptical information recording/reproducing apparatus, a polarizing beam splitter is arranged to split the light reflected by the magnetooptical recording medium into linearly polarized light components having the polarization directions parallel and perpendicular to the polarization direction of the incident light, the split light components are detected by a two-divided photodetector having detection surfaces divided in a direction parallel to the information track, and detection signals from the detection surfaces of the photodetector are differentially detected, thereby reproducing the information.

In the magnetooptical information recording/reproducing apparatus, a polarizing beam splitter is arranged to split the light reflected by the magnetooptical recording medium into linearly polarized light components having the polarization directions parallel and perpendicular to the polarization direction of the incident light, the split light components are detected by a four-divided photodetector having detection surfaces divided in directions parallel and perpendicular to the information track, and a predetermined analog operation is performed using detection signals from the detection surfaces of the photodetector, thereby performing signal reproduction corresponding to pit position recording or pit edge recording.

In the magnetooptical information recording/reproducing apparatus, the detection signals from the diagonal detection surfaces of the four-divided photodetectors are added to each other, and the resultant sum signals are differentially detected, thereby reproducing information corresponding to pit position recording.

In the magnetooptical information recording/reproducing apparatus, the detection signals from the adjacent detection surfaces of the four-divided photodetectors along the direction of information tracks are added to each other, and the resultant sum signals are differentially detected, thereby reproducing information corresponding to pit edge recording.

In the magnetooptical information recording/reproducing apparatus, a means for detecting medium identification information added to the magnetooptical recording medium is used to determine whether the medium identification information represents a pit edge recording medium or a pit position recording medium, thereby selecting signal reproduction corresponding to pit position recording or pit edge recording in accordance with this determination result.

As described above, this embodiment has the following effects.

(1) The light produced by the magnetooptic effect of the magnetooptical recording medium is interfered with the light produced by diffraction at the curved surface of the objective lens, and a change in light amount distribution is detected, so that the number of components constituting the optical head can be reduced, thereby obtaining a compact, lightweight, low-cost optical head.

(2) A conventional problem posed such that the detection position of the pit edge is shifted when the size of the pit becomes equal to that of the light spot so as to optically and directly detect the edge of the recording pit can be solved. Therefore, the position of the pit edge can be accurately detected regardless of the size of the pit, thereby greatly improving reliability of a reproduction signal according to the pit edge recording scheme.

(3) Light is detected by the four-divided photodetector having detection surfaces divided in directions parallel and perpendicular to the information track, and the predetermined analog operation is performed using the detection signals from the detection surfaces. Therefore, information reproduction can be performed from a pit position recording medium or a pit edge recording medium using a single apparatus.

Figure 18:
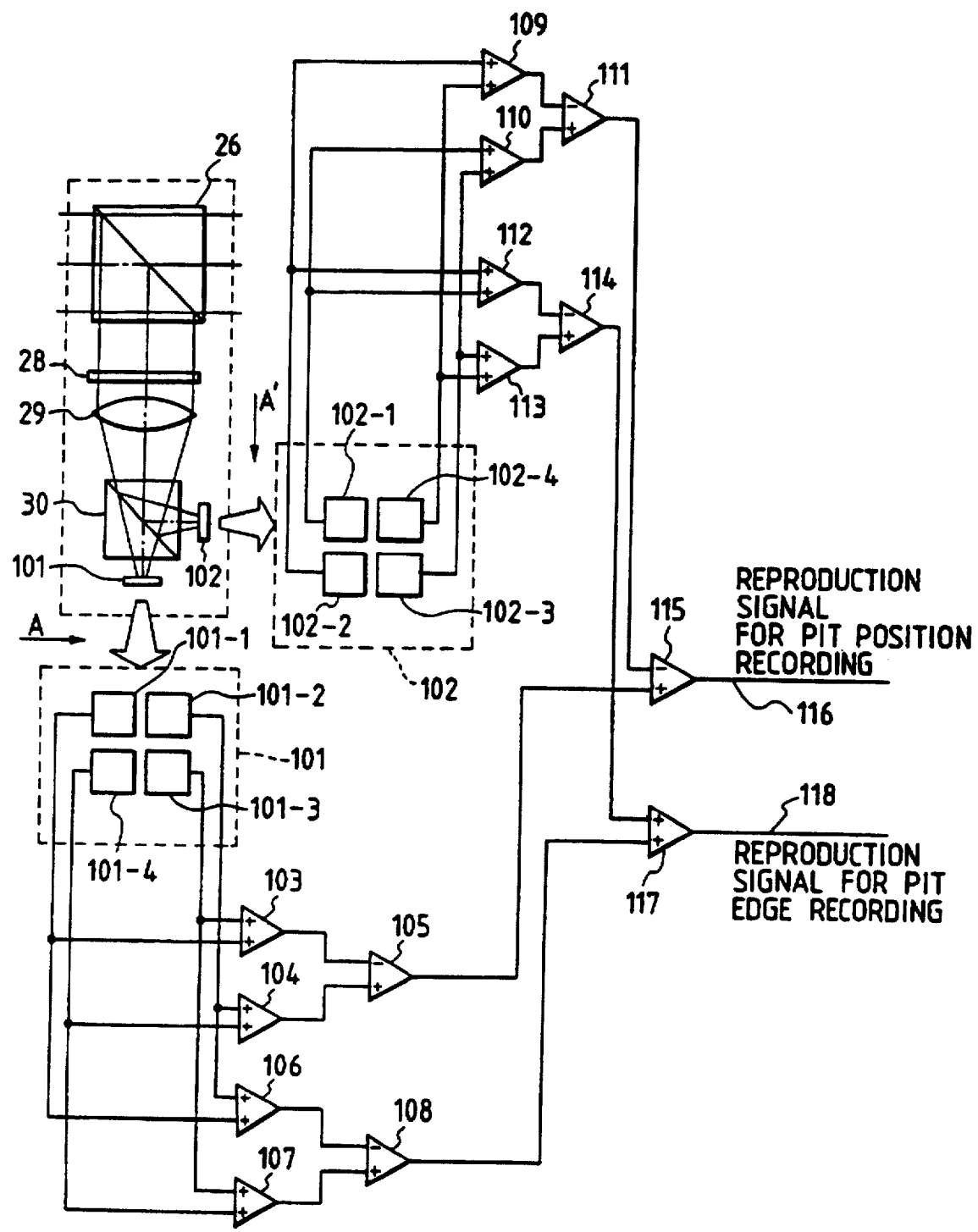
FIG. 18 is a constructional view showing a magnetooptical information recording/reproducing apparatus according to still another embodiment of the present invention.

Still another embodiment of the present invention will be described in detail with reference to the accompanying drawings. FIG. 18 is a constructional view showing a magnetooptical information recording/reproducing apparatus according to this embodiment. More specifically, FIG. 18 shows only the arrangement of a reproduction optical system as the main part of this embodiment. Other constructions of this embodiment are substantially the same as those in FIG. 1, and identical parts are omitted in FIG. 18. In this embodiment, an objective lens 23 has a curved surface having a large curvature corresponding to an NA of about 0.5 or more. Referring to FIG. 18, the reproduction optical system includes a polarizing beam splitter 26, a λ/2 plate 28, a condenser lens 29, and a polarizing beam splitter 30 serving as an analyzer. These optical components are identical to those in FIG. 1. Each of four-divided photodetectors 101 and 102 has four divided detection surfaces. The detection surfaces of the four-divided photodetectors 101 and 102 are illustrated in FIG. 18, and the directions of the information tracks of a magnetooptical disk 24 are indicated by arrows A and A' so as to clarify the relative positional relationship with the magnetooptical disk 24. The four-divided photodetector 101 has detection surfaces 101-1 to 101-4, and the arrow A represents the direction of the information tracks. The four-divided photodetector 102 has detection surfaces 102-1 to 102-4, and the arrow A' represents the direction of the information track. The right and left detection surfaces of the four-divided photodetector 101 correspond to the left and right detection surfaces of the four-divided photodetector 102 so as to receive light through the polarizing beam splitter 30 serving as an analyzer. That is, the detection surfaces 101-1 and 102-1, the detection surfaces 101-2 and 102-2, the detection surfaces 101-3 and 102-3, and the detection surfaces 101-4 and 102-4 correspond to each other.

Addition amplifiers 103 and 104 add detection signals from the diagonal detection surfaces of the four-divided photodetector 101. Addition amplifiers 106 and 107 add the detection signals from the detection surfaces adjacent to each other along the direction of the information tracks of the four-divided photodetector 101. A differential amplifier 105 differentially detects the sum signals from the addition amplifiers 103 and 104. A differential amplifier 108 differentially detects the sum signals from the addition amplifiers 106 and 107. Addition amplifiers 109 and 110 add the detection signals from the diagonal detection surfaces of the four-divided photodetector 102. Addition amplifiers 112 and 113 add the detection signals from detection surfaces adjacent to each other along the direction of the track of the four-divided photodetector 102. A differential amplifier 111 differentially detects the sum signals from the addition amplifiers 109 and 110. A differential amplifier 114 differentially detects the sum signals from the addition amplifiers 112 and 113. A differential amplifier 115 differentially detects the output signals form the differential amplifiers 105 and 111. A signal obtained upon differential detection serves as a reproduction signal 116 corresponding to pit position recording. An addition amplifier 117 adds the output signals from the differential amplifiers 108 and 114. A sum signal from the addition amplifier 117 serves as a reproduction signal 118 corresponding to pit edge recording.

The operation of this embodiment will be described below. A light beam emitted from a semiconductor laser 19 is a linearly polarized light component (P-polarized light component) having the polarization direction parallel to the drawing surface in the same manner as in the conventional case. When this light beam is incident on the objective lens 23, the polarization plane is rotated because the objective lens 23 has a large curvature and the reflectance for the incident light beam is greatly different from that for the perpendicularly polarized light component. When only the polarized components perpendicular to the polarization plane of the incident light beam are taken into consideration, a diffracted image has the form of a four-leaf clover (to be described later). The light beams incident on the four-divided photodetectors 101 and 102 are the polarized light components having the same polarization direction as that of the incident $P_+$ light and the polarized light component perpendicular thereto. Of these light components, $S_+$ and $S_-$ light components produced by the Kerr or Faraday effect of the magnetooptical disk 24, and the light components produced at the curved surface of the objective lens 23 are also included.

Figure 19A:
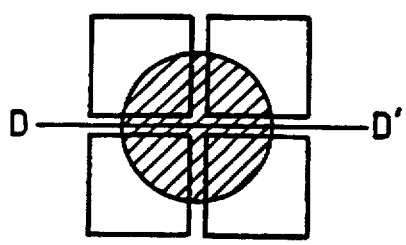
FIGS. 19A and 19B are a view obtained such that the distribution of $P_+$ light immediately before incidence on a polarizing beam splitter is projected on the detection surface of a four-divided photodetector, and a view showing the amplitude of light on the section along the line A-A' on the detection surface, respectively.
Figure 19B:
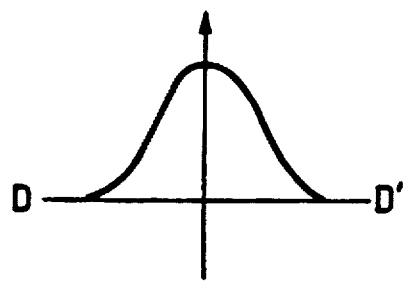
Figure 20A:
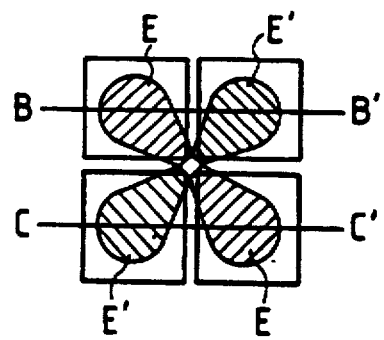
FIGS. 20A to 20C are views obtained such that the distribution of an S-polarized light component at the curved surface of the objective lens immediately before incidence on the polarized beam splitter is projected on the detection surface of the four-divided photodetector, and showing the amplitudes of the light components on the sections along the lines B-B' and C-C' of the detection surfaces, respectively.

FIG. 19A shows $P_+$ light in the distribution of light immediately before incidence on the polarizing beam splitter 30 serving as an analyzer. FIG. 19B is a view showing the amplitude of the $P_+$ light on the section along the line D-D' of FIG. 19A. Four squares shown in FIG. 19A represent the detection surfaces of the four-divided photodetector, and the $P_+$ light is projected on the detection surfaces. In FIG. 19A, the $P_+$light is represented by hatched portions equally distributed on the four detection surfaces. The phases of the light components of the four detection surfaces are almost equal to each other. The amplitude of the light on the section along the line D-D' is shown in FIG. 19B. Of all light components immediately before incidence on the polarizing beam splitter 30 serving as the analyzer, S-polarized light produced at the curved surface of the objective lens 23 is shown in FIG. 20A. This light is projected on the four detection surfaces of the four-divided photodetector in the same manner as described above. As is apparent from FIG. 20A, the light distribution has the form of a four-leaf clover.

Figure 20B:
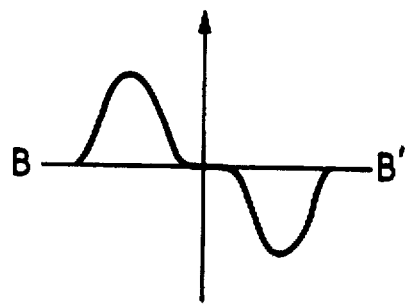
Figure 20C:
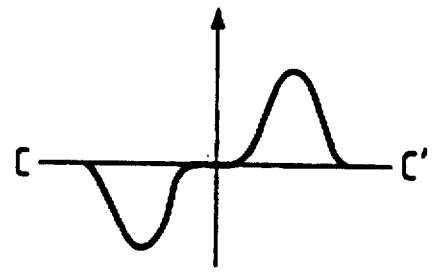

The light components corresponding to the four leaves are projected on the four detection surfaces. The light components corresponding to the diagonal leaves are in-phase components, and the light components corresponding to the adjacent leaves have a phase difference of $\pi$. The light component represented by a leaf E in FIG. 20A and the light component represented in FIG. 19A are in-phase components. FIGS. 20B and 20C are views showing the amplitudes of the light components on the sections along the lines B-B' and C-C' in FIG. 20A. The illustrated amplitudes are obtained in accordance with the relationship between the light components corresponding to the four leaves. The light beams in FIGS. 19A and 19B and FIGS. 20A to 20C have predetermined distributions regardless of the direction of magnetization on the magnetooptical disk 24. According to this embodiment, these two light beams and the $S_+$ and $S_-$ light components changing depending on the magnetization on the magnetooptical recording medium are split by the polarizing beam splitter 30 serving as the analyzer. A change in light amount distribution upon interference between these three light beams is detected on the two four-divided photodetectors 101 and 102, thereby reproducing the information.

Information reproduction will be described in more detail with reference to FIGS. 21A to 21I. FIG. 21A is a view showing a recorded information pit (domain) and a reproduction light spot. A domain 8 is recorded on an information track 7. This embodiment employs a magnetic field modulation scheme. The domain 8 has a shape of the feather of an arrow. An optical modulation scheme may be used in place of the magnetic field modulation scheme. The magnetization of the magnetooptical disk 24 faces downward in initialization, so that the direction of magnetization of the domain 8 is upward. A light spot 9 scans the information track 7 recorded with the domain 8 in the A direction, as indicated by 10, 11, 12, and 13. Arrows A' and A in FIG. 21A correspond to the arrows A' and A shown in FIG. 18. FIG. 21B is a view showing distributions of the S-polarized light components produced by the magnetooptic effect immediately before incidence on the polarizing beam splitter 30 at the respective positions of the light spots in FIG. 21A. Each light spot is projected on the detection surfaces of the four-divided photodetector. At the positions of the light spots 9 and 13, all the directions of magnetization within the light spots are downward, and no diffraction of light occurs, thereby obtaining circular distributions, as indicated by 126 and 130. At this time, the light components are in-phase with the light in FIG. 19A and the light represented by E in FIG. 20A. If the light shown in FIGS. 19A and 19B is the $P_+$ light indicated in FIG. 2, the light distributions 126 and 130 represent the $S_+$ light beams.

At the positions of the light spots 10 and 12, the boundaries between the upward magnetization and the downward magnetization, i.e., the edges of the domain 8, are located within the light spots, light is diffracted in a direction parallel to the information track 7, and the distribution is divided into right and left portions, as indicated by each of distributions 127 and 129. The right and left light components have a phase difference of $\pi$. The phase of the right light component is opposite to that of the left light component. The left light components are represented by 127a and 129a, and the right light components are represented by 127b and 129b in the distributions 127 and 129. The light components 127a and 129b are $S_+$ light components, and the light components 127b and 129a are $S_-$ light components. When the edge of the domain 8 is located within a light spot, the $S_+$ and $S_-$ light components are mixed in the resultant light distribution. At the position of the light spot 11, the direction of magnetization within the light spot is almost upward, and substantially no diffraction of light occurs. An almost circular distribution 128 is obtained. The light in the distribution 128 is the S_ light having a phase difference of π from those of the distributions 126 and 130. FIG. 21C is a view showing the magnitudes of the light components on the section along the line D-D' of FIG. 21B at the respective positions of the light spots. The amplitudes are changed depending on the positions of the light spots.

FIGS. 21D and 21E are views obtained such that the distributions of the light components obtained by interfering the S-polarized light components (FIGS. 20A to 20C) produced at the curved surface of the objective lens 23 with the S-polarized light components (FIG. 21B) produced by the magnetooptic effect are represented in the form of the amplitudes of the light components on the sections along the lines B-B' and C-C' of FIG. 21B. FIGS. 21F and 21G are views showing detection light amount differences on the detection surfaces of the four-divided photodetectors 101 and 102 after the S-polarized light components produced at the curved surface of the objective lens 23, the S-polarized light components produced by the magnetooptic effect, and the $P_+$ light components shown in FIGS. 19A and 19B are synthesized and split into two components which are respectively incident on the four-divided photodetectors 101 and 102. FIG. 21F shows the detection light amount difference on the detection surfaces of the four-divided photodetector 101, and FIG. 21G shows the detection light amount difference on the detection surfaces of the four-divided photodetector 102. Referring to FIGS. 21F and 21G, the light amounts are represented as LL (L: large), LS (S: small), SL, and SS in order from the larger values. As described with reference to FIG. 18, since the light incident on the four-divided photodetector 102 is reflected by the polarizing beam splitter 30, the right or left detection surfaces of the four-divided photodetector 102 correspond to the left or right detection surfaces of the four-divided photodetector 101. When the light distributions on the four-divided photodetectors at the position of the light spot 9 as the left end position in FIGS. 21F and 21G are taken into consideration, the detection surface 101-1 of the four-divided photodetector 101 corresponds to the detection surface 102-1 of the four-divided photodetector 102. The light incident on these detection surfaces is a sum of the large upward amplitude (the $S_+$ direction component shown in FIG. 2) on the left represented by F of the light amplitude on the section along the line B-B' in FIG. 21D and the upward amplitude (the $P_+$ direction component shown in FIG. 2) shown in FIGS. 19A and 19B. That is, the light incident on the above detection surfaces is light rotated in the +Θ side. If the light polarized by the polarizing beam splitter 30 serving as a +45° analyzer is incident on the four-divided photodetector 101, as shown in FIG. 21F, and the light polarized by the polarizing beam splitter 30 serving as a –45° analyzer is incident on the four-divided photodetector 102, as shown in FIG. 21G, the amount of light incident on the detection surface 101-1 is larger than that on the detection surface 102-1. The light amounts are represented as LL on the detection surface 101-1 and LS on the detection surface 102-1 (LL>LS).

The detection surface 101-2 corresponds to the detection surface 102-2. Light incident on these detection surfaces is a sum of the small downward amplitude (the S_ direction component in FIG. 2) on the right side represented by G of the light amplitude on the section along the line B-B' in FIG. 21D and the upward amplitude (the $P_+$ direction component in FIG. 2) shown in FIGS. 19A and 19B. That is, the light incident on the above detection surfaces is light rotated on the –Θ side. In this case, the amount of light incident on the detection surface 101-2 is smaller than that on the detection surface 102-2. The light amounts are represented as SS on the detection surface 101-2 and SL on the detection surface 102-2 (SS<SL). The detection surface 101-3 corresponds to the detection surface 102-3. Light incident on these detection surfaces is a sum of the small downward amplitude represented by H of the light amplitude on the section along the line C-C' in FIG. 21E and the upward amplitude shown in FIGS. 19A and 19B. In this case, the amount of light incident on the detection surface 101-3 is larger than that on the detection surface 102-3. The light amounts are represented as LL on the detection surface 101-3 and LS on the detection surface 102-3. Light incident on the detection surfaces 101-4 and 102-4 is a sum of the large upward amplitude represented by H of the light amplitude on the section along the line C-C' in FIG. 21E and the upward amplitude shown in FIGS. 19A and 19B. In this case, the amount of light incident on the detection surface 101-4 is smaller than that on the detection surface 102-4. The light amounts are represented as SS on the detection surface 101-4 and SL on the detection surface 102-4. Similarly, the amounts of light incident on the detection surfaces of the four-divided photodetectors 101 and 102 are represented, as shown in FIGS. 21F and 21G.

The detection signals from the detection surfaces of the four-divided photodetectors 101 and 102 are output to an analog operation circuit constituted by the addition amplifiers and the differential amplifier, as described with reference to FIG. 18. More specifically, the detection signals from the diagonal detection surfaces 101-1 and 101-3 of the four-divided photodetector 101 and the detection signals from the diagonal detection surfaces 101-2 and 101-4 are added by the addition amplifiers 103 and 104, respectively. The resultant sum signals are differentially detected by the differential amplifier 105. The detection signals from the detection surfaces 101-1 and 101-2 adjacent to each other along the direction of the track and the detection signals from the detection surfaces 101-3 and 101-4 adjacent to each other along the direction of the track are added by the addition amplifiers 106 and 107, respectively. The resultant sum signals are differentially detected by the differential amplifier 108. On the other hand, the detection signals from the diagonal detection surfaces 102-1 and 102-3 of the four-divided photodetector 102 and the detection signals from the diagonal detection surfaces 102-2 and 102-4 are added by the addition amplifiers 109 and 110, respectively. The resultant sum signals are differentially detected by the differential amplifier 111. The detection signals from the detection surfaces 102-1 and 102-2 adjacent to each other along the direction of the track and the detection signals from the detection surfaces 102-3 and 102-4 adjacent to each other along the direction of the track are added by the addition amplifiers 112 and 113, respectively. The resultant sum signals are differentially detected by the differential amplifier 114.

Output signals from the differential amplifiers 105 and 111 are differentially detected by the differential amplifier 115 to generate the reproduction signal 116 shown in FIG. 21H. The resultant reproduction signal has a negative level in the region of downward magnetization and a positive level in the region of upward magnetization. In a region where the upward magnetization and the downward magnetization are mixed at the edge of the domain 8 within the light spot, the level is changed from the negative level to the positive level or the positive level to the negative level. That is, the reproduction signal has pulses rising and falling at both edges of the domain 8. Therefore, the reproduction signal in which the central position of the domain represents meaningful information is obtained as the pit position recording reproduction signal. On the other hand, the output signals from the differential amplifiers 108 and 114 are added by the addition amplifier 117, and the reproduction signal 118 shown in FIG. 21I is generated. This reproduction signal has a level "0" in the regions of downward magnetization and upward magnetization and has a positive or negative peak at the edge of the domain 8. By detecting the peak position of the signal, each edge of the domain can be detected, so that information recorded by pit edge recording can be reproduced. Note that a combination of detection surfaces may be changed in analog operation to invert the polarities of the reproduction signals shown in FIGS. 21H and 21I.

In the above embodiment, signal reproduction corresponding to either pit position recording or pit edge recording has been exemplified. When a recording medium is inserted into the apparatus, it is desirable that pit position recording reproduction or pit edge recording reproduction is automatically switched in accordance with the recording medium. This switching control device has been described with reference to FIGS. 15 and 16.

According to the embodiment described above of the present invention, a magnetooptical information recording/reproducing apparatus in which a light beam is radiated on a magnetooptical recording medium and information recorded on the recording medium is reproduced from the light reflected by the recording medium is characterized in that light produced by magnetooptic effect of the magnetooptical recording medium and light produced by diffraction at a curved surface of a lens for converging the light beam radiated on the recording medium into a minute light spot are split into light beams by a polarizing beam splitter serving as an analyzer, and the split light beams are respectively detected by multi-divided photodetectors, thereby reproducing information.

In the magnetooptical information recording/reproducing apparatus, the light produced by the magnetooptic effect has a light amount equal to or smaller than the light produced by the diffraction at the curved surface of the lens.

In the magnetooptical information recording/reproducing apparatus, the multi-divided photodetector comprises a four-divided photodetector having detection surfaces divided in a crossed shape such that division lines of the detection surfaces are parallel and perpendicular to the information track of the magnetooptical recording medium, wherein detection signals from the detection surfaces of the four-divided photodetector are used to perform a predetermined analog operation, thereby performing signal reproduction corresponding to pit position recording or pit edge recording.

In the magnetooptical information recording/reproducing apparatus, the detection signals from the diagonal detection surfaces of each four-divided photodetector are added, resultant sum signals are differentially detected, and differential detection signals derived from the two four-divided photodetectors are differentially detected to reproduce information corresponding to pit position recording.

In the magnetooptical information recording/reproducing apparatus, the detection signals from the detection surfaces adjacent to each other along the direction of the track of each four-divided photodetector are added, resultant sum signals are differentially detected, and differential detection signals derived from the two four-divided photodetectors are differentially detected to reproduce information corresponding to pit edge recording.

In the magnetooptical information recording/reproducing apparatus, a means for detecting medium identification information added to the magnetooptical recording medium is used to determine whether the medium identification information represents a pit edge recording medium or a pit position recording medium, thereby selecting signal reproduction corresponding to pit position recording or pit edge recording in accordance with this determination result.

In the magnetooptical information recording/reproducing apparatus, the multi-divided photodetector comprises a two-divided photodetector having detection surfaces divided by one division line parallel to the track, wherein detection signals from the two detection surfaces of each two-divided photodetector are added, and sum signals derived from the two-divided photodetectors are differentially detected to reproduce information corresponding to pit edge recording.

In the above embodiment, the single apparatus can perform both signal reproduction corresponding to pit position recording and signal reproduction corresponding to pit edge recording. However, a reproduction apparatus may perform either signal reproduction corresponding to pit position recording or signal reproduction corresponding to pit edge recording. When a reproduction apparatus is constituted as an apparatus for pit edge recording, the detection surfaces of each four-divided photodetector which are adjacent along the direction of a track may be integrally formed. That is, the four-divided photodetector is replaced with a two-divided photodetector having a division line along the direction of the track, detection signals from the detection surfaces of each two-divided photodetector are added, and the sum signals from the two-divided photodetectors are differentially detected to obtain a reproduction signal corresponding to pit edge recording. Signal reproduction may be performed using a multi-divided photodetector other than the four- and two-divided photodetectors.

According to this embodiment of the present invention, the light produced by the magnetooptic effect is interfered with the light produced by the diffraction at the curved surface of the objective lens, and the incident beam is split into two light beams. The two split light beams are detected by the multi-divided photodetectors, respectively. Even if the size of the recording pit is smaller than that of the light spot, the recorded information can be accurately detected. Even if the recording density is increased, signal reproduction can be accurately performed. In particular, the edge shift phenomenon caused by degradation of the transfer characteristics of the optical head in reproduction according to conventional pit edge recording can be effectively eliminated. Information can be accurately reproduced even in pit edge recording.

Still another embodiment of the present invention will be described below.

Figure 22A:
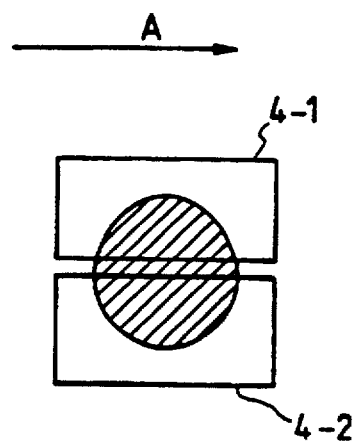
FIGS. 22A and 22B are views showing the distribution of an S-polarized light component produced by a magnetooptic effect upon shifting the objective lens of FIG. 18 in the tracking direction and the distribution of an S-polarized light component produced at the curved surface of the objective lens, respectively.
Figure 22B:
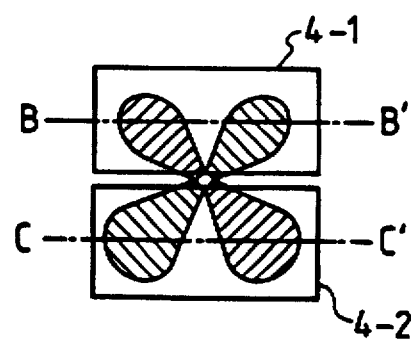
Figure 23A:
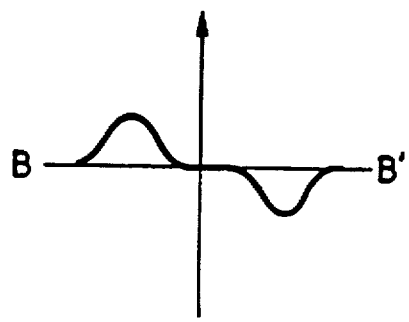
FIGS. 23A and 23B are views showing the amplitudes of light components on the sections along the lines B-B' and C-C' of FIG. 22B.
Figure 23B:
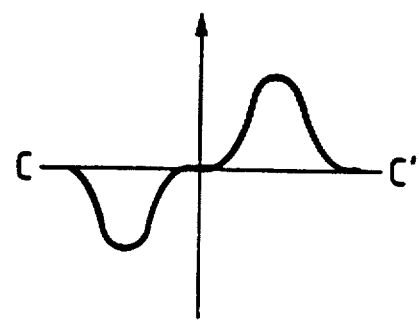

In the magnetooptical information recording/reproducing apparatus shown in FIG. 8, when a target information track is to be accessed, an actuator (not shown in FIG. 8) is driven to perform a high-speed seek operation, and only the objective lens 23 is radially moved along the magnetooptical disk 24. In this case, the DC component of the information reproduction signal varies, and the edge of the domain cannot be accurately detected. More specifically, when the objective lens is radially shifted along the magnetooptical disk, the light amount distribution of the laser beam incident on the objective lens becomes an asymmetrical distribution as a Gaussian distribution whose center is shifted. The distribution of the S-polarized light components produced by the magnetooptic effect is a distribution asymmetrical in the radial direction of the magnetooptical disk, as shown in FIG. 22A. In addition, the distribution of the S-polarized light components produced at the curved surface of the objective lens is given as a distribution asymmetrical in the radial direction of the magnetooptical disk, as shown in FIG. 22B. The distributions on the sections along the lines B-B' and C-C' in FIG. 22B are different from each other, as shown in FIGS. 23A and 23B.

Figure 24A:
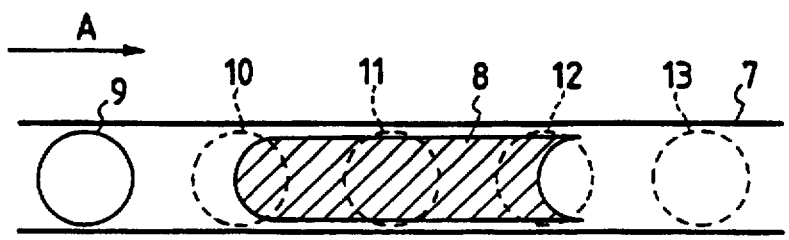
FIGS. 24A to 24D are views showing changes in DC component superposed on a reproduction signal upon shifting the objective lens of FIG. 18 in the tracking direction.
Figure 24B:
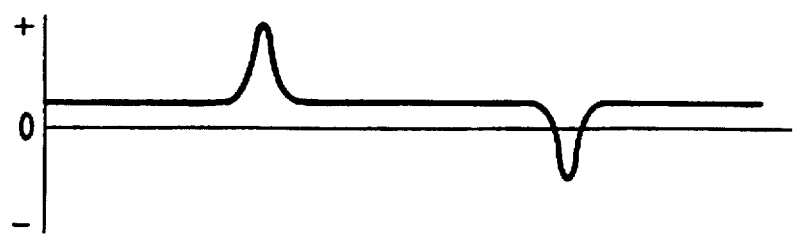
Figure 24C:
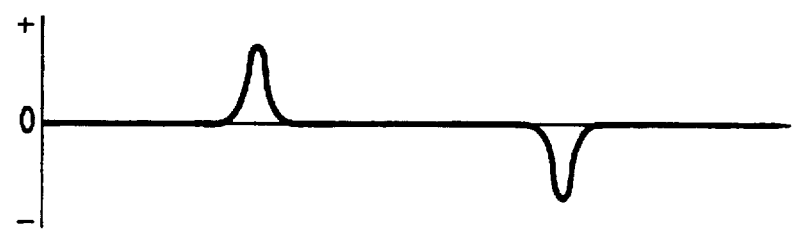
Figure 24D:
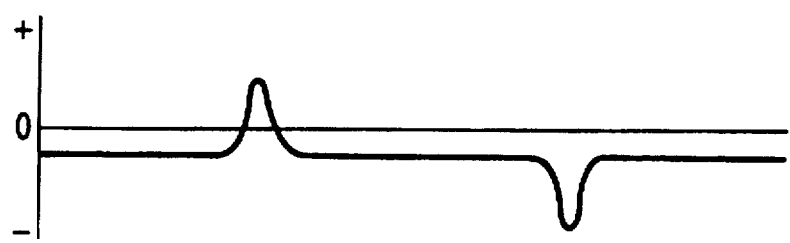

For the above reason, a reproduction signal obtained by differentially detecting detection signals from the detection pieces or photodetection surfaces 4-1 and 4-2 of the two-divided photodetector 4 includes a DC component corresponding to a shift amount of the objective lens 23, thus causing an error in detection of the edge of the domain. FIGS. 24A to 24D show the state of a change in reproduction signal with respect to the shift amount of the objective lens. FIG. 24A is a view showing an information pit (domain) 8 recorded on an information track 7 and light spots 9 to 13 scanned on the information track 7 as in FIG. 11A. FIG. 24B shows a reproduction signal obtained when the objective lens is shifted to the inner track of the magnetooptical disk. In this case, a positive DC component corresponding to the shift amount is contained in the reproduction signal. FIG. 24C shows a reproduction signal obtained when the objective lens is located at the central position. This reproduction signal does not contain any DC component and is a normal signal. FIG. 24D shows a reproduction signal obtained when the objective lens is shifted to an outer track. A negative DC component is contained in the reproduction signal in a manner opposite to the shift of the objective lens toward the inner track. In the resultant reproduction signal, the DC component serves as a signal varying depending on the shift amount of the objective lens. An error occurs in detection of the edge position of the domain. Demand has arisen for improving accurate detection of the edge position.

In the magnetooptical information recording/reproducing apparatus shown in FIG. 18, although the edge position of the domain can be accurately detected regardless of the size of the light spot, as described above, demand has arisen for providing a magnetooptical information recording/reproducing apparatus capable of reproducing information with a high reliability while accurately detecting the edge position of the domain regardless of the size of the light spot.

The following embodiment of the present invention has been made in consideration of the above situation, and aims at providing a magnetooptical information recording/reproducing apparatus capable of eliminating a DC component contained in a reproduction signal upon movement of an objective lens in the tracking direction and accurately detecting the edge position of the pit without any error.

This embodiment also aims at providing a magnetooptical information recording/reproducing apparatus capable of accurately detecting recorded information even if the size of the pit is smaller than that of the light spot and accurately performing signal reproduction even if the recording density is increased.

More specifically, there is provided a magnetooptical information recording/reproducing apparatus in which a linearly polarized light beam having a polarization direction parallel or perpendicular to a track direction is radiated on a magnetooptical recording medium, causing light produced from a reflected light beam from the magnetooptical recording medium by the magnetooptic effect of the magnetooptical recording medium and having a polarization direction perpendicular to the polarization of the incident light beam to interfere with light produced by diffraction at a curved surface of the objective lens, and detecting a change in light amount distribution of the interfered light beams, thereby reproducing information, comprising detecting means for detecting a DC component superposed on the reproduction signal when the objective lens is moved in the tracking direction as the radial direction of the magnetooptical recording medium, and correcting means for correcting the reproduction signal on the basis of an output from the detecting means to eliminate the DC component contained in the reproduction signal.

There is also provided a magnetooptical information recording/reproducing apparatus in which a light beam is radiated on a magnetooptical recording medium and information recorded on the recording medium is reproduced from the light reflected by the recording medium, characterized in that the light reflected by the recording medium is converged by a condenser lens, converged light is split into two light beams by a polarizing beam splitter serving as an analyzer, one of the two split light beams is detected by a multi-divided photodetector located at a position ahead of a convergence position of the condenser lens, the other of the two split light beams is detected by a multi-divided photodetector located behind the convergence position of the condenser lens, and a change in light amount distribution on the two multi-divided photodetectors is detected, thereby reproducing the recorded information.

Figure 25:
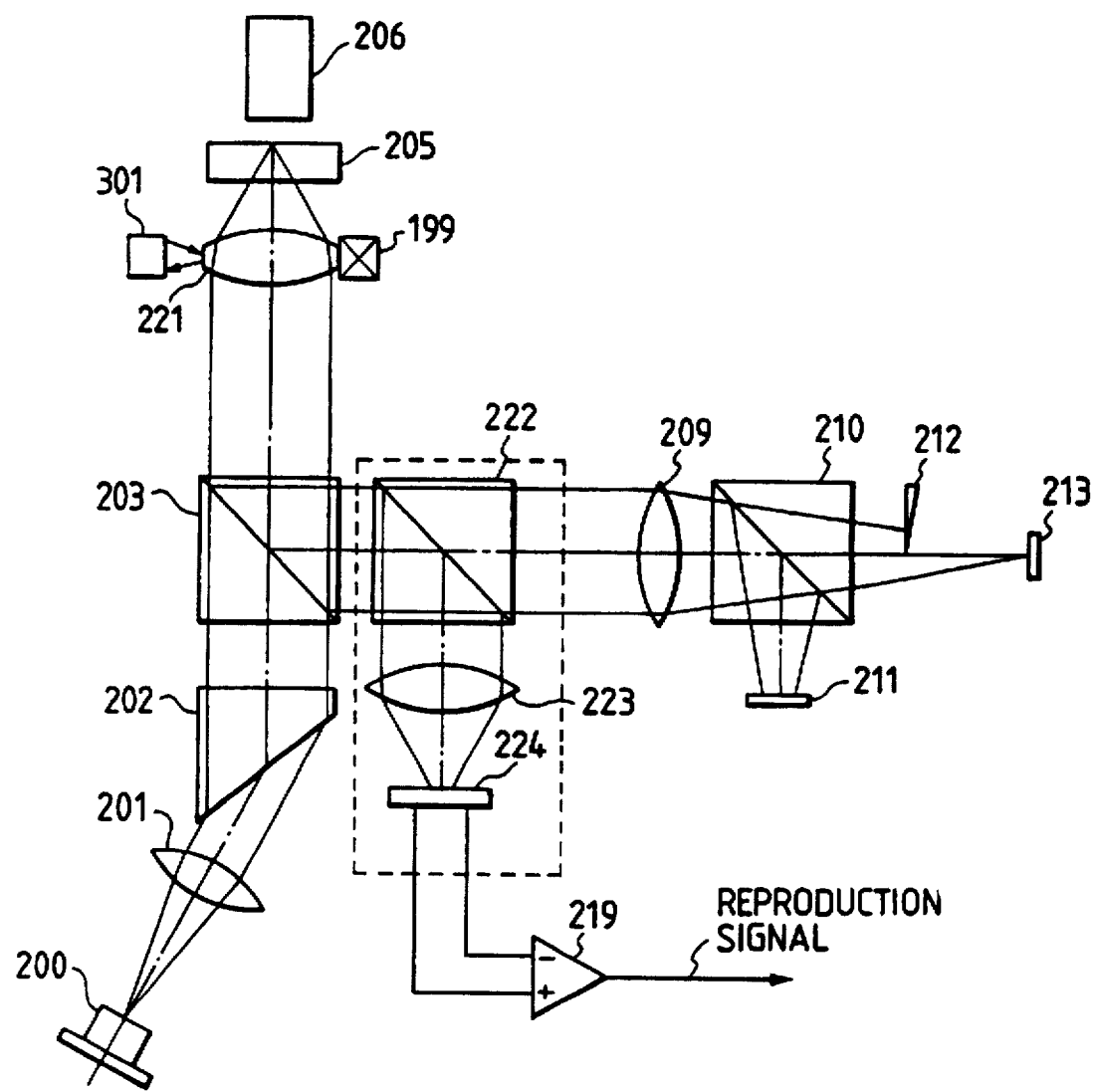
FIG. 25 is a constructional view showing a magnetooptical information recording/reproducing apparatus according to still another embodiment of the present invention.

This embodiment of the present invention will be described in more detail with reference to the accompanying drawings. FIG. 25 is a constructional view showing a magnetooptical information recording/reproducing apparatus according to this embodiment. FIG. 25 shows only the arrangement of an optical system as the main part of this embodiment. Since the basic construction of the magnetooptical information recording/reproducing apparatus of this embodiment is substantially the same as that of the magnetooptical information recording/reproducing apparatus shown in FIG. 8, a detailed description thereof will be omitted. Referring to FIG. 25, a lens position sensor 301 is mounted on the side portion of an objective lens 221. The lens position sensor 301 serves as a position sensor for detecting a shift amount of the objective lens 221 in the radial direction of a magnetooptical disk 205. The lens position sensor 301 (to be described in detail later) comprises a photointerrupter for optically detecting a shift amount of the objective lens 221. An actuator 199 moves the objective lens 221 in the radial direction of the magnetooptical disk 205.

This apparatus also includes a semiconductor laser 200 serving as a recording/reproduction light source, a collimator lens 201, a beam shaping prism 202, a polarizing beam splitter 203, and a magnetic head 206. A light beam emitted from the semiconductor laser 200 is a linearly polarized light component (P-polarized light component) having the polarization direction parallel to the drawing surface. The objective lens has an NA of about 0.55 and has a large curvature. The P-polarized light beam incident on the magnetooptical disk 205 is parallel or perpendicular to the direction of the information track of the magnetooptical disk 205.

The apparatus further includes a condenser lens 209, a half prism 210, photodetectors 211 and 213, and a knife edge 212. These optical elements constitute a control optical system. In the control optical system, a focusing error signal and a tracking error signal are generated on the basis of detection signals from the photodetectors 211 and 213. The autofocusing control in the control optical system employs a knife edge scheme, and autotracking control therein employs a push-pull scheme. The apparatus of this embodiment also includes a polarizing beam splitter 222, a condenser lens 223, and a two-divided photodetector 224 having detection surfaces divided in a direction parallel to the track. These optical elements constitute a reproduction optical system. In the reproduction optical system, detection signals from the detection pieces or surfaces of the two-divided photodetector 224 are differentially detected by a differential amplifier 219 to obtain a reproduction signal of the recorded information.

The information reproduction operation has been described with reference to FIGS. 9A to 11F, and a detailed description thereof will be omitted. The light produced by the magnetooptic effect of the magnetooptical disk is interfered with the light produced by the diffraction at the curved surface of the objective lens, and a change in light amount distribution is detected to reproduce information. That is, as shown in FIG. 11F, a reproduction signal having a positive or negative peak at the edge position of the domain is obtained. On the basis of this reproduction signal, information of pit edge recording can be reproduced. An information recording scheme employs a magnetic field modulation scheme.

Figure 26:
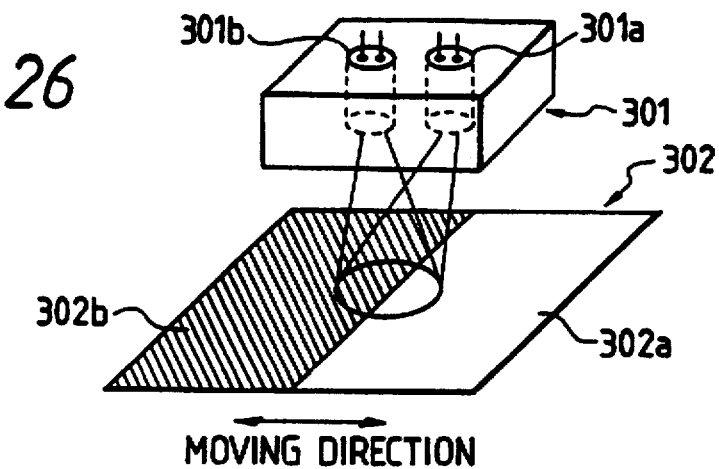
FIG. 26 is a view showing a lens position sensor used in the embodiment of FIG. 25 and a reflecting plate adhered to the side portion of an objective lens.
Figure 27:
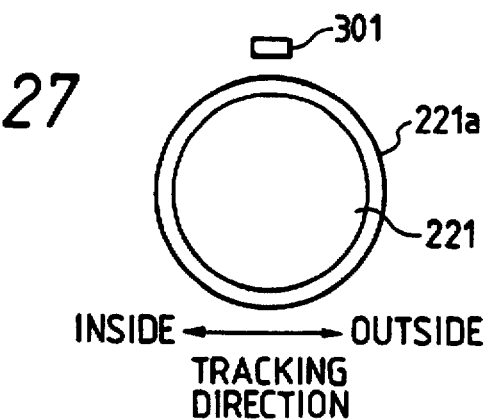
FIG. 27 is a plan view showing the lens position sensor and the objective lens shown in FIG. 26.
Figure 28:
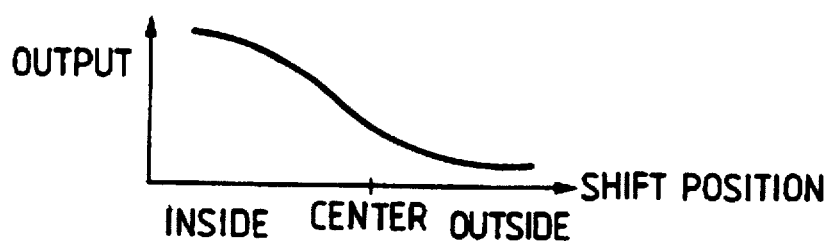
FIG. 28 is a graph showing the relationship between the shift amount of the objective lens and the output from the lens position sensor.

FIG. 26 is a view showing the detailed arrangement of the lens position sensor 301 and the side portion of the objective lens 221. The lens position sensor 301 comprises a light-emitting diode 301a and a phototransistor 301b. Light is radiated from the light-emitting diode 301a onto a reflecting plate 302, and light reflected by the reflecting plate 302 is received by the phototransistor 301b. The reflecting plate 302 comprises a white portion 302a for reflecting the light and a black portion 302b for absorbing the light, as shown in FIG. 26. The reflecting plate 302 is adhered to the side portion of a lens barrel 221a of the objective lens 221 so as to oppose the lens position sensor 301, as shown in FIG. 27. FIG. 27 is a plan view showing the positional relationship between the lens position sensor 301 and the objective lens 221. While the lens position sensor 301 is fixed at a predetermined position, the objective lens 221 is moved between the outside and the inside in the tracking direction of the magnetooptical disk 301 upon driving by the actuator 199. Therefore, an output signal corresponding to a shift amount of the objective lens 221 in the tracking direction can be obtained from the phototransistor 301b. That is, the light reception amount of the phototransistor 301b is determined by a ratio of the area of the white portion 302a to the area of the black portion 302b of the reflecting plate 302 within the area irradiated with the light-emitting diode 301a. When the shift position of the objective lens 221 comes close to the inside of the magnetooptical disk, the output from the phototransistor 301b is increased, as shown in FIG. 28. When the shift position comes close to the outside of the magnetooptical disk, the output from the phototransistor 301b is decreased. Therefore, the signal output from the phototransistor 301b is increased/decreased in accordance with the shift amount of the objective lens 221. This signal is supplied to an adder/subtracter circuit (not shown).

On the other hand, the differential amplifier 219 differentially detects the signals from the detection surfaces of the two-divided photodetector 224 to obtain a reproduction signal. This reproduction signal is superposed with a positive or negative DC component in accordance with a shift direction when the objective lens 221 is shifted in the radial direction of the magnetooptical disk 205, as described with reference to FIGS. 24A to 24D. In addition, the DC component changes in accordance with a change in shift amount. The resultant reproduction signal is supplied to the adder/subtracter circuit. The adder/subtracter circuit performs an addition or subtraction to cancel the DC component of the reproduction signal on the basis of the output from the lens position sensor 301, thereby always obtaining a reproduction signal free from a DC component. Even if the objective lens 221 is shifted, the DC component of the reproduction signal can be properly eliminated. Therefore, the edge position of the domain can be accurately detected without any error, and the information can be accurately reproduced.

Figure 29:
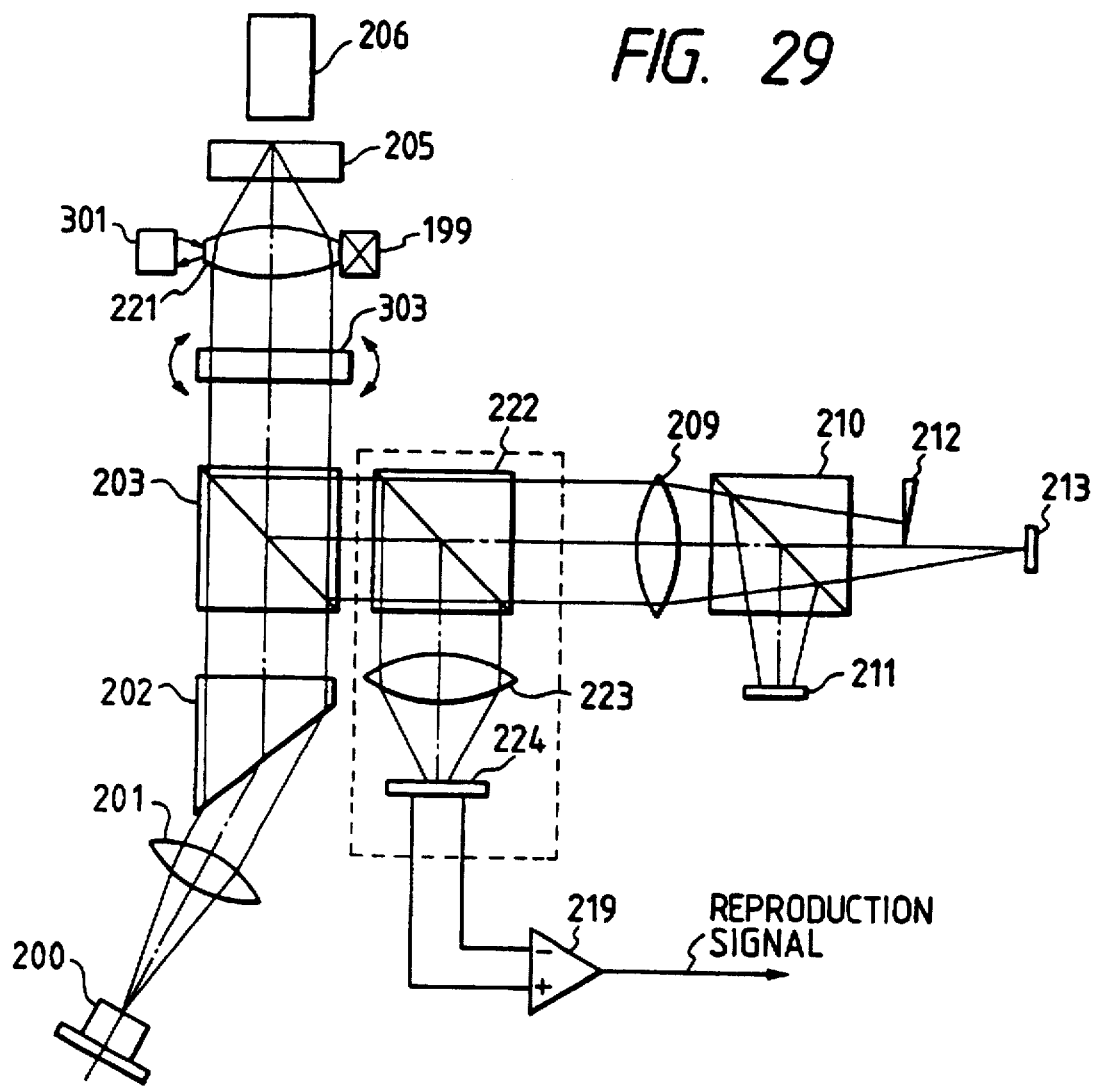
FIG. 29 is a constructional view showing a magnetooptical information recording/reproducing apparatus according to still another embodiment of the present invention.
Figure 30:
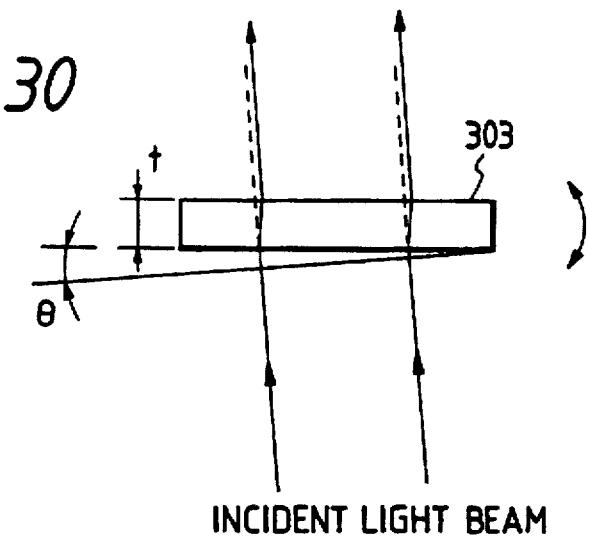
FIG. 30 is a front view showing a plane-parallel plate used in the embodiment of FIG. 29.

FIG. 29 is a constructional view showing a magnetooptical information recording/reproducing apparatus according to still another embodiment of the present invention. Referring to FIG. 29, a plane-parallel plate 303 is disposed between an objective lens 221 and a polarizing beam splitter 203. The plane-parallel plate 303 is rotated about its center by a driving means (not shown) in directions indicated by a double-headed arrow. A lens position sensor 301 is arranged on the side portion of the objective lens 221 to detect a shift amount of the objective lens 221 in the tracking direction in the same manner as in the embodiment of FIG. 25. The plane-parallel plate 303 has a thickness t, as shown in FIG. 30. When the plate 303 is inclined at an angle Θ from the state in which the plate is perpendicular to the incident light beam, the incident parallel light beam is parallelly shifted by two refracting actions of the plane-parallel plate 303 in accordance with the following relation:

$$t\{\tan\Theta - \tan[\sin^{-1}(\sin\Theta/n)]\} \tag{1}$$

where n is the refractive index of the plane-parallel plate 303, and t is the thickness of the plane-parallel plate 303 as described above. If the angle Θ is small, the parallel movement amount can be roughly obtained as follows:

$$t\cdot\Theta(1-1/n) \tag{2}$$

In this embodiment, the inclination angle Θ of the plane-parallel plate 303 is controlled in accordance with the output signal from the lens position sensor 301, and a light beam passing through the plane-parallel plate 303 is shifted by the shift amount of the objective lens 221 in the tracking direction. More specifically, the output from the lens position sensor 301 is input to a drive unit (not shown) for the plane-parallel plate 303. This drive unit drives to incline the plane-parallel plate 303 in accordance with the shift amount of the objective lens 221. The light beam passing through the plane-parallel plate 303 is shifted by the same amount as the shift amount of the objective lens 221, so that the center of the light beam incident on the objective lens 221 is always aligned with the optical axis. Therefore, even if the objective lens 221 is shifted in the tracking direction, the center of the light beam incident on the objective lens 221 is always aligned with the optical axis. Any DC component is not superposed on the reproduction signal, and the edge position of the domain can be accurately detected. Note that the DC component of the reproduction signal may be detected to incline the plane-parallel plate 303 so as to nullify the DC component without using the lens position sensor 301.

Figure 31:
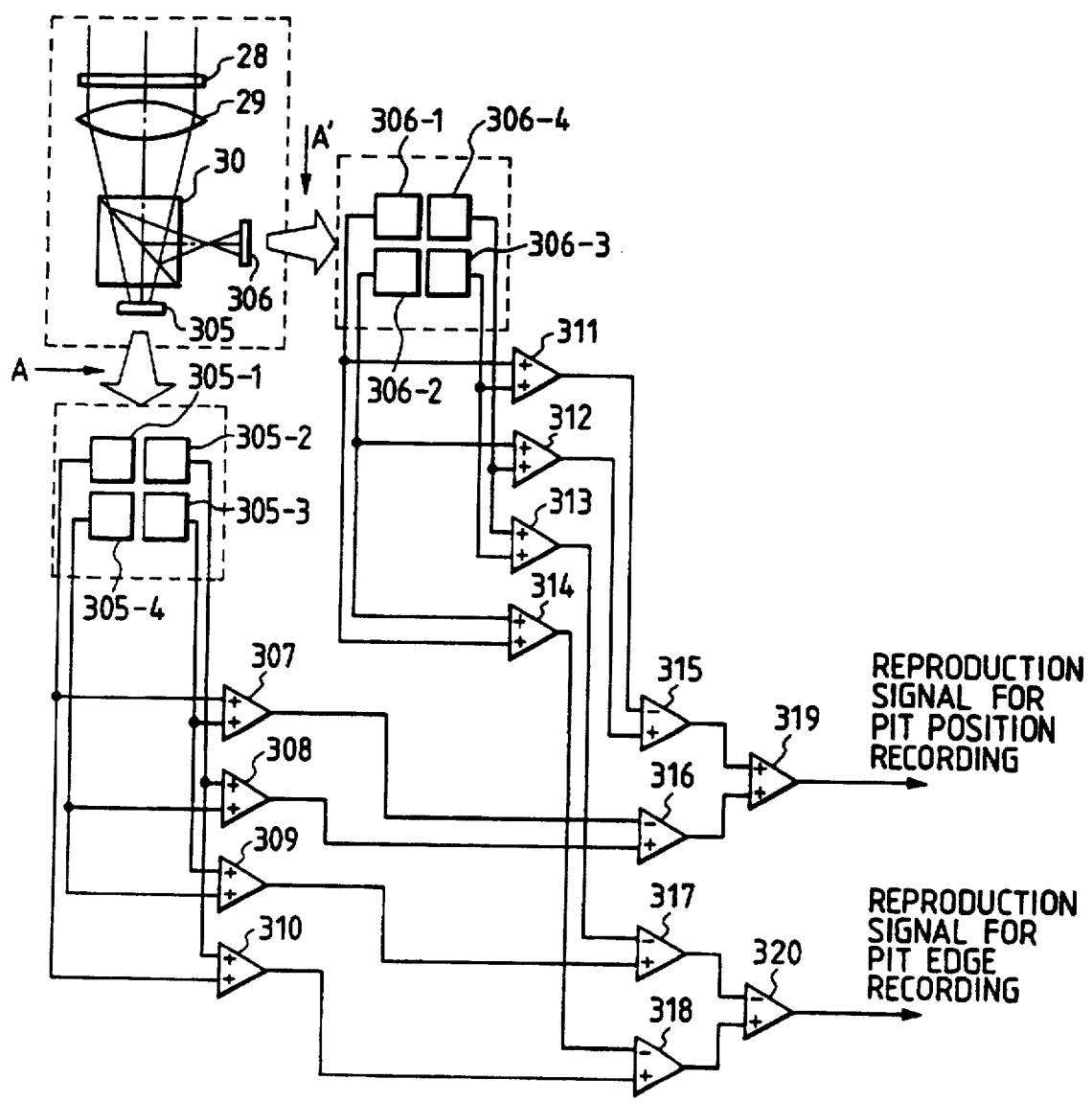
FIG. 31 is a constructional view showing a magnetooptical information recording/reproducing apparatus according to still another embodiment of the present invention.

FIG. 31 is a constructional view showing a magnetooptical information recording/reproducing apparatus according to still another embodiment of the present invention. The basic construction of the apparatus of this embodiment is substantially the same as that of the apparatus shown in FIG. 18. FIG. 31 shows only the reproduction optical system as the main part. Other constructions are the same as those in the conventional example shown in FIG. 1. Referring to FIG. 31, the magnetooptical information recording/reproducing apparatus includes a λ/2 plate 28, a condenser lens 29, and a polarizing beam splitter 30 serving as an analyzer. These optical elements are identical to those shown in FIG. 18. An objective lens has a curved surface having a curvature corresponding to an NA of 0.5 or more. If a linearly polarized light component (P-polarized light component) having the polarization direction parallel to the drawing surface is emitted from a semiconductor laser, the linearly polarized light components (S-polarized light components) having the polarization direction perpendicular to the polarization direction of the incident light beam are diffracted at the curved surface of the objective lens to result in a diffracted image in the form of a four-leaf clover, as previously described. This will be described in more detail below.

Each of four-divided photodetectors 305 and 306 has four detection surfaces divided in a crossed shape. The four-divided photodetector 305 is located slightly ahead of the convergence position of the condenser lens 29, and the four-divided photodetector 306 is located slightly behind the convergence position of the condenser lens 29. As can be apparent from the relative positional relationship between the four-divided photodetectors 305 and 306 and the magnetooptical disk in FIG. 31, detection surfaces of the photodetectors 305 and 306 and the directions (A and A') of the information tracks are illustrated. The four-divided photodetector 305 has four detection surfaces 305-1 to 305-4, and the arrow A represents the direction of the information tracks. The four-divided photodetector 306 has detection surfaces 306-1 to 306-4, and the arrow A' represents the direction of the information tracks. As is apparent from FIG. 31, each of the four-divided photodetectors 305 and 306 has one division line perpendicular to the information track and the other division line parallel thereto. In addition, the right and left detection surfaces of the photodetector 305 correspond to the left and right detection surfaces of the photodetector 306 so as to radiate the light components on the detection surface of the four-divided photodetectors 305 and 306 through the polarizing beam splitter 30 serving as the analyzer. That is, the detection surfaces 305-1 and 306-1, the detection surfaces 305-2 and 306-2, the detection surfaces 305-3 and 306-3, and the detection surfaces 305-4 and 306-4 correspond to each other.

The apparatus also includes addition amplifiers 307 to 314, differential amplifiers 315 to 318, an addition amplifier 319, and a differential amplifier 320. These addition amplifiers and the differential amplifiers constitute an operation circuit for performing an analog operation on the basis of the detection signals from the detection surfaces of the four-divided photodetectors 305 and 306. As a result of this operation, a reproduction signal for pit position recording and a reproduction signal for pit edge recording are generated. This reproduction operation will be described in detail later.

The operation of this embodiment will be described below. Assume that the light beam emitted from the semiconductor laser is a linearly polarized light component (P-polarized light component) having the polarization direction parallel to the drawing surf ace in the same manner as in the conventional case. When this light beam is incident on the objective lens, since the objective lens has a large curvature, and the reflectance for the incident light beam is greatly different from that for the perpendicularly polarized light component, the polarization plane is rotated. When the polarized light component having the polarization plane perpendicular to the polarization plane of the incident light beam is taken into consideration, a diffracted image has the form of a four-leaf clover. The light beams incident on the four-divided photodetectors 305 and 306 are the light components having the same polarization plane as that of the $P_+$ light shown in FIG. 2 and the polarized light components perpendicular thereto. These light components include the $S_+$ and $S_-$ light components produced by the Kerr or Faraday effect of the magnetooptical disk and the light components produced at the curved surface of the objective lens as described above.

Figure 32A:
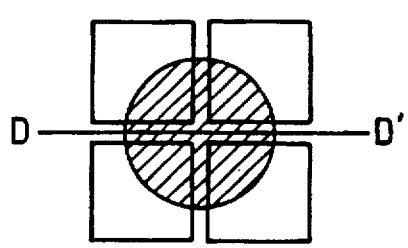
FIGS. 32A and 32B are a view obtained such that the distribution of $P_+$ light immediately before incidence on a polarizing beam splitter is projected on the detection surfaces of a four-divided photodetector, and a view showing the amplitude of light on the section along the line A-A' on the detection surfaces, respectively.
Figure 32B:
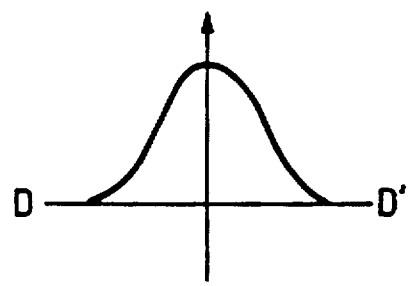
Figure 33A:
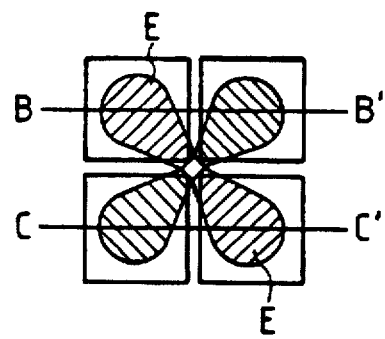
FIGS. 33A to 33C are a view obtained such that the distribution of an S-polarized light component at the curved surface of the objective lens immediately before incidence on the polarized beam splitter is projected on the detection surfaces of the four-divided photodetector, and views showing the amplitudes of the light components on the sections along the lines B-B' and C-C' of the detection surfaces, respectively.
Figure 33B:
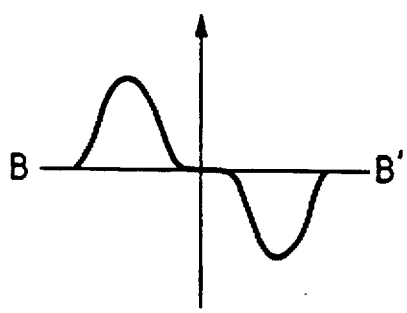
Figure 33C:
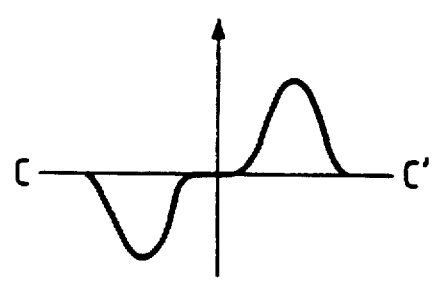

FIG. 32A is a view showing $P_+$ light in the distribution of light immediately before incidence on the polarizing beam splitter 30 serving as an analyzer. FIG. 32B is a view showing the amplitude of the $P_+$ light on the section along the line D–D' of FIG. 30A. Four squares shown in FIG. 32A represent the detection surfaces of the four-divided photodetector, and the $P_+$ light is projected on the detection surfaces. In FIG. 32A, the $P_+$ light is represented by hatched portions equally distributed on the four detection surfaces. The phases of the light components of the four detection surfaces are almost equal to each other. The amplitude of the light on the section along the line D–D' is shown in FIG. 32B. Of all light components immediately before incidence on the polarizing beam splitter 30 serving as the analyzer, S-polarized light produced at the curved surface of the objective lens 23 is shown in FIG. 33A. This light is projected on the four detection surfaces of the four-divided photodetector in the same manner as described above. As is apparent from FIG. 33A, the light distribution has the form of a four-leaf clover. The light components corresponding to the four leaves are projected on the four detection surfaces. The light components corresponding to the diagonal leaves are in-phase components, and the light components corresponding to the adjacent leaves have a phase difference of $\pi$. FIGS. 33B and 33C are views showing the amplitudes of the light components on the sections along the lines B–B' and C–C' in FIG. 33A. The illustrated amplitudes are obtained in accordance with the relationship between the light components corresponding to the four leaves. The light beams in FIGS. 32A and 32B and FIGS. 33A to 33C have predetermined distributions regardless of the direction of magnetization on the magnetooptical disk. According to this embodiment, these two light beams and the $S_+$ and $S_-$ light components changing depending on the magnetization on the magnetooptical recording medium are split by the polarizing beam splitter 30 serving as the analyzer. A change in light amount distribution upon interference between these three light beams is detected on the two four-divided photodetectors 305 and 306, thereby reproducing the information.

Figure 34A:
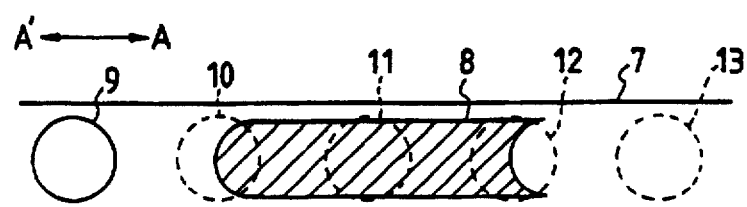
FIGS. 34A to 34I are views for explaining an information reproduction operation of the embodiment shown in FIG. 31.
Figure 34B:
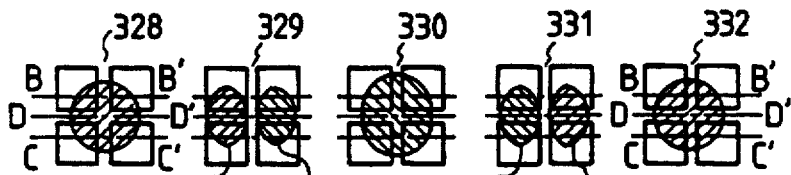

Information reproduction will be described in more detail with reference to FIGS. 34A to 34I. FIG. 34A is a view showing a recorded information pit (domain) and a reproduction light spot. A domain 8 is recorded on an information track 7. This embodiment employs a magnetic field modulation scheme. The domain 8 has a shape of the feather of an arrow. An optical modulation scheme may be used in place of the magnetic field modulation scheme. The magnetization of the magnetooptical disk is oriented downwardly in initialization, so that the direction of magnetization of the domain 8 is upward. A light spot 9 scans the information track 7 recorded with the domain 8 in the A direction, as indicated by 10, 11, 12, and 13. Arrows A' and A in FIG. 34A correspond to the arrows A' and A shown in FIG. 31. FIG. 34B is a view showing distributions of the S-polarized light components produced by the magnetooptic effect immediately before incidence on the polarizing beam splitter 30 at the respective positions of the light spots in FIG. 34A. Each light spot is projected on the detection surfaces of the four-divided photodetector. At the positions of the light spots 9 and 13, all the directions of magnetization within the light spots are oriented downwardly, and no diffraction of light occurs, thereby obtaining circular distributions, as indicated by 328 and 332. At this time, the light components are in-phase with the light represented by E in FIG. 33A. The light distributions 328 and 332 represent the $S_+$ light beams.

Figure 34C:
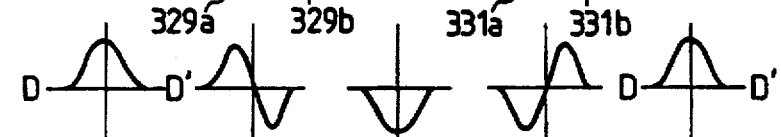

At the positions of the light spots 10 and 12, the boundaries between the upward magnetization and the downward magnetization, i.e., the edges of the domain 8, are located within the light spots, light is diffracted in a direction parallel to the information track 7, and the distribution is divided into right and left portions, as indicated by each of distributions 329 and 331. The right and left light components have a phase difference of $\pi$. The phase of the right light component is opposite to that of the left light component. The left light components are represented by 329a and 331a, and the right light components are represented by 329b and 331b in the distributions 329 and 331. The light components 329a and 331b are $S_+$ light components, and the light components 329b and 331a are $S_-$ light components. When the edge of the domain 8 is located within a light spot, the $S_+$ and $S_-$ light components are mixed in the resultant light distribution. At the position of the light spot 11, the direction of magnetization within the light spot is almost upward, and substantially no diffraction of light occurs. An almost circular distribution 330 is obtained. The light in the distribution 330 is the $S_-$ light having a phase difference of $\pi$ from those of the distributions 328 and 332. FIG. 34C is a view showing the amplitudes of the light components on the section along the line D–D' of FIG. 34B at the respective positions of the light spots. The amplitudes are changed depending on the positions of the light spots.

Figure 34D:
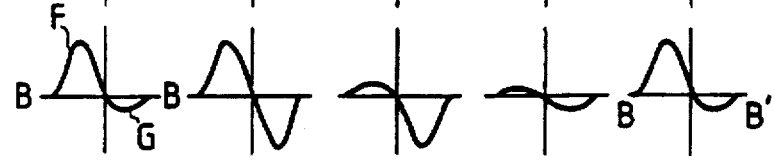
Figure 34E:
Figure 34F:
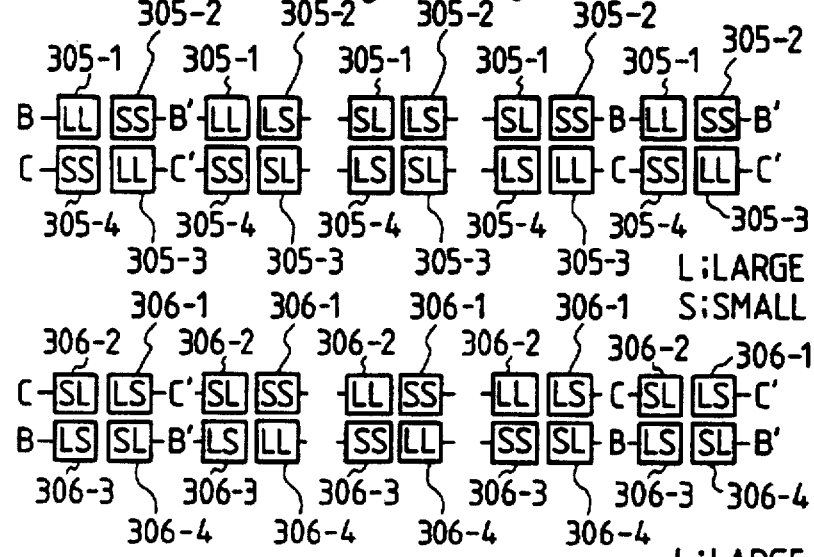
Figure 34G:
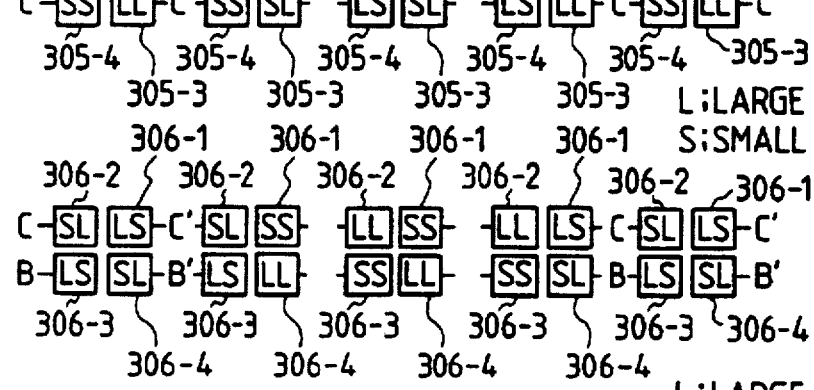

FIGS. 34D and 34E are views obtained such that the distributions of the light components (FIGS. 33A to 33C) obtained by interfering the S-polarized light components produced at the curved surface of the objective lens with the S-polarized light components (FIG. 34B) produced by the magnetooptic effect are represented in the form of the amplitudes of the light components on the sections along the lines B–B' and C–C' of FIG. 34B. FIGS. 34F and 34G are views showing detection light amount differences on the detection surfaces of the four-divided photodetectors 305 and 306 after the S-polarized light components produced at the curved surface of the objective lens, the S-polarized light components produced by the magnetooptic effect, and the $P_+$ light components shown in FIGS. 32A and 32B are synthesized and split into two components which are respectively incident on the four-divided photodetectors 305 and 306. FIG. 34F shows the detection light amount difference on the detection surfaces of the four-divided photodetector 305, and FIG. 34G shows the detection light amount difference on the detection surfaces of the four-divided photodetector 305. Referring to FIGS. 34F and 34G, the light amounts are represented as LL (L: large), LS (S: small), SL, and SS in order from the larger values.

As described with reference to FIG. 31, since the light to be incident on the four-divided photodetector 306 is reflected by the polarizing beam splitter 30, the right or left detection surfaces of the four-divided photodetector 306 correspond to the left or right detection surfaces of the four-divided photodetector 305. In addition, since the four-divided photodetector 306 is located behind the convergence position of the condenser lens 29, the positions at top-bottom and right-left of the light amount distribution obtained in the four-divided photodetector 102 in the apparatus of FIG. 18 are reversed to those in the distribution obtained in the four-divided photodetector 306. For example, when the light distributions on the four-divided photodetectors at the position of the light spot 9 as the left end position in FIGS. 34F and 34G are taken into consideration, the detection surface 305-1 of the four-divided photodetector 305 corresponds to the detection surface 306-1 of the four-divided photodetector 306. The light incident on these detection surfaces is a sum of the large upward amplitude (the $S_+$ direction component shown in FIG. 2) on the left represented by F of the light amplitude on the section along the line B–B' in FIG. 34D and the upward amplitude (the $P_+$ direction component shown in FIG. 2) shown in FIGS. 32A and 32B. That is, the light incident on the above detection surfaces is light rotated in the $+\Theta$ side. If the light polarized by the polarizing beam splitter 30 serving as a $+45°$ analyzer is incident on the four-divided photodetector 305, as shown in FIG. 34F, and the light polarized by the polarizing beam splitter 30 serving as a $-45°$ analyzer is incident on the four-divided photodetector 306, as shown in FIG. 34G, the amount of light incident on the detection surface 305-1 is larger than that on the detection surface 306-1. The light amounts are represented as LL on the detection surface 305-1 and LS on the detection surface 306-1 (LL>LS).

The detection surface 305-2 corresponds to the detection surface 306-2. Light incident on these detection surfaces is a sum of the small downward amplitude (the $S_-$ direction component in FIG. 2) on the right side represented by G of the light amplitude on the section along the line B–B' in FIG. 34D and the upward amplitude (the $P_+$ direction component in FIG. 2) shown in FIGS. 32A and 32B. That is, the light incident on the above detection surfaces is light rotated on the $-\Theta$ side. In this case, the amount of light incident on the detection surface 305-2 is smaller than that on the detection surface 306-2. The light amounts are represented as SS on the detection surface 305-2 and SL on the detection surface 306-2 (SS<SL). The detection surface 305-3 corresponds to the detection surface 306-3. Light incident on these detection surfaces is a sum of the small downward amplitude represented by H of the light amplitude on the section along the line C–C' in FIG. 34E and the upward amplitude shown in FIGS. 32A and 32B. In this case, the amount of light incident on the detection surface 305-3 is larger than that on the detection surface 306-3. The light amounts are represented as LL on the detection surface 305-3 and LS on the detection surface 306-3. Light incident on the detection surfaces 305-4 and 306-4 is a sum of the large upward amplitude represented by H of the light amplitude on the section along the line C–C' in FIG. 34E and the upward amplitude shown in FIGS. 32A and 32B. In this case, the amount of light incident on the detection surface 305-4 is smaller than that on the detection surface 306-4. The light amounts are represented as SS on the detection surface 305-4 and SL on the detection surface 306-4. Similarly, the amounts of light incident on the detection surfaces of the four-divided photodetectors 305 and 306 are represented, as shown in FIGS. 34F and 34G.

The detection signals from the detection surfaces of the four-divided photodetectors 305 and 306 are output to an analog operation circuit constituted by the addition amplifiers and the differential amplifiers described with reference to FIG. 31. The detection signals from the diagonal detection surfaces 305-1 and 305-3 and the detection signals from the diagonal detection surfaces 305-2 and 305-4 of the four-divided photodetector 305 are added by addition amplifiers 307 and 308, respectively. The detection signals from the detection surfaces 305-1 and 305-2 adjacent to each other along the track direction and the detection signals from the detection surfaces 305-3 and 305-4 adjacent to each other along the track direction of the four-divided photodetector 305 are added by addition amplifiers 309 and 310, respectively. On the other hand, the detection signals from the diagonal detection surfaces 306-1 and 306-3 and the detection signals from the diagonal detection surfaces 306-2 and 306-4 of the four-divided photodetector 306 are added by addition amplifiers 311 and 312, respectively. The detection signals from the detection surfaces 306-1 and 306-2 adjacent to each other along the track direction and the detection signals from the detection surfaces 306-3 and 306-4 adjacent to each other along the track direction of the four-divided photodetector 306 are added by addition amplifiers 313 and 314, respectively.

Figure 34H:

The sum signals from the addition amplifiers 307 and 308 which add the detection signals from the diagonal detection surfaces of the four-divided photodetector 305 are differentially detected by the differential amplifier 316. The sum signals from the addition amplifiers 311 and 312 which add the detection signals from the diagonal detection surfaces of the four-slit photodetector 306 are differentially detected by the differential amplifier 315. Signals from the differential amplifiers 315 and 316 are added by the addition amplifier 319 to generate a reproduction signal for pit position recording, as shown in FIG. 34H. The resultant reproduction signal is set at low level in the region of upward magnetization and high level in the region of downward magnetization. Therefore, the difference between the upward magnetization and the downward magnetization can be detected as a difference in signal level. That is, a pulse signal corresponding to the domain 8 can be reproduced, and the reproduction signal of information corresponding to pit position recording can be obtained.

Figure 34I:

On the other hand, the sum signals from the addition amplifiers 309 and 313 which add the detection signals from the detection surfaces adjacent to the track direction of the four-divided photodetector 305 and the detection signals from the detection surfaces adjacent to the track direction of the four-divided photodetector 306 are differentially detected by the differential amplifiers 317 and 318. Signals from the differential amplifiers 317 and 318 are differentially detected by the differential amplifier 320 to generate a reproduction signal for pit edge recording, as shown in FIG. 34I. The resultant reproduction signal is a signal having a positive or negative peak at the edge of the domain 8, thereby reproducing the information corresponding to pit edge recording. A combination of detection surfaces may be changed in an analog operation to invert the polarities of the reproduction signals shown in FIGS. 34H and 34I.

Figure 35:
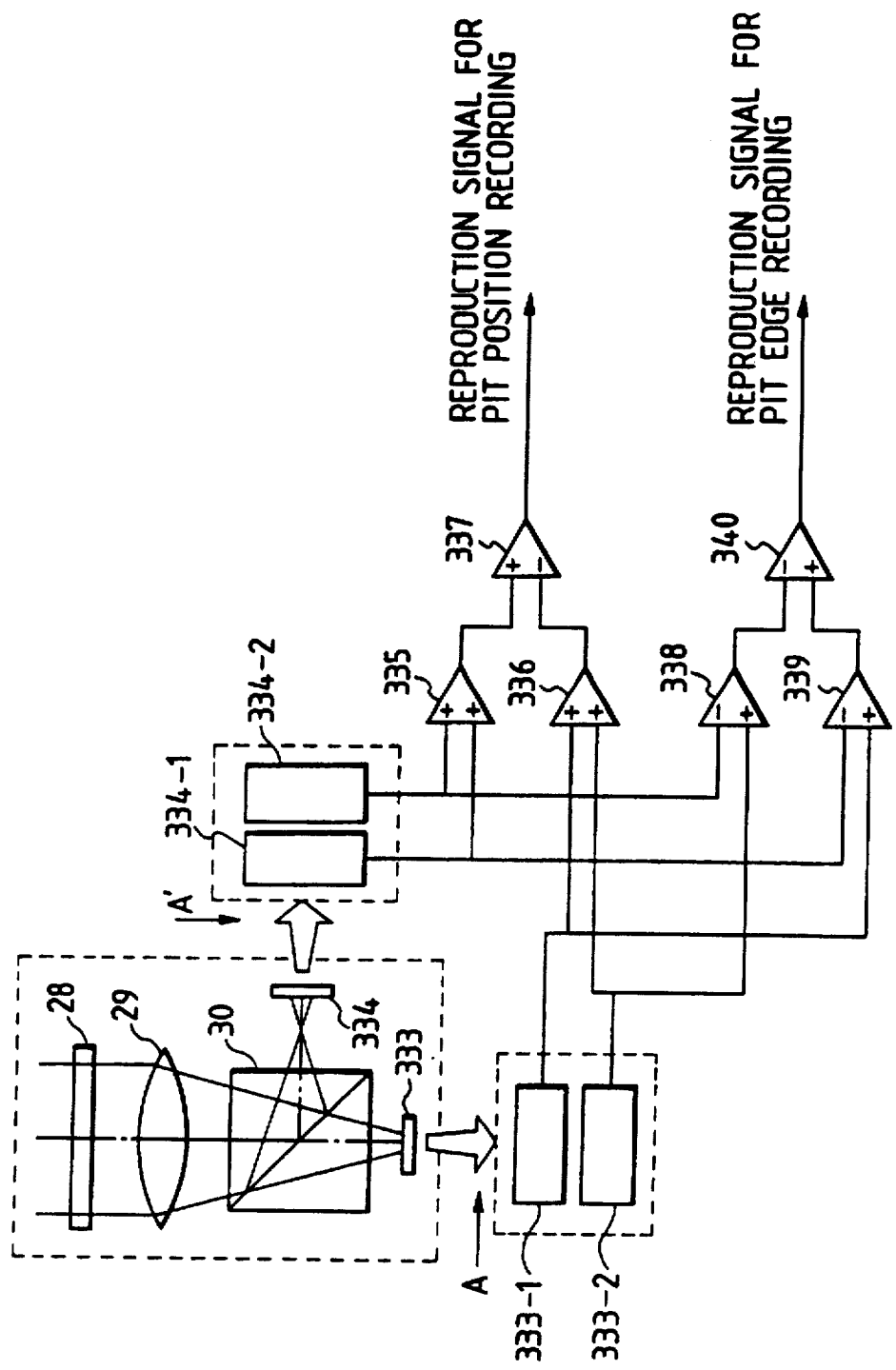
FIG. 35 is a constructional view showing a magnetooptical information recording/reproducing apparatus according to still another embodiment of the present invention.

In the embodiment shown in FIG. 31, the diffracted image produced at the curved surface of the objective lens is utilized to obtain a reproduction signal for pit position recording and a reproduction signal for pit edge recording. However, a diffracted image produced at the curved surface of the objective lens is utilized for only pit edge recording. Reproduction in pit edge recording employs a conventional scheme, which embodiment will be described with reference to FIG. 35. Referring to FIG. 35, an apparatus of this embodiment includes a λ/2 plate 28, a condenser lens 29, and a polarizing beam splitter 30 serving as an analyzer. These optical elements are identical to those in the embodiment of FIG. 31. Although not shown in FIG. 35, an objective lens has a curved surface having a large curvature corresponding to an NA of about 0.5 or more.

Each of two two-divided photodetectors 333 and 334 has two detection surfaces. The two-divided photodetector 333 is located slightly ahead of the convergence position of the condenser lens 29, and the two-divided photodetector 334 is located slightly behind the convergence position of the condenser lens 29. The two-divided photodetector 333 has two detection surfaces 333-1 and 333-2 divided in a track direction A, and the two-divided photodetector 334 has two detection surfaces 334-1 and 334-2 divided in a track direction A'. The detection surface 333-1 corresponds to the detection surface 334-1, and the detection surface 333-2 corresponds to the detection surface 334-2.

Detection signals from the detection surfaces 333-1 and 333-2 of the two-divided photodetector 333 and detection signals from the detection surfaces 334-1 and 334-2 of the two-divided photodetector 334 are added by addition amplifiers 336 and 335, respectively. Signals from the addition amplifiers 336 and 335 are differentially detected by a differential amplifier 337 to generate a reproduction signal for pit position recording. Since the resultant reproduction signal is a differential signal from the two-divided photodetectors 333 and 334, this reproduction signal is identical to the reproduction signal obtained in the conventional apparatus shown in FIG. 1. The detection signals from the detection surfaces 333-1 and 334-1 and the detection signals from the detection surfaces 333-2 and 334-2 of the two-divided photodetectors 333 and 334 are differentially detected by differential amplifiers 339 and 338. Signals from the differential amplifiers 339 and 338 are differentially detected by a differential amplifier 340 to generate a reproduction signal for pit edge recording. This reproduction signal is obtained by differentially detecting the sum signals of the detection surfaces adjacent to each other along the track direction so as to correspond in the two photodetectors as in the embodiment shown in FIG. 31 and differentially detecting the differential detection signals. Therefore, the resultant reproduction signal is a signal having a positive or negative peak at the edge of the domain, as shown in FIG. 34I.

According to one of the above embodiments, there is provided a magnetooptical information recording/reproducing apparatus in which a linearly polarized light beam having a polarization direction parallel or perpendicular to a track direction is radiated on a magnetooptical recording medium, causing light produced from a reflected light beam from the magnetooptical recording medium by the magnetooptic effect of the magnetooptical recording medium and having a polarization direction perpendicular to the polarization of the incident light beam to interfere with light produced by diffraction at a curved surface of the objective lens, and detecting a change in light amount distribution of the interfered light beams, thereby reproducing information, comprising detecting means for detecting a DC component superposed on the reproduction signal when the objective lens is moved in the tracking direction of the magnetooptical recording medium, and correcting means for correcting the reproduction signal on the basis of an output from the detecting means to eliminate the DC component contained in the reproduction signal.

In the magnetooptical information recording/reproducing apparatus, the detecting means is arranged as a position sensor for detecting a shift amount of the objective lens in the tracking direction to output an output signal corresponding to the DC component of the reproduction signal.

In the magnetooptical information recording/reproducing apparatus, the correcting means is arranged to eliminate the DC component of the reproduction signal by adding or subtracting a signal to or from the reproduction signal in accordance with the output from the detecting means.

In the magnetooptical information recording/reproducing apparatus, the correcting means comprises a transparent plane-parallel plate arranged in an incident light path of the objective lens from the light source, and a driving means for inclining the plane-parallel plate about the optical axis, wherein the inclination angle of the plane-parallel plate is controlled by the driving means in accordance with the output from the detecting means, an incident light beam on the objective lens is shifted in accordance with the shift amount of the objective lens, thereby preventing the DC component from being superposed on the reproduction signal.

According to another one of the above embodiments, there is provided a magnetooptical information recording/reproducing apparatus in which a light beam is radiated on a magnetooptical recording medium and information recorded on the recording medium is reproduced from light reflected by the magnetooptical recording medium, characterized in that the light reflected by the recording medium is converged by a condenser lens, converged light is split into two light beams by a polarizing beam splitter serving as an analyzer, one of the two split light beams is detected by a multi-divided photodetector located at a position ahead of a convergence position of the condenser lens, the other of the two split light beams is detected by a multi-divided photodetector located behind the convergence position of the condenser lens, and a change in light amount distribution on the two multi-divided photodetectors is detected, thereby reproducing the recorded information.

In this embodiment, the light beams detected by the multi-divided photodetectors contain light produced by the magnetooptic effect of the magnetooptical recording medium and light produced by being diffracted at the curved surface of the objective lens.

According to an effect of one of the above embodiments, the DC component of the reproduction signal is detected, and the reproduction signal is corrected in accordance with the detection result to eliminate the DC component superposed on the reproduction signal. The pit edge position can be accurately detected without causing any error.

According to an effect of another one of the above embodiments, one of the two split light beams is detected by the multi-divided photodetector located ahead of the convergence position of the condenser lens, and the other of the two split light beams is detected by the multi-divided photodetector located behind the convergence position of the condenser lens, and a change in the light amount distributions on the two multi-divided photodetectors is changed. Even if the size of the recording pit is smaller than that of the light spot, the recorded information can be accurately detected. Signal reproduction can be accurately performed even if the recording density is increased.

Still another embodiment of the present invention will be described in detail with reference to the accompanying drawings.

Typical recording schemes for magnetooptical information recording apparatuses are an optical modulation scheme and a magnetic field modulation scheme. The optical modulation scheme is a scheme for radiating a light spot modulated with recording information while a predetermined external magnetic field is being applied to a magnetooptical recording medium. According to this scheme, the size of a domain formed on the recording medium is determined by the magnitude of a light intensity, a time for radiating a high-level light beam, and the speed of the recording medium. In particular, when the light beam radiation time is very shortened, the size of the domain is determined by the magnitude of the light intensity. Therefore, in the optical modulation scheme, the light beam radiation time and the light intensity are appropriately set to form a smaller domain than the light spot, thereby achieving high-density information recording. On the other hand, the magnetic field modulation scheme is a scheme for applying an external magnetic field modulated in accordance with recording information while a light spot having a predetermined intensity is being radiated on the magnetooptical recording medium. In order to perform high-density recording according to this magnetic field modulation scheme, the modulated magnetic field is switched at high speed. A domain shorter than the light spot can be obtained by high-speed inversion of the magnetic field.

Figures 37A, 37B:
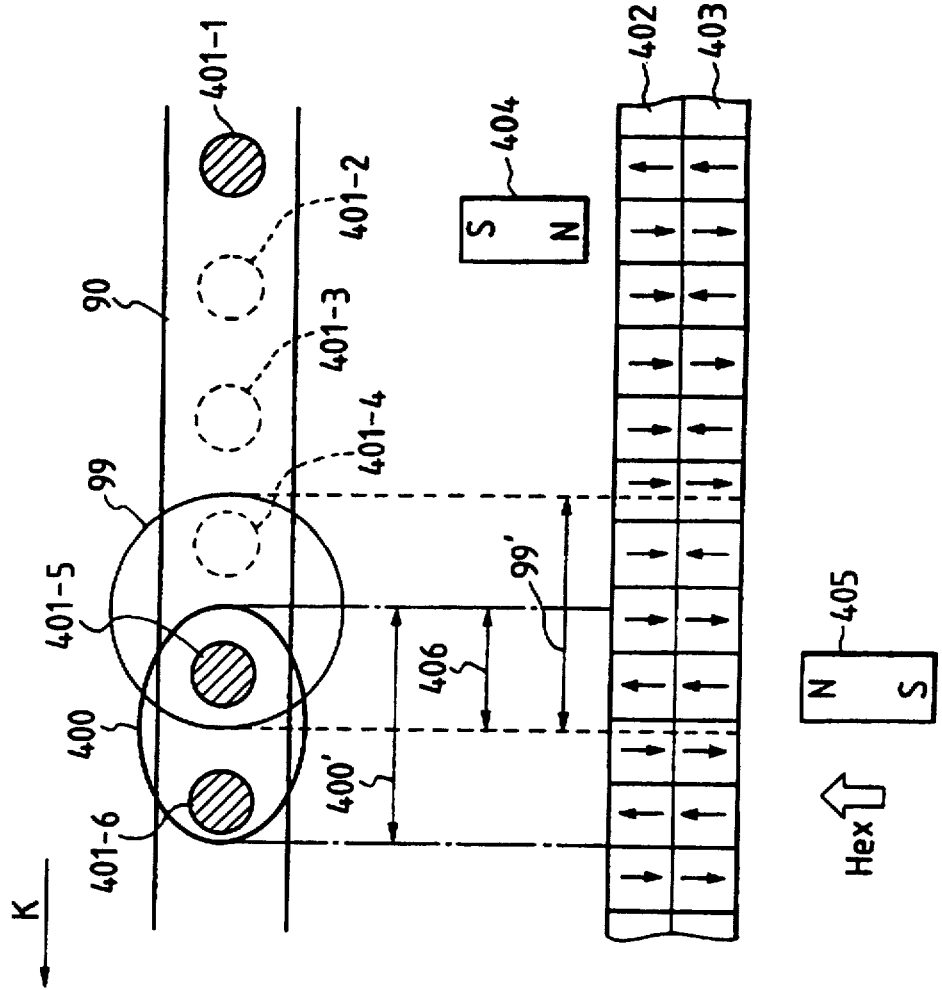
FIGS. 37A and 37B are views showing another conventional reproduction scheme.

A scheme (Optical Data Storage Topical Meeting 1991. 2. 25–27, TuB3, TuB4) shown in FIGS. 36A and 36B or a scheme (Nikkei Electronics, 1991. 3. 4. P. 92) shown in FIGS. 37A and 37B is a typical scheme for reproducing a domain recorded in a size smaller than that of the light spot. In either scheme, the light spot is partially masked to reduce a reproducible area. The above reproduction schemes will be described below. First, the former reproduction scheme will be described below. FIG. 36A is a plan view showing part of a magnetooptical recording medium. FIG. 36B is a view showing the magnetized states of the respective layers of the recording medium. The magnetooptical recording medium comprises the following three magnetic layers. A reproduction layer 94 has a Curie temperature of 300° C. or more and a coercive force of about 100 Oe at room temperature. A switching layer 95 has a Curie temperature of about 120° C. A recording layer 96 has a Curie temperature of about 250° C. Each of the switching layer 95 and the recording layer 96 has a coercive force of $10^4$ Oe or more at room temperature. Assume that a reproduction light spot 91 (91') is radiated on a track 90 and that the magnetooptical recording medium is moved in a direction indicated by an arrow K. In this case, the magnetic layers are heated by heat from the light spot 91. When a region 92 (92') is heated to a temperature or more at which magnetization of the switching layer disappears, this region becomes a mask region in which the light spot is partially masked. In this mask region 92 (92'), an exchange coupling force between the reproduction layer and the recording layer is shielded. When an external magnetic field is applied by a magnet 97 in the same direction of magnetization as that of the recorded domain, the direction of magnetization of the reproduction layer 94 in the mask region 92 (92') always is upward. Therefore, a portion of the light spot 91 (91') except for a substantial mask region 98 serves as a reproducible region. Therefore, a train of recorded domains 93-1 to 93-6 each smaller than the size of the light spot 91 (91') can be reproduced.

The latter reproduction scheme will be described with reference to FIGS. 37A and 37B. FIG. 37A is a plan view of a magnetooptical recording medium, and FIG. 37B is a view showing the magnetized states of the respective layers. In this case, the magnetooptical recording medium comprises two magnetic layers, i.e., a reproduction layer 402 and a recording layer 403. The recording layer 403 has a large coercive force and a Curie temperature equal to that of a normal magnetooptical recording medium. The reproduction layer 402 has a smaller coercive force and a lower Curie temperature than those of the recording layer 403. Assume that a reproduction light spot 99 is radiated on a track 90 and that the magnetooptical recording medium is moved in a direction indicated by an arrow K. In this case, when the magnetooptical recording medium passes under an initializing magnet 404, only the reproduction layer 402 having a smaller coercive force is forcibly magnetized downward to mask upwardly magnetized recording pits 401-2 to 401-4 of the recording layer 403. At this time, the temperature of a portion irradiated with the light spot 99 (99') is increased, and a region irradiated with the light spot for a long period of time is heated to a high temperature, so that a region 400 (400') to which recording pits 401-5 and 401-6 of the recording layer 403 are transferable by the exchange coupling force is formed. An auxiliary magnet 405 auxiliarily performs transfer of the recording pits. Therefore, a region 406 within the light spot 99 serves as a reproducible region. In this manner, in either scheme, the apparent diameter of the effective light spot can be reduced.

In the conventional reproduction schemes shown in FIGS. 36A and 36B and FIGS. 37A and 37B, a region to be masked is located in front of or behind the light spot. The quality of the reproduction signal is degraded by an influence from the non-masked side of the light spot. In particular, the reproduction scheme in FIGS. 36A and 36B is adversely affected by the portions in front of and behind the recording pits 93-3 and 93-6. In the reproduction scheme shown in FIGS. 37A and 37B, the initializing magnet results in a complicated, bulky apparatus.

The following embodiment of the present invention is made to solve the above problem and aims at providing a magnetooptical information recording/reproducing apparatus capable of performing high-quality reproduction of a domain recorded to have a size smaller than that of a light spot and performing direct verification simultaneously with recording.

According to an aspect of this embodiment, there is provided a magnetooptical information recording/reproducing apparatus comprising: means for radiating a recording light beam on a magnetooptical recording medium having two magnetic layers as recording and reproduction layers at least exchange-coupled to each other, and a magnetic layer for controlling an exchange coupling force between the recording and reproduction layers, thereby blocking the exchange coupling force between the two magnetic layers; means for applying an external magnetic field modulated according to an information signal to be recorded to a portion irradiated with the light beam, recording information on the recording layer, and orienting magnetization of the reproduction layer in a direction of the external magnetic field; a polarizing beam splitter serving as an analyzer for splitting the recording light beam reflected by the reproduction layer into two light beams; two multi-divided photodetectors for detecting the two split light beams; means for performing a predetermined operation using signals from detection surfaces of the two multi-divided photodetectors to generate a reproduction signal for verification; and means for performing verification of the recorded information using the resultant reproduction signal for verification.

According to another aspect of this embodiment, there is provided a magnetooptical information recording/ reproducing apparatus, comprising: means for radiating a reproduction light beam on a magnetooptical recording medium having two magnetic layers as recording and reproduction layers at least exchange-coupled, and a magnetic layer for controlling an exchange coupling force between the recording and reproduction layers, thereby forming a transferable region in which an exchange coupling force between the two magnetic layers is increased and a non-transferable region in which an exchange coupling force outside the transferable region is weakened; means for applying a magnetic field of a predetermined direction to the transferable region including the non-transferable region to mask information of the non-transferable region; a polarizing beam splitter serving as an analyzer for splitting the reproduction light beam reflected by the transferable region including the non-transferable region into two light beams; two multi-divided photodetectors for detecting the two split light beams; and means for performing a predetermined operation using signals from detection surfaces of the two multi-divided photodetectors and generating a reproduction signal.

Figure 1:
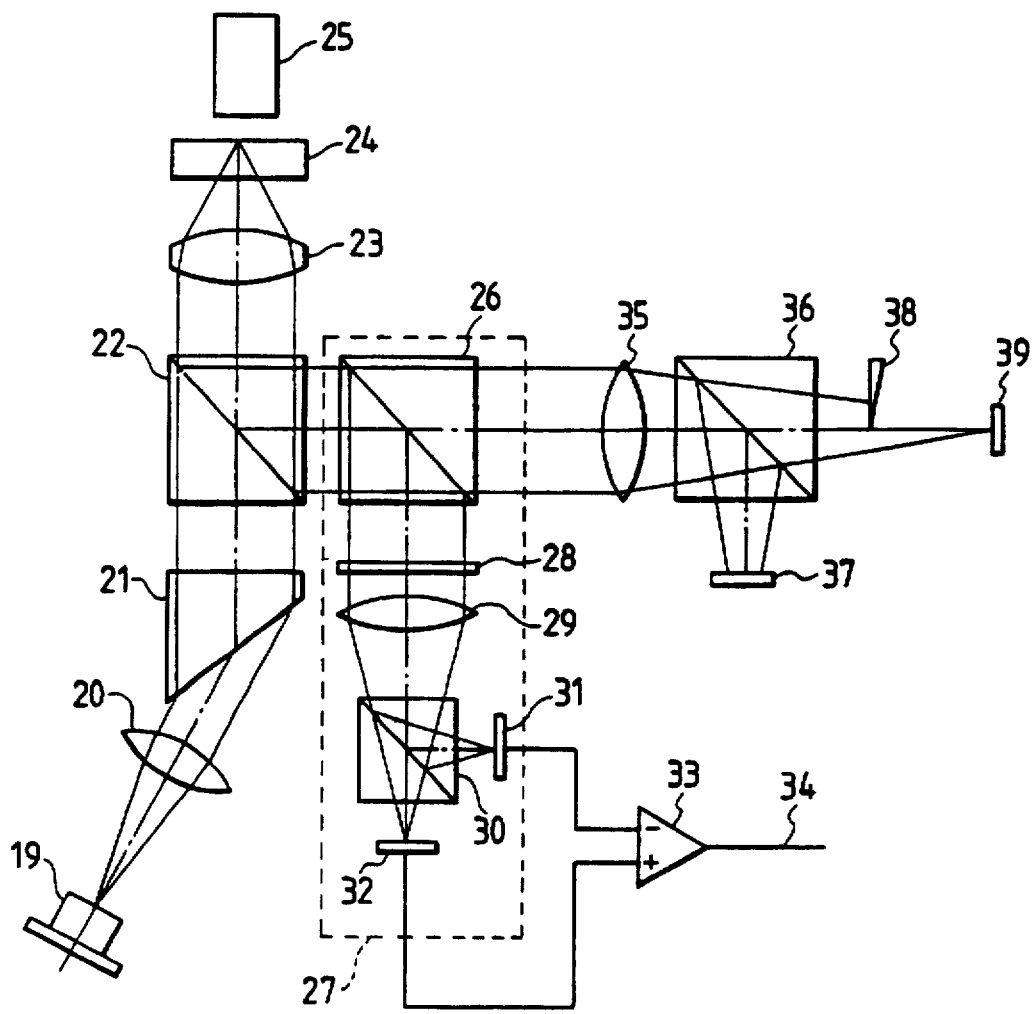
FIG. 1 is a constructional view showing an optical system of a conventional magnetooptical information recording/reproducing apparatus.
Figure 38:
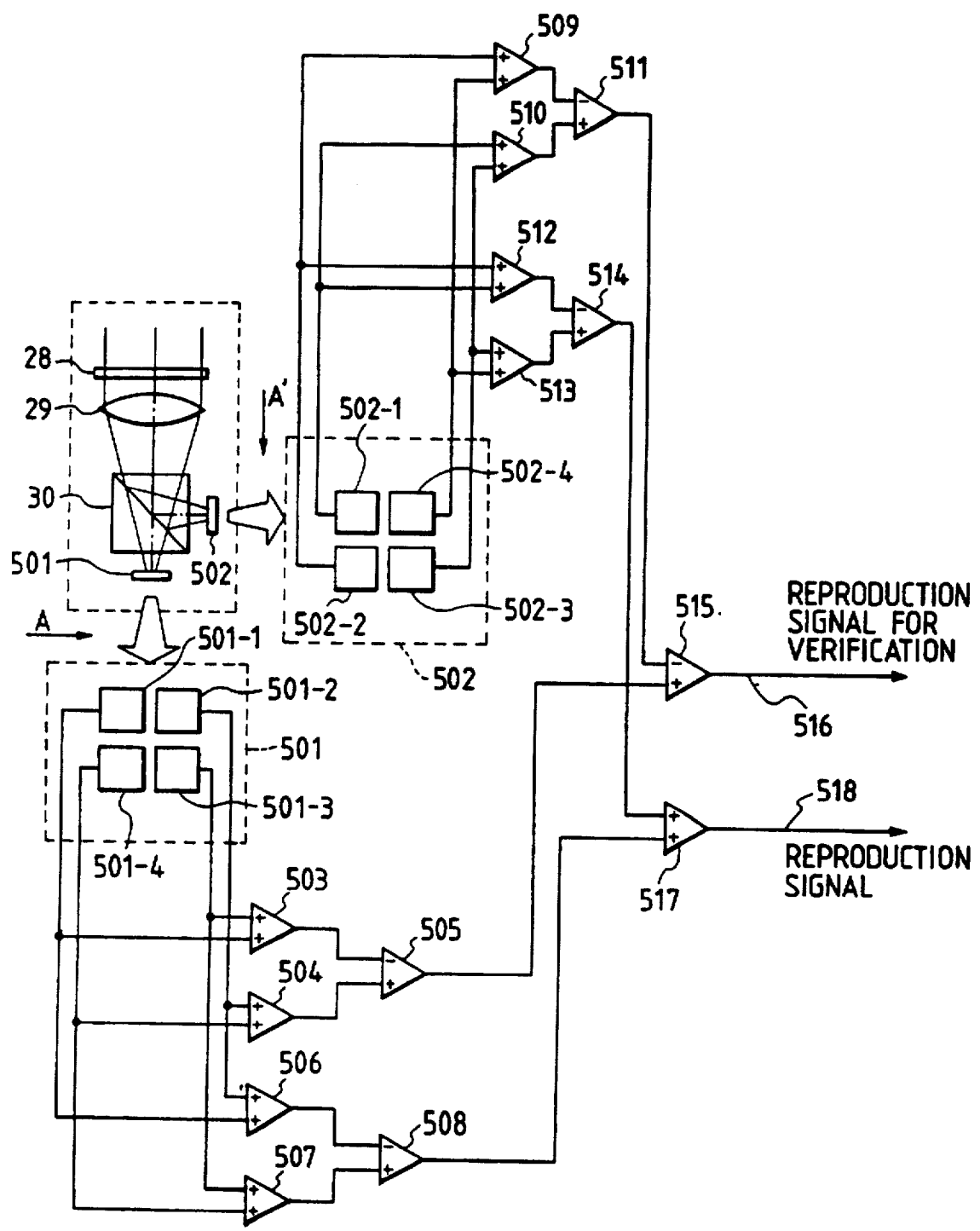
FIG. 38 is a constructional view showing a magnetooptical information recording/reproducing apparatus according to still another embodiment of the present invention.

This embodiment of the present invention will be described in detail with reference to the accompanying drawings. FIG. 38 is a constructional view showing a magnetooptical information recording/reproducing apparatus according to this embodiment. FIG. 38 shows only the construction of a reproduction optical system as the main part of this embodiment. Other constructions are the same as those in the apparatus shown in FIG. 1. The same reference numerals as in FIG. 1 denote the same parts in FIG. 38, and a detailed description thereof will be omitted. In this embodiment, an objective lens has a curved surface having a large curvature corresponding to an NA of 0.5 or more. A magnetooptical recording medium has three magnetic layers, and the detailed structure and characteristics thereof will be described in detail later. Referring to FIG. 38, the reproduction optical system includes a $\lambda/2$ plate 28, a condenser lens 29, and a polarizing beam splitter 30 serving as an analyzer. These optical components are identical to those in FIG. 1. A light beam split by the polarizing beam splitter 26 shown in FIG. 1 is incident on the $\lambda/2$ plate 28. Each of four-divided photodetectors 501 and 502 has four divided detection surfaces. The detection surfaces of the four-divided photodetectors 501 and 502 are illustrated in FIG. 38, and the directions of the information tracks of a magnetooptical disk 24 are indicated by arrows (A, A') so as to clarify the relative positional relationship with the magnetooptical disk 24. The four-divided photodetector 501 has detection surfaces 501-1 to 501-4, and an arrow A represents the direction of the information tracks. The four-divided photodetector 502 has detection surfaces 502-1 to 502-4, and an arrow A' represents the direction of the information track. The right and left detection surfaces of the four-divided photodetector 501 correspond to the left and right detection surfaces of the four-divided photodetector 502 so as to receive light through the polarizing beam splitter 30 serving as an analyzer. That is, the detection surfaces 501-1 and 502-1, the detection surfaces 501-2 and 502-2, the detection surfaces 501-3 and 502-3, and the detection surfaces 501-4 and 502-4 correspond to each other.

Addition amplifiers 503 and 504 add detection signals from the diagonal detection surfaces of the four-divided photodetector 501. Addition amplifiers 506 and 507 add the detection signals from the detection surfaces adjacent to each other along the direction of the information tracks of the four-divided photodetector 501. A differential amplifier 505 differentially detects the sum signals from the addition amplifiers 503 and 504. A differential amplifier 508 differentially detects the sum signals from the addition amplifiers 506 and 507. Addition amplifiers 509 and 510 add the detection signals from the diagonal detection surfaces of the four-divided photodetector 502. Addition amplifiers 512 and 513 add the detection signals from detection surfaces adjacent to each other along the direction of the track of the four-divided photodetector 502. A differential amplifier 511 differentially detects the sum signals from the addition amplifiers 509 and 510. A differential amplifier 514 differentially detects the sum signals from the addition amplifiers 512 and 513. A differential amplifier 515 differentially detects the output signals form the differential amplifiers 505 and 511. A signal obtained upon differential detection serves as a reproduction signal 516 for verification (to be described later). An addition amplifier 517 adds the output signals from the differential amplifiers 508 and 514. A sum signal from the addition amplifier 517 serves as a reproduction signal 518 in the normal reproduction mode.

In this embodiment, a light beam emitted from a semiconductor laser 19 is a linearly polarized light component (P-polarized light component) having the polarization direction parallel to the drawing surface in the same manner as in the conventional case. When this light beam is incident on the objective lens, the polarization plane is rotated because the objective lens has a large curvature and the reflectance for the incident light beam is greatly different from that for the perpendicularly polarized light component. When only the polarized components perpendicular to the polarization plane of the incident light beam are taken into consideration, a diffracted image has the form of a four-leaf clover (to be described later). The light beams incident on the four-divided photodetectors 501 and 502 are the polarized light components having the same polarization direction as that of the incident $P_+$ light and the polarized light component perpendicular thereto. Of these light components, $S_+$ and $S_-$ light components produced by the Kerr or Faraday effect of the magnetooptical disk, and the light components produced at the curved surface of the objective lens are also included.

FIG. 39 is a sectional view showing the detailed structure of the magnetooptical recording medium 24 used in this embodiment. Referring to FIG. 39, a transparent substrate 519 is made of a transparent material such as a plastic material. A protective layer 520, a reproduction layer 521 (first magnetic layer) 521, an adjustment layer 522 (third magnetic layer), a recording layer 523 (second magnetic layer), a protective layer 524, and a reflecting layer 525 are sequentially stacked on the transparent substrate 519. The reproduction layer 521 is exchange-coupled with the recording layer 523. The adjustment layer 522 formed between the reproduction and recording layers 521 and 523 has a function of controlling the exchange coupling force between the reproduction and recording layers 521 and 523 in accordance with the temperature of the light beam. An objective lens 526 for forming a light spot is required to actually perform recording and reproduction with respect to the magnetooptical disk. A magnetic head 527 opposes the objective lens 526.

FIG. 40 is a graph showing the relationship between the temperatures of the respective magnetic layers and the coercive forces. A characteristic curve 528 represents the characteristics of the reproduction layer 521, a characteristic curve 529 represents the characteristics of the adjustment layer 522, and a characteristic curve 530 represents the characteristics of the recording layer 523. As is apparent from FIG. 40, the reproduction layer 521 has a small coercive force $H_{c528}$ at room temperature and a high Curie temperature $T_{c528}$. The recording layer 523 has a large coercive force $H_{c530}$ at room temperature and a low Curie temperature $T_{c530}$. The adjustment layer 522 has a small coercive force $H_{c529}$ at room temperature and a low Curie temperature $T_{c529}$. $T_R$ represents the temperature range of the magnetic layer near the light spot in the reproduction mode. The temperature range $T_R$ is higher than the room temperature and lower than the Curie temperature $T_{c529}$. $T_W$ represents the temperature range of the magnetic layer near the light spot in the recording mode. The temperature range $T_W$ is higher than the Curie temperature $T_{c529}$ of the adjustment layer 522 near the Curie temperature $T_{c530}$ of the recording layer 523 and lower than the Curie temperature $T_{c528}$ of the reproduction layer 521. The detailed composition and thickness of the magnetooptical recording medium, and other characteristics are summarized in Table 1.

TABLE 1

| | Composition | Thickness | Curie Temperature | Coercive Force | Saturated Magnetization (Ms) |
|---|---|---|---|---|---|
| Reproduction Layer 521 | GdFeCo | 300 Å | ≅400° C. | ≅0.1 kOe | ≦200 emu/cc |
| | | | | TM-rich. | |
| Adjustment Layer 522 | GdFeCo | 100 Å | ≅140° C. | RE-rich | 300 to 400 emu/cc |
| Recording Layer 523 | TbFeCo | 400 Å | ≅250° C. | >10 kOe | RE-rich +200 emu/cc to TM-rich −200 emu/cc |

As shown in Table 1, the reproduction layer 521 has, for example, a TM-rich composition and has an Ms value (saturated magnetization) of 200 emu/cc or less. The adjustment layer 522 has an RE-rich composition and an Ms value of about 300 to 400 emu/cc. The recording layer 523 has, for example, an RE-rich or TM-rich composition and an Ms value of 200 emu/cc or less or −200 emu/cc or more.

The exchange coupling force between the reproduction layer 521 and the recording layer 523 and the function of the adjustment layer 522 will be described below. When a temperature is set to the temperature range $T_R$ or less in the reproduction mode, the adjustment layer 522 has a large Ms value. The anisotropy constant is adjusted according to the $2\pi Ms^2$ value, so that the adjustment layer 522 is not perpendicularly magnetized but longitudinally magnetized. For this reason, the exchange coupling force between the reproduction layer 521 and the recording layer 523 is weakened. That is, when an external magnetic field $H_{ex}$ having a higher strength than the magnitude of the coercive force of the reproduction layer 521 is applied, the direction of magnetization of the reproduction layer 521 is oriented toward the direction of external magnetic field. In the reproduction mode, when the magnetic layer is heated to a temperature falling within the temperature range $T_R$, the anisotropy constant of the adjustment layer 522 becomes larger than the $2\pi Ms^2$ value at this temperature. In this case, the adjustment layer 522 is perpendicularly magnetized. For this reason, the exchange coupling force between the reproduction layer 521 and the recording layer 523 is increased, so that the direction of magnetization recorded on the recording layer 523 can be transferred to the reproduction layer 521. In addition, when the temperature of the magnetic layer is increased to the temperature range $T_W$ in the recording mode, the temperature of the adjustment layer 522 exceeds the Curie temperature $T_{c529}$, and its magnetization disappears. For this reason, the exchange coupling force between the reproduction layer 521 and the recording layer 523 is shielded. When an external modulation magnetic field $\pm H_{ex}$ having a higher strength than the magnitude of the coercive force of the reproduction layer 521 is applied, the magnetization of the reproduction layer 521 is oriented in the direction of the external modulation magnetic field.

The basic recording and reproduction operations of the magnetooptical information recording/reproducing apparatus of this embodiment will be described below. An information recording operation will be described first with reference to FIGS. 41A and 41B. FIG. 41A is a plan view showing part of a magnetooptical recording medium, and FIG. 41B is a view showing the magnetized states of the respective magnetic layers. Information is recorded on an information track 531 of the magnetooptical recording medium. Assume that the magnetooptical recording medium is moved in a direction indicated by an arrow K (parallel to the track). A region 532 (532') (these reference numerals will also be referred to as a light spot) is irradiated with a recording light spot radiated on the track 531, i.e., a light spot in the recording mode. This light spot is obtained by converging a light beam from a light source such as a semiconductor laser through an objective lens 526 shown in FIG. 39. The temperature of each magnetic layer is increased upon radiation of this light spot 532. An exchange coupling force shielding region 534 (534') corresponds to the temperature range $T_W$ shown in FIG. 40. Within this exchange coupling force shielding region 534, magnetization of the adjustment layer 522 disappears, and the exchange coupling force between the reproduction layer 521 and the recording layer 523 is shielded. A region 533 (533') indicates a high-temperature side of the temperature range $T_W$. The region 533 is a recordable region in which magnetization of the recording layer 523 can be reversed upon application of the external modulation magnetic field $\pm H_{ex}$ applied from a magnetic head 527 shown in FIG. 39.

In order to record information, the light spot 532 having a predetermined power is scanned and radiated to form the recordable region 533 and the exchange coupling force shielding region 534 including the light spot 532 and the recordable region 533. The external magnetic field is modulated into $+H_{ex}$ or $-H_{ex}$ by the magnetic head 527 in accordance with information to be recorded. The resultant magnetic field is applied to a region almost including the exchange coupling force shielding region 534. As a result, a domain is recorded within the recordable region 533 of the recording layer 523. An information pit (domain) subjected to an overwrite operation has a shape of the feather of an arrow as in a magnetic field modulation overwrite scheme. That is, as shown in FIG. 41A, since new information is overwritten on an old information domain 535-1, a new information domain 535-2 has a feather-like shape whose leading and trailing ends are made arcuate. In this case, when the modulation frequency of the external magnetic field is increased, the length of the domain to be recorded in the K direction can be reduced to about ½ that of the light spot 532. On the other hand, the direction of magnetization of the reproduction layer 521 within the exchange coupling force shielding region 534 is changed in accordance with modulation of the external magnetic field. That is, the direction of magnetization of the reproduction layer 521 becomes the same direction of the domain overwritten on the recording layer 523. The polarization state of light reflected by the magnetooptical recording medium is detected by the reproduction optical system of the optical head shown in FIG. 38, thereby detecting the direction of magnetization of the reproduction layer 521. That is, it is determined on the basis of a defect or the like of the magnetic layer whether a domain write error occurs. Therefore, direct verification can be performed simultaneously with recording using one light spot.

Figures 42A, 42B:
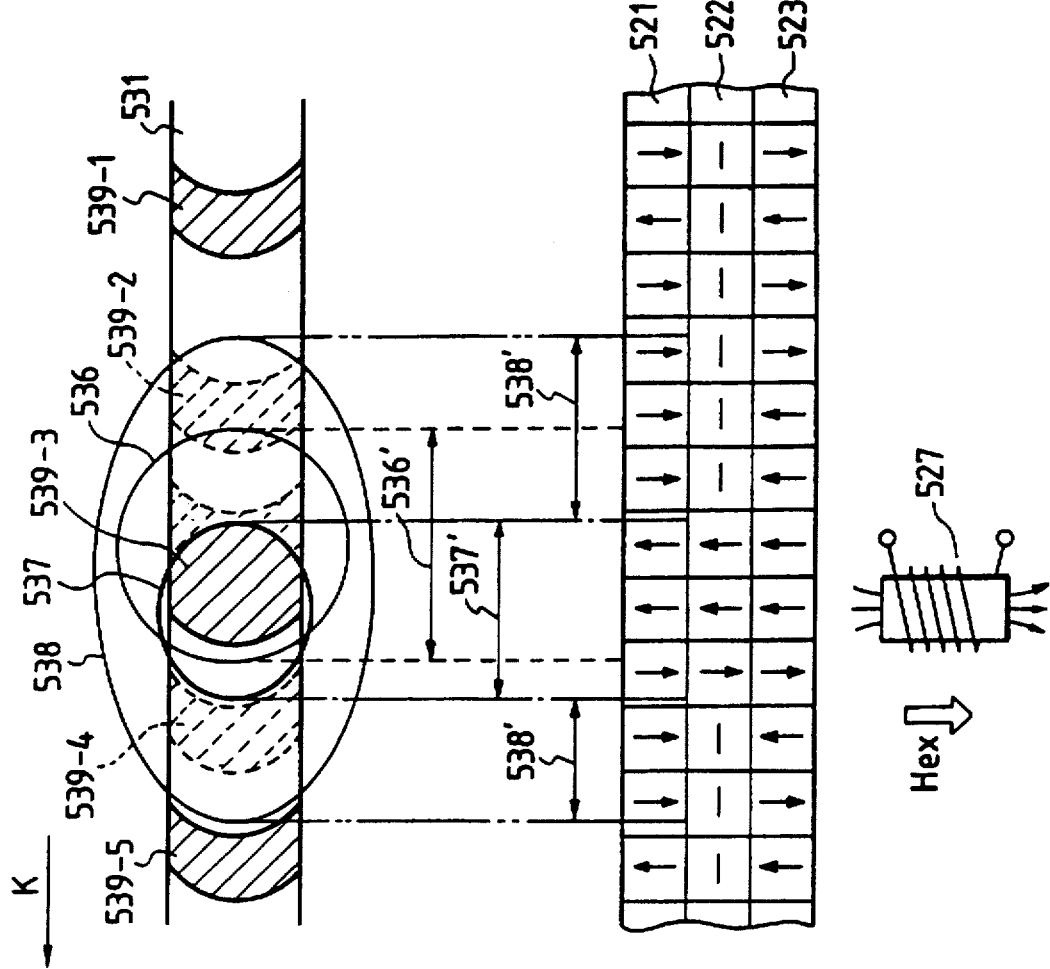
FIGS. 42A and 42B are views showing light spots on an information track, information domains, and the magnetized states of the respective magnetic layers in information reproduction of the embodiment shown in FIG. 38.

The information reproduction operation will be described with reference to FIGS. 42A and 42B. FIG. 42A is a plan view showing part of the magnetooptical recording medium. FIG. 42B is a view showing magnetized states of the respective magnetic layers. Information to be recorded is recorded on an information track 531 on the magnetooptical recording medium. Assume that the magnetooptical recording medium is moved in a direction indicated by an arrow K. A region 536 (536') (these reference numerals will also be referred to as a light spot) is irradiated with a reproduction light spot having a lower power than that of the recording light spot. The temperature of the magnetic layer is increased upon radiation of this light spot 536. A transferable region 537 (537') corresponds to the temperature range $T_R$ shown in FIG. 40. Within the transferable region 537', the adjustment layer 522 is perpendicularly magnetized, and the exchange coupling force between the reproduction layer 521 and the recording layer 523 is increased. For this reason, the direction of magnetization of the recording layer 523 is transferred as the direction of the reproduction layer 521 regardless of the external magnetic field applied from the magnetic head 527. A non-transferable region 538 (538') surrounds the transferable region 537 so as to include the transferable region 537. The temperature of the magnetic layer within the non-transferable region 538 is less than the temperature range $T_R$. Within this region 538, the adjustment layer 522 is longitudinally magnetized, and the exchange coupling force between the reproduction layer 521 and the recording layer 523 is weakened. Therefore, the direction of magnetization of the reproduction layer 521 follows the direction of the external magnetic field applied from the magnetic head 527 regardless of the direction of magnetization of the recording layer 523. At this time, the magnetic head 527 applies the external magnetic field in a predetermined direction.

In the reproduction mode, as described above, the light spot 536 having a predetermined power lower than that of the recording light spot is scanned and radiated to form the transferable region 537 and the non-transferable region 538. In this state, the external magnetic field of the predetermined direction is applied from the magnetic head 527 to a region almost including the non-transferable region 538. The direction of the external magnetic field may be the same as or opposite to the direction of magnetization of the recording layer 523 in the initial state. As a result, of all domains 539 on the track 531, domains 539-2, and 539-4, and part of a domain 539-3 represented by dotted lines and falling within the non-transferable region 538 are masked. Only the domain 539-3 represented by the solid line and appearing within the transferable region 537 contributes to a change in polarization state of the reflected reproduction light. When this reflected light is detected by the reproduction optical system of the optical head shown in FIG. 38, and its polarization state is detected, the direction of magnetization of the domain within the transferable region 538 in the reproduction layer 521 can be detected. Therefore, a domain having a length smaller than the diameter of the light spot 536 can be reproduced. In this embodiment, since the region to be masked surrounds the region (transferable region 537) contributing to a change in polarization state of the reflected reproduction light, a highly reliable reproduction signal which has a minimum influence from the neighboring domains, as compared with the conventional mask schemes shown in FIGS. 36A and 36B and FIGS. 37A and 37B, can be obtained. When the transferable region 537 can be set smaller, a domain having a smaller length can be reproduced. However, when the C/N ratio of the reproduction signal is taken into consideration, it is preferable that the size of the transferable region 537 is about ½ that of the reproduction light spot 536.

The basic recording and reproduction operations of this embodiment have been described above. An operation for detecting a verification signal and a reproduction signal according to this embodiment will be described in detail below. The light beams incident on the four-divided photodetectors 501 and 502 are polarized light components having the same polarization direction as that of the $P_+$ incident light shown in FIG. 2 and polarized light components perpendicular to the above light components. These light components include $S_+$ and $S_-$ light components produced by the Kerr or Faraday effect of the magnetooptical recording medium, and light components diffracted at the curved surface of the objective lens.

In this embodiment, the two light beams described with reference to FIGS. 19A to 20C and the $S_+$ and $S_{31\ -}$ light beams changed in accordance with the magnetized states on the magnetooptical recording medium are split by a polarizing beam splitter serving as an analyzer. A change in light amount distribution derived from the three different light beams is detected by the two four-divided photodetectors, thereby reproducing information.

Figure 43A:
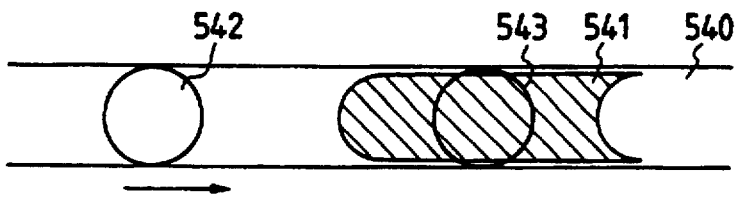
Figure 43B:

The operation for detecting the verification signal in the recording mode will be described with reference to FIGS. 43A to 43I. FIG. 43A is an enlarged view of an information track of the magnetooptical recording medium. Recording light spots 542 and 543 scan along an information track 540. In a case of recording information, a downward external magnetic field is applied from the magnetic head 527 to the position of the light spot 542, and a downward domain is formed on the recording layer 523, as described with reference to FIGS. 41A and 41B. An upward external magnetic field is applied to the position of the light spot 543 to form an upward domain on the recording layer 523. An information pit (domain) 541 thus formed has a shape of the feather of an arrow. The actual recordable region 533 described with reference to FIGS. 41A and 41B is slightly shifted from the light spot. In the exchange coupling force shielding region 534 having the light spot, the exchange coupling force between the recording layer 523 and the reproduction layer 521 is shielded by the adjustment layer 522. As shown in FIG. 43B, the domain on the reproduction layer 521 within the exchange coupling force shielding region 534 at the position of the light spot 542 is a downward domain having the same direction as that of the external magnetic field. Therefore, the light spot becomes light 544 reflected by the downward domain. An S-polarized light component contained in this reflected light becomes the $S_+$ light beam shown in FIG. 2. On the other hand, at the position of the light spot 543, the light spot becomes light 545 reflected by the upward domain. The S-polarized light component of this reflected light becomes the $S_-$ light beam.

Figure 43C:
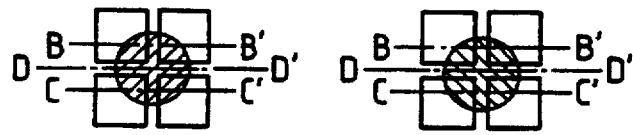
Figure 43D:
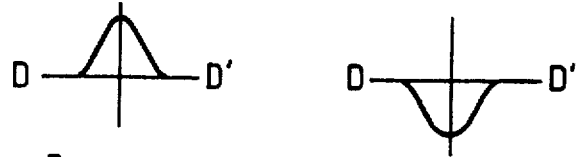
Figure 43E:
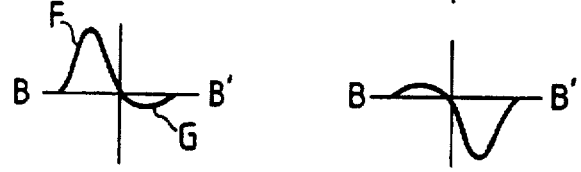
Figure 43F:
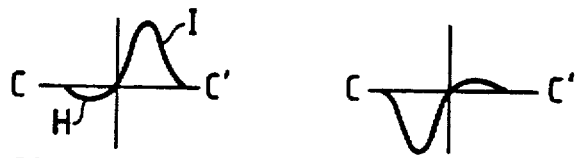

FIG. 43C is a view showing the distributions of the S-polarized light components produced by the magnetooptic effect before these light components are incident on the polarizing beam splitter 30 as an analyzer at the positions of the respective light spots. The light spots are projected on the detection surfaces of the four-divided photodetectors. As is apparent from FIG. 43C, the distributions of the S-polarized light components at the positions of the light spots 542 and 543 are circular in shape. However, the phase of the S-polarized light component at the position of the light spot 542 is different from that at the position of the light spot 543. At the position of the light spot 542, the S-polarized light component is in-phase with the light E represented in FIGS. 19A and 20A. To the contrary, the S-polarized light component at the position of the light spot 543 is in-phase with the light E' represented in FIG. 20A, so that the S-polarized light component at the position of the light spot 542 has a phase difference of $\pi$ from that at the position of the light spot 543. FIG. 43D is a view showing the amplitudes of the light components on the section along the line D–D' of FIG. 43C at the positions of the respective light spots. FIGS. 43E and 43F are views obtained such that the distributions of the light obtained by superposing the S-polarized light components produced at the curved surface of the objective lens, as described with reference to FIGS. 20A to 20C on the S-polarized light components produced by the magnetooptic effect in FIG. 43D are represented in the form of amplitudes of the light components on the sections along the lines B–B' and C–C' of FIG. 43C at the positions of the respective light spots. Further, FIG. 43E shows the amplitudes of the light components along the line B–B', and FIG. 43F shows the amplitudes of the light components along the line C–C'.

FIGS. 43G and 43H are views showing the detection light amount differences of the respective detection surfaces when the S-polarized light components produced at the curved surface of the objective lens, the S-polarized light components produced by the magnetooptic effect, and the $P_+$ light beam shown in FIGS. 20A to 20C are split into two beams on the splitting plane of the polarizing beam splitter 30 as an analyzer and the split beams are respectively detected on the two four-divided photodetectors 501 and 502. That is, FIG. 43G shows the detection light amount differences on the detection surfaces of the four-divided photodetector 501, and FIG. 43H shows the detection light amount differences on the detection surfaces of the four-divided photodetector 502. Referring to FIGS. 43G and 43H, the light amounts are represented as LL (L: large), LS (S: small), SL, and SS in order from the larger values. As described with reference to FIG. 38, light incident on the four-divided photodetector 502 is reflected by the polarizing beam splitter 38, the right or left detection surfaces of the four-divided photodetector 502 correspond to the left or right detection surfaces of the four-divided photodetector 501. When the light distributions on the four-divided photodetectors at the position of the light spot 542 as the left end position in FIGS. 43G and 43H, the detection surface 501-1 of the four-divided photodetector 501 corresponds to the detection surface 502-1 of the four-divided photodetector 502. The light incident on these detection surfaces is a sum of the large upward amplitude (the $S_+$ direction component shown in FIG. 2) on the left represented by F of the light amplitude on the section along the line B–B' in FIG. 43E and the upward amplitude (the $P_+$ direction component shown in FIG. 2) shown in FIGS. 19A and 19B. That is, the polarization plane of the light incident on the above detection surfaces is rotated in the $+\Theta$ side. If the light polarized by the polarizing beam splitter 30 serving as a $+45°$ analyzer is incident on the four-divided photodetector 501, as shown in FIG. 43G, and the light polarized by the polarizing beam splitter 30 serving as a $-45°$ analyzer is incident on the four-divided photodetector 502, as shown in FIG. 43H, the amount of light incident on the detection surface 501-1 is larger than that on the detection surface 502-1.

The light amounts are represented as LL on the detection surface 501-1 and LS on the detection surface 502-1 (LL>LS).

The detection surface 501-2 corresponds to the detection surface 502-2. Light incident on these detection surfaces is a sum of the small downward amplitude (the $S_-$ direction component in FIG. 2) on the right side represented by G of the light amplitude on the section along the line B–B' in FIG. 43E and the upward amplitude (the $P_+$ direction component in FIG. 2) shown in FIGS. 19A and 19B. That is, the light incident on the above detection surfaces is light the polarization plane of which is rotated on the $-\Theta$ side. In this case, the amount of light incident on the detection surface 501-2 is smaller than that on the detection surface 502-2. The light amounts are represented as SS on the detection surface 501-2 and SL on the detection surface 502-2 (SS<SL). The detection surface 501-3 corresponds to the detection surface 502-3. Light incident on these detection surfaces is a sum of the small downward amplitude represented by I of the light amplitude on the section along the line C–C' in FIG. 43F and the upward amplitude shown in FIGS. 19A and 19B. In this case, the amount of light incident on the detection surface 501-3 is larger than that on the detection surface 502-3. The light amounts are represented as LL on the detection surface 501-3 and LS on the detection surface 502-3. Light incident on the detection surfaces 501-4 and 502-4 is a sum of the large upward amplitude represented by H of the light amplitude on the section along the line C–C' in FIG. 43F and the upward amplitude shown in FIGS. 19A and 19B. In this case, the amount of light incident on the detection surface 501-4 is smaller than that on the detection surface 502-4. The light amounts are represented as SS on the detection surface 501-4 and SL on the detection surface 502-4. Similarly, the amounts of lights incident on the detection surfaces of the four-divided photodetectors 501 and 502 are represented, as shown in FIGS. 43G and 43H.

Figure 43I:
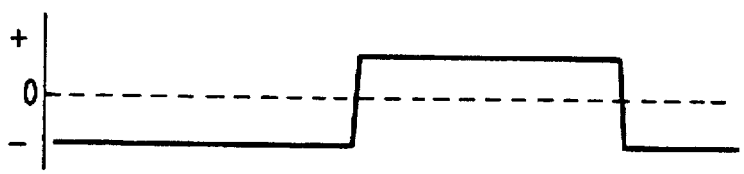

In the information recording mode, the light amounts on the respective detection surfaces of the four-divided photodetectors 501 and 502 are changed depending on the magnetized states of the information track. Signals from the detection surfaces of the four-divided photodetectors 501 and 502 are output to an analog operation circuit shown in FIG. 38 to generate a reproduction signal for verification, as shown in FIG. 43I. More specifically, the detection signals from the diagonal detection surfaces 501-1 and 501-3 and the diagonal detection surfaces 501-2 and 501-4 of the four-divided photodetector 501 are added by the addition amplifiers 503 and 504, and sum signals from the addition amplifiers 503 and 504 are differentially detected by the differential amplifier 505. The detection, signals from the diagonal detection surfaces 502-1 and 502-3 and the diagonal detection surfaces 502-2 and 502-4 of the four-divided photodetector 502 are added by the addition amplifiers 509 and 510, and sum signals from the addition amplifiers 503 and 504 are differentially detected by the differential amplifier 511. Output signals from the differential amplifiers 505 and 511 are differentially detected by the differential amplifier 515, thereby generating the reproduction signal for verification, as shown in FIG. 43I. The resultant reproduction signal has a predetermined negative level in the region of downward magnetization and a predetermined positive level in the region of upward magnetization. The reproduction signal is a pulse signal which rises from the negative level to the positive level or from the positive level to the negative level at an edge of the domain 541. The reproduction signal for verification is subjected to demodulation or the like in a signal processing circuit (not shown) and is thus converted into reproduced data. This data is supplied to a verification determination circuit (not shown). The reproduced data is sequentially compared with the recording data in the verification determination circuit to determine whether the information is correctly recorded. That is, verification can be performed simultaneously with recording, i.e., direct verification is performed.

Figure 44A:
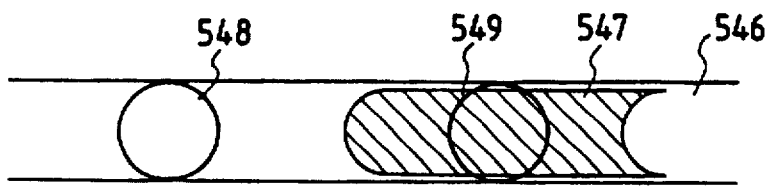
Figure 44B:
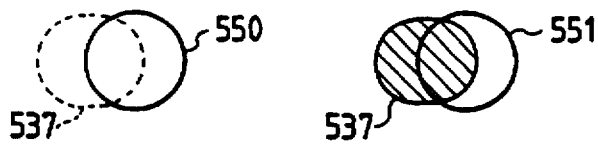

The reproduction signal detection operation in the normal reproduction mode will be described with reference to FIGS. 44A to 44I. FIG. 44A is an enlarged view of an information track. Light spots 548 and 549 are reproduction light spots for scanning along an information track 546. A domain 547 is recorded on the information track 546. In the information reproduction mode, since the downward external magnetic field is applied, as described with reference to FIGS. 42A and 42B, the magnetization of the reproduction layer 521 within the non-transferable region 538 orients downwardly at both the positions of light spots 548 and 549. Since the direction of magnetization of the reproduction layer 521 within the transferable region 537 is the same as that of the recording layer 523, magnetization orients downwardly at the position of the light spot 548, and magnetization orients upwardly at the position of the light spot 549. That is, as shown in FIG. 44B, all the directions of magnetization within a light spot 550 are downward at the position of the light spot 548. The directions of magnetization within a spot 551 are upward and downward at the position of the light spot 549.

Figure 44C:
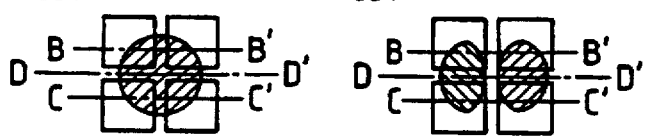
Figure 44D:
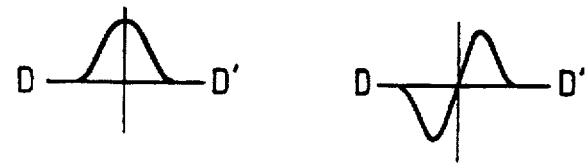
Figure 44E:
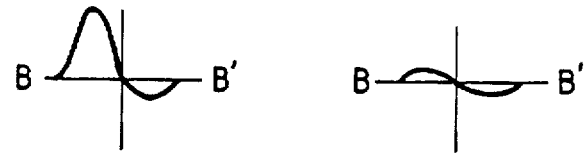
Figure 44F:
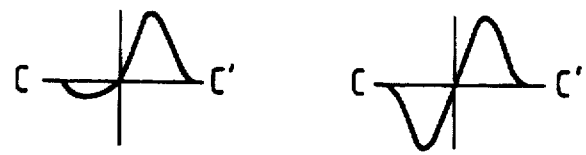
Figure 44I:

FIG. 44C is a view showing distributions of S-polarized light components produced by the magnetooptic effect before these components are incident on the polarizing beam splitter 30 at the positions of the light spots 548 and 549. The light beams are projected on the detection surfaces of the four-divided photodetectors. As shown in FIG. 44C, the S-polarized light component at the position of the light spot 548 has a circular distribution. However, at the position of the light spot 549, the $S_+$ and $S_-$ components are mixed and split into the right and left portions because they have a phase difference of $\pi$. The left light component is the $S_-$ light component, while the right light component is the $S_+$ light component. FIG. 44D is a view showing the amplitudes of the light components on the section along the line D–D' of FIG. 44C. FIGS. 44E and 44F are views obtained such that the distributions of the light obtained by superposing the S-polarized light components produced at the curved surface of the objective lens, as described with reference to FIGS. 20A to 20C on the S-polarized light components produced by the magnetooptic effect in FIG. 44D are represented in the form of the amplitudes of the light components on the sections along the lines B–B' and C–C' of FIG. 44C at the positions of the respective light spots. That is, FIG. 44E shows the amplitudes of the light components along the line B–B', and FIG. 44F shows the amplitudes of the light components along the line C–C'.

FIGS. 44G and 44H are views showing the detection light amount differences of the respective detection surfaces when the S-polarized light components produced at the curved surface of the objective lens, the S-polarized light components produced by the magnetooptic effect, and the $P_+$ light beam shown in FIGS. 20A to 20C are split into two beams on the splitting plane of the polarizing beam splitter 30 as an analyzer and the split beams are respectively detected on the two four-divided photodetectors 501 and 502. In the reproduction mode, as shown in FIGS. 44G and 44H, the detection light amount differences at the position of the light spot 548 are the same as those in the information recording mode shown in FIGS. 43G and 43H. However, at the position of the light spot 549, the light distributions on the detection surfaces are different from those of FIGS. 43G and 43H, as shown in FIG. 44C. Signals from the detection surfaces of the four-divided photodetectors 501 and 502 are output to an analog operation circuit shown in FIG. 38 to generate a reproduction signal shown in FIG. 44. More specifically, the detection signals from the detection surfaces 501-1 and 501-2 adjacent to each other along the track direction and the detection surfaces 501-3 and 501-4 adjacent to each other along the track direction of the four-divided photodetector 501 are added by the addition amplifiers 506 and 507, and sum signals from the addition amplifiers 506 and 507 are differentially detected by the differential amplifier 508. The detection signals from the detection surfaces 502-1 and 502-2 adjacent to each other along the track direction and the detection surfaces 502-3 and 502-4 adjacent to each other along the track direction of the four-divided photodetector 502 are added by the addition amplifiers 512 and 513, and sum signals from the addition amplifiers 512 and 513 are differentially detected by the differential amplifier 514. Signals from the differential amplifiers 508 and 514 are further added by the addition amplifier 517, thereby generating the reproduction signal 518 shown in FIG. 44I. The resultant reproduction signal has a zero level in the region of downward magnetization and a positive constant level in the region of upward magnetization. The reproduction signal is a pulse signal which rises or falls at an edge of the domain 547. This reproduction signal is supplied to a signal processing circuit (not shown) and subjected to demodulation or the like, thereby generating the reproduced data. In the information reproduction, when a ratio of the transferable region 537 to the non-transferable region 538 within the light spot is set to be 1:1, a domain having a size almost ½ that of the light spot can be stably reproduced.

Figure 45:
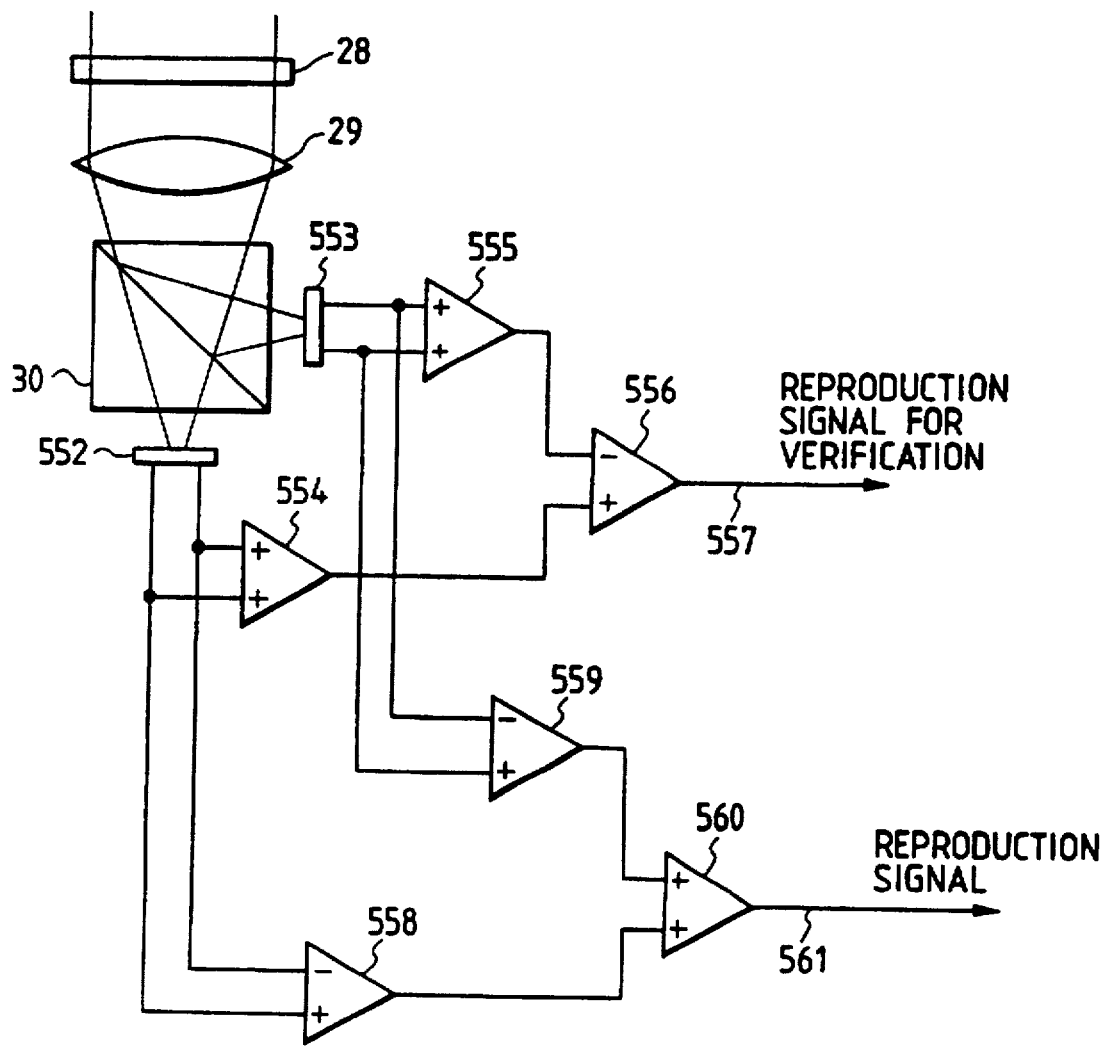
FIG. 45 is a constructional view showing still another embodiment of the present invention.

FIG. 45 is a view showing still another embodiment of the present invention. In this embodiment, two-divided photodetectors 552 and 553 are used in place of the four-divided photodetectors. An apparatus of this embodiment includes a λ/2 plate 28, a condenser lens 29, and a polarizing beam splitter 30 serving as an analyzer. These optical elements are identical to those in the embodiment of FIG. 38. Each of the two-divided photodetectors 552 and 553 has two detection surfaces spatially divided along the direction of an information track. More specifically, the two-divided photodetector 552 may be regarded as an arrangement such that the detection surfaces 501-1 and 501-2 and the detection surfaces 501-3 and 501-4 adjacent to each other along the track direction of the four-divided photodetector 501 shown in FIG. 38 are integrated to obtain the two divided detection surfaces. Similarly, the two-divided photodetector 553 may be regarded as an arrangement such that the detection surfaces 502-1 and 502-2 and the detection surfaces 502-3 and 502-4 adjacent to each other along the track direction of the four-divided photodetector 502 are integrated to obtain the two divided detection surfaces. In the information recording mode, detection signals from the detection surfaces of the two-divided photodetector 552 are added by an addition amplifier 554, and detection signals from the detection surfaces of the two-divided photodetector 553 are added by an addition amplifier 555. Sum signals from the addition amplifiers 554 and 555 are differentially detected by a differential amplifier 556. The resultant signal is output as a reproduction signal for verification. On the other hand, in the information reproduction mode, the detection signals from the detection surfaces of the two-divided photodetector 552 are differentially detected by a differential amplifier 558, and the detection signals from the detection surfaces of the two-divided photodetector 553 are differentially detected by a differential amplifier 559. Two differential detection signals from the differential amplifiers 558 and 559 are added by an addition amplifier 560. An output signal from the addition amplifier 560 is output as a normal information reproduction signal.

This embodiment can be suitably used when the NA of the objective lens is not so large, and the light amount in the shape of a four-leaf clover shown in FIG. 20A is almost equal to the amount of S-polarized light components produced by the magnetooptic effect. That is, under these conditions, the quality of the reproduction signal detected by the two-divided photodetectors is not much different from that in the embodiment of FIG. 38. In the embodiment of FIG. 45, the construction can be much simpler than that of the embodiment in FIG. 38. On the other hand, when the NA of the objective lens is increased to reduce the size of the light spot, the light amount in the form of a four-leaf clover shown in FIG. 20A is much larger than the amount of S-polarized light components. In this case, detection using the four-divided photodetectors in the embodiment of FIG. 38 is better than that of FIG. 45.

According to one of the above embodiments, there is provided a magnetooptical information recording/reproducing apparatus comprising: means for radiating a recording light beam on a magnetooptical recording medium having two magnetic layers as recording and reproduction layers at least exchange-coupled to each other, and a magnetic layer for controlling an exchange coupling force between the recording and reproduction layers, and for shielding the exchange coupling force between the two magnetic layers; means for applying an external magnetic field modulated according to an information signal to be recorded to a portion irradiated with the light beam, for recording information on the recording layer, and for orienting magnetization of the reproduction layer in a direction of the external magnetic field; a polarizing beam splitter serving as an analyzer for splitting the recording light beam reflected by the reproduction layer into two light beams; two multi-divided photodetectors for detecting the two split light beams; means for performing a predetermined operation using signals from detection surfaces of the two multi-divided photodetectors to generate a reproduction signal for verification; and means for performing verification of the recorded information using the resultant reproduction signal for verification.

In the magnetooptical information recording/reproducing apparatus, the light beams reflected by the magnetooptical recording medium include a polarized light component having the same polarization direction as that of the incident light on the recording medium, a polarized light component having the polarization direction perpendicular to the polarization direction of the incident light and produced by the magnetooptic effect, and a light component produced at the curved surface of the beam focusing objective lens, wherein an amount of light component produced by the magnetooptic effect is equal to or smaller than an amount of light component produced at the curved surface of the objective lens.

In the magnetooptical information recording/reproducing apparatus, the multi-divided photodetector comprises a four-divided photodetector having detection surfaces divided in a crossed shape such that division lines of the detection surfaces are parallel and perpendicular to the information track of the magnetooptical recording medium, and the operating means adds detection signals from the diagonal detection surfaces of the two four-divided photodetectors, differentially detects sum signals obtained from the detection signals from the diagonal detection surfaces, and differentially detects differential detection signals from the two four-divided photodetectors, thereby generating a reproduction signal for verification.

In the magnetooptical information recording/reproducing apparatus, the multi-divided photodetector comprises a two-divided photodetector having detection surfaces divided by a division line parallel to an information track of the magnetooptical recording medium, and the operating means adds detection signals from the detection surfaces of the two-divided photodetectors, and differentially detects the resultant sum signals, thereby generating a reproduction signal for verification. According to another one of the above embodiments, there is provided a magnetooptical information recording/reproducing apparatus, comprising: means for radiating a reproduction light beam on a magnetooptical recording medium having two magnetic layers as recording and reproduction layers at least exchange-coupled to each other, and a magnetic layer for controlling an exchange coupling force between the recording and reproduction layers, and for forming a transferable region in which an exchange coupling force between the two magnetic layers is increased and a non-transferable region in which an exchange coupling force outside the transferable region is weakened; means for applying a predetermined magnetic field of a predetermined direction to the transferable region including the non-transferable region and for masking information of the non-transferable region; a polarizing beam splitter serving as an analyzer for splitting the reproduction light beam reflected by the transferable region including the non-transferable region into two light beams; two multi-divided photodetectors for detecting the two split light beams; and means for performing a predetermined operation using signals from detection surfaces of the two multi-divided photodetectors and generating a reproduction signal.

In the magnetooptical information recording/reproducing apparatus, the light beams reflected by the magnetooptical recording medium include a polarized light component having the same polarization direction as that of the incident light on the recording medium, a polarized light component having the polarization direction perpendicular to the polarization direction of the incident light and produced by the magnetooptic effect, and a light component produced at the curved surface of the beam focusing objective lens, wherein an amount of the light component produced by the magnetooptic effect is equal to or smaller than an amount of the light component produced at the curved surface of the objective lens.

In the magnetooptical information recording/reproducing apparatus, the multi-divided photodetector comprises a four-divided photodetector having detection surfaces divided in a crossed shape such that division lines of the detection surfaces are parallel and perpendicular to the information track of the magnetooptical recording medium, and the operating means adds detection signals from the adjacent detection surfaces of the two four-divided photodetectors, differentially detects sum signals obtained from the detection signals from the adjacent detection surfaces, and differentially detects differential detection signals from the two four-divided photodetectors, thereby generating a reproduction signal of the recorded information.

In the magnetooptical information recording/reproducing apparatus, the multi-divided photodetector comprises a two-divided photodetector having detection surfaces divided by a division line parallel to an information track of the magnetooptical recording medium, and the operating means differentially detects detection signals from the detection surfaces of the two-divided photodetectors, and adds the differential detection signals, thereby generating a reproduction signal of the recorded information.

According to the effects of the above embodiments of the present invention, a domain recorded to have a size smaller than a light spot can be reproduced with high quality in the information reproduction mode. At the same time, a reproduction signal for verification can be obtained in the information recording mode. By using this reproduction signal for verification, verification can be performed simultaneously with recording, i.e., direct verification can be performed.

What is claimed is:

1. An optical information recording and/or reproducing apparatus comprising:

irradiating means comprising an objective lens, having a curved surface, for irradiating a recording light beam to a magnetooptical recording medium having at least two magnetic layers, which are a recording layer and a reproduction layer, and which are exchange-coupled to each other, and a magnetic layer for controlling the exchange-coupling force to block the exchange-coupling force between the recording layer and the reproduction layer;

means for applying an external magnetic field modulated according to an information signal to be recorded on the beam irradiated portion of the magnetooptical recording medium to record information on the recording layer and to orient magnetization of the reproduction layer in a direction parallel to the external magnetic field;

splitting means comprising a polarizing beam splitter for splitting at least light produced by a magnetooptic effect of the magnetooptical recording medium and light produced by diffraction at the curved surface of the objective lens;

detecting means comprising a multi-divided photodetector for respectively detecting the split light beams; and means for producing verifying reproduction signals by executing a predetermined computation using detection signals of the multi-divided detection surfaces of the multi-divided photodetector, and for verifying recording information using the obtained verifying reproduction signals.

2. An apparatus according to claim 1, further comprising:

DC component detecting means for detecting a DC component superposed with the reproduction signal when said objective lens is moved in a tracking direction relative to the magnetooptical recording medium; and correction means for correcting the reproduction signal on the basis of an output of said DC component detecting means, and for removing the DC component included in the reproduction signal.

3. An apparatus according to claim 1, wherein said polarizing beam splitter comprises converging lens means for respectively converging the two light beams split by said beam splitter onto said multi-divided photodetectors at a beam convergence position, and wherein said apparatus further comprises detecting means for detecting one of the light beams split by said multi-divided photodetector, disposed ahead of the beam convergence position, and for detecting the other of the light beams split by said multi-divided photodetector, disposed behind the beam convergence position.

4. An optical information recording and/or reproducing apparatus comprising:

means for irradiating a reproducing light beam through an objective lens, having a curved surface, to converge the light beam onto a magnetooptical recording medium having at least two magnetic layers, which are a recording layer and a reproduction layer, and which are exchange-coupled to each other, and a magnetic layer for controlling the exchange-coupling force so as to form a transferable region in which the exchange-coupling force between the recording layer and the reproduction layer is increased and a non-transfer region, located outside of the transferable region, in which the exchange-coupling force is decreased;

masking means for masking information in the non-transfer region, said masking means comprising means for applying a magnetic field having a predetermined direction to a region that includes the non-transfer region;

splitting means comprising a polarizing beam splitter for splitting (i) at least light reflected by the transferable region, including the non-transfer region, and produced by a magnetooptic effect and (ii) light produced by diffraction at the curved surface of said objective lens;

detecting means comprising a multi-divided photodetector for respectively detecting the split light beams; and means for producing reproduction signals by executing a predetermined computation using detection signals from the respective detection surfaces of said multi-divided photodetector, and for verifying recording information.

5. An apparatus according to claim 4, further comprising:

DC component detecting means for detecting a DC component superposed with the reproduction signal when said objective lens is moved in a tracking direction relative to the magnetooptical recording medium; and correction means for correcting the reproduction signal on the basis of an output of said DC component detecting means, and for removing the DC component included in the reproduction signal.

6. An apparatus according to claim 4, wherein said polarizing beam splitter comprises converging lens means for respectively converging the two light beams split by said beam splitter onto said multi-divided photodetector at a beam convergence position, and wherein said apparatus further comprises means for detecting one of the light beams split by said multi-divided photodetector, disposed ahead of the beam convergence position, and for detecting the other of the light beams split by said multi-divided photodetector, disposed behind the beam convergence position.

7. An optical information recording and/or reproducing apparatus comprising:

irradiating means comprising an objective lens, having a curved surface, for irradiating a recording light beam to a magnetooptical recording medium having at least two magnetic layers, which are a recording layer and a reproduction layer, and which are exchange-coupled to each other, and a magnetic layer for controlling the exchange-coupling force to block the exchange-coupling force between the recording layer and the reproduction layer;

means for applying an external magnetic field modulated according to an information signal to be recorded on the beam irradiated portion of the magnetooptical recording medium to record information on the recording layer and to orient magnetization of the reproduction layer in a direction parallel to the external magnetic field;

splitting means comprising a polarizing beam splitter for splitting incident light into two light beams;

detecting means comprising a multi-divided photodetector for respectively detecting the split light beams; and means for producing verifying reproduction signals by executing a predetermined computation using detection signals of the multi-divided detection surfaces of the multi-divided photodetector, and for verifying recording information using the obtained verifying reproduction signals.

8. An apparatus according to claim 7, further comprising:

DC component detecting means for detecting a DC component superposed with the reproduction signal when said objective lens is moved in a tracking direction relative to the magnetooptical recording medium; and correction means for correcting the reproduction signal on the basis of an output of said DC component detecting means, and for removing the DC component included in the reproduction signal.

9. An apparatus according to claim 7, wherein said polarizing beam splitter comprises converging lens means for respectively converging the two light beams split by said beam splitter onto said multi-divided photodetectors at a beam convergence position, and wherein said apparatus further comprises detecting means for detecting one of the light beams split by said multi-divided photodetector, disposed ahead of the beam convergence position, and for detecting the other of the light beams split by said multi-divided photodetector, disposed behind the beam convergence position.

10. An optical information recording and/or reproducing apparatus comprising:

means for irradiating a reproducing light beam through an objective lens, having a curved surface, to converge the light beam onto a magnetooptical recording medium having at least two magnetic layers, which are a recording layer and a reproduction layer, and which are exchange-coupled to each other, and a magnetic layer for controlling the exchange-coupling force so as to form a transferable region in which the exchange-coupling force between the recording layer and the reproduction layer is increased and a non-transfer region, located outside of the transferable region, in which the exchange-coupling force is decreased;

masking means for masking information in the non-transfer region, said masking means comprising means for applying a magnetic field having a predetermined direction to a region that includes the non-transfer region;

splitting means comprising a polarizing beam splitter for splitting incident light into two light beams;

detecting means comprising a multi-divided photodetector for respectively detecting the split light beams; and means for producing reproduction signals by executing a predetermined computation using detection signals from the respective detection surfaces of said multi-divided photodetector, and for verifying recording information.

11. An apparatus according to claim 10, further comprising:

DC component detecting means for detecting a DC component superposed with the reproduction signal when said objective lens is moved in a tracking direction relative to the magnetooptical recording medium; and correction means for correcting the reproduction signal on the basis of an output of said DC component detecting means, and for removing the DC component included in the reproduction signal.

12. An apparatus according to claim 10, wherein said polarizing beam splitter comprises converging lens means for respectively converging the two light beams split by said beam splitter onto said multi-divided photodetector at a beam convergence position, and wherein said apparatus further comprises means for detecting one of the light beams split by said multi-divided photodetector, disposed ahead of the beam convergence position, and for detecting the other of the light beams split by said multi-divided photodetector, disposed behind the beam convergence position.

* * * * *

UNITED STATES PATENT AND TRADEMARK OFFICE
CERTIFICATE OF CORRECTION

PATENT NO. : 5,768,219

DATED : June 16, 1998

INVENTORS : MASAKUNI YAMAMOTO, ET AL.

It is certified that error appears in the above-identified patent and that said Letters Patent is hereby corrected as shown below:

COLUMN 1:

line 59, "reproduction-optical" should read --reproduction optical--.

COLUMN 3:

line 41, "curve" should read --curved--.

COLUMN 12:

line 24, "components" should read --component)--.

COLUMN 27:

line 57, "surf ace" should read --surface--.

UNITED STATES PATENT AND TRADEMARK OFFICE
CERTIFICATE OF CORRECTION

PATENT NO. : 5,768,219

DATED : June 16, 1998

INVENTORS : MASAKUNI YAMAMOTO, ET AL.   Page 2 of 2

It is certified that error appears in the above-identified patent and that said Letters Patent is hereby corrected as shown below:

COLUMN 41:

line 13, "$S_{31}$" should read --$S$--

COLUMN 42:

line 55, the right margin should be closed up; and
line 56, the left margin should be closed up.

Signed and Sealed this

Nineteenth Day of October, 1999

Attest:

Q. TODD DICKINSON

*Attesting Officer*   Acting Commissioner of Patents and Trademarks